United States Patent
Lee et al.

(10) Patent No.: US 10,897,775 B2
(45) Date of Patent: Jan. 19, 2021

(54) METHOD FOR TRANSMITTING AND RECEIVING PHYSICAL DOWNLINK SHARED CHANNEL IN WIRELESS COMMUNICATION SYSTEM AND DEVICE SUPPORTING THE SAME

(71) Applicant: LG Electronics Inc., Seoul (KR)

(72) Inventors: Hyunho Lee, Seoul (KR); Kyuhwan Kwak, Seoul (KR); Seungmin Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/566,533

(22) Filed: Sep. 10, 2019

(65) Prior Publication Data

US 2020/0008225 A1   Jan. 2, 2020

Related U.S. Application Data

(63) Continuation of application No. PCT/KR2019/004925, filed on Apr. 23, 2019.
(Continued)

(51) Int. Cl.
*H04W 72/04* (2009.01)
*H04W 72/12* (2009.01)
(Continued)

(52) U.S. Cl.
CPC ........ *H04W 72/1273* (2013.01); *H04L 1/08* (2013.01); *H04L 5/0007* (2013.01); *H04W 72/042* (2013.01); *H04W 72/044* (2013.01)

(58) Field of Classification Search
CPC .................................................... H04L 1/08
See application file for complete search history.

(56) References Cited

U.S. PATENT DOCUMENTS

2016/0192333 A1* 6/2016 Wang ............... H04W 72/042
                                                              370/329
2016/0219607 A1   7/2016 You et al.
(Continued)

FOREIGN PATENT DOCUMENTS

KR   1020180004404   1/2018
KR   1020180036888   4/2018

OTHER PUBLICATIONS

Huawei, HiSilicon, "Compact DCI for LTE URLLC," R1-1801873, 3GPP TSG RAN WG1 Meeting #92, Athens, Greece, dated Feb. 26-Mar. 2, 2018, 9 pages.
(Continued)

*Primary Examiner* — Fahmida S Chowdhury
(74) *Attorney, Agent, or Firm* — Fish & Richardson P.C.

(57) ABSTRACT

The present specification proposes a method for transmitting and receiving a physical downlink shared channel (PDSCH) in a wireless communication system and a device supporting the same. More specifically, the method performed by a user equipment includes receiving, from a base station, a higher layer signal including first information about a configuration of an operation related to a PDSCH repetition, receiving, from the base station, second information related to a number of symbols of a control region, receiving, from the base station, downlink control information (DCI) including information related to a PDSCH repetition number based on the second information, and repeatedly receiving, from the base station, the PDSCH based on the DCI, wherein when the control region is configured with a specific number of symbols, a transmission time unit related to the control region is not included in transmission time units for a PDSCH repetition reception.

9 Claims, 23 Drawing Sheets

Related U.S. Application Data

(60) Provisional application No. 62/669,359, filed on May 9, 2018, provisional application No. 62/661,613, filed on Apr. 23, 2018.

(51) Int. Cl.
  *H04L 1/08* (2006.01)
  *H04L 5/00* (2006.01)

(56) References Cited

U.S. PATENT DOCUMENTS

| | | | | |
|---|---|---|---|---|
| 2016/0315752 | A1* | 10/2016 | Chen | H04L 5/14 |
| 2017/0078830 | A1* | 3/2017 | Wu | H04W 4/70 |
| 2018/0167968 | A1* | 6/2018 | Liu | H04L 1/1812 |
| 2019/0289478 | A1* | 9/2019 | Hosseini | H04L 5/003 |
| 2019/0296809 | A1* | 9/2019 | Li | H04B 7/0456 |

OTHER PUBLICATIONS

ZTE, Sanechips, "Discussion on PDSCH repetition for LTE URLLC," R1-1803962, 3GPP TSG RAN WG1 Meeting #92bis, Sanya, China, dated Apr. 16-20, 2018, 4 pages.

MediaTek Inc., "Blind/HARQ-less repetitions for scheduled DL-SCH in LTE HRLLC," R1-1804136, 3GPP TSG RAN WG1 Meeting #92bis, Sanya, China, dated Apr. 16-20, 2018, 7 pages.

LG Electronics, "Discussion on blind/HARQ-less repetition for scheduled DL-SCH operation," R1-1804531, 3GPP TSG RAN WG1 Meeting #92bis, Sanya, China, dated Apr. 16-20, 2018, 5 pages.

Huawei, HiSilicon, "Discussion on Semi-static configuration of PCFICH duration," R2-1804670, 3GPP TSG-RAN WG2 Meeting #101bis, Sanya, China, dated Apr. 16-20, 2018, 3 pages.

Nokia, Nokia Shanghai Bell, "On blind/HARQ-less PDSCH repetition," R1-1804587, 3GPP TSG-RAN WG1 Meeting #92bis, Sanya, P.R. China, dated Apr. 16-20, 2018, 6 pages.

Qualcomm Incorporated, "Downlink Enhancements for URLLC," R1- 1805271, 3GPP TSG RAN WG1 #92b, Sanya, P. R. China, dated Apr. 16-20, 2018, 5 pages.

Ericsson [RAN1], "LS on Ultra Reliable Low Latency Communication for LTE," R1-1805433, 3GPP TSG-RAN1 Meeting #92bis, Sanya, P. R. China, dated Apr. 16-20, 2018, 2 pages.

Ericsson, "Remaining details on URLLC techniques for PDSCH," R1-1807302, 3GPP TSG-RAN1 Meeting #92bis, Busan, South Korea, dated May 21-25, 2018, 6 pages.

LG Electronics, "Discussion on blind/HARQ-less PDSCH repetition for URLLC," R1-1806598, 3GPP TSG RAN WG1 Meeting #93, Busan, Republic of Korea, dated May 21-25, 2018, 8 pages.

Qualcomm Incorporated, "Blind and HARQ-less Repetition for Scheduled DL-SCH Operation," R1-1807121, 3GPP TSG RAN WG1 #93, Busan, South Korea, dated May 21-25, 2018, 4 pages.

MCC Support, "Final Report of 3GPP TSG RAN WG1 #93 v1.0.0 (Busan, South Korea, May 21-25, 2018)," R1-1808001, 3GPP TSG RAN WG1 Meeting #94, Gothenburg, Sweden, dated Aug. 20-24, 2018, 198 pages.

PCT International Search Report in International Application No. PCT/KR2019/004925, dated Aug. 22, 2019, 7 pages (with English translation).

Korean Notice of Allowance in Korean Application No. 10-2019-0047552, dated Sep. 8, 2019, 4 pages (with English translation).

Extended European Search Report in European Appln. No. 19793472.2, dated Nov. 16, 2020, 10 pages.

Qualcomm Incorporated, "Downlink Enhancements for URLLC," R1-1804933, 3GPP TSG RAN WG1 #92b, Sanya, P.R. China, Apr. 16-20, 2018, 5 pages.

\* cited by examiner

METHOD FOR TRANSMITTING AND RECEIVING PHYSICAL DOWNLINK SHARED CHANNEL IN WIRELESS COMMUNICATION SYSTEM AND DEVICE SUPPORTING THE SAME

CROSS-REFERENCE TO RELATED APPLICATIONS

This application is a continuation of International Application No. PCT/KR2019/004925, filed on Apr. 23, 2019, which claims the benefit of U.S. Provisional Application No. 62/661,613, filed on Apr. 23, 2018, and U.S. Provisional Application No. 62/669,359, filed on May 9, 2018, the contents of which are all hereby incorporated by reference herein in their entirety.

TECHNICAL FIELD

The present specification relates to a wireless communication system, and more particularly to a method for transmitting and receiving physical downlink shared channel (PDSCH) repetition and a device supporting the same.

BACKGROUND ART

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high speed services, an advanced mobile communication system is required.

Requirements of a next-generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

DISCLOSURE

Technical Problem

An object of the present specification is to provide a method for improving PDSCH transmission and reception reliability in a PDSCH repetition operation.

Technical problems to be solved by the present invention are not limited by the above-mentioned technical problems, and other technical problems which are not mentioned above can be clearly understood from the following description by those skilled in the art to which the present invention pertains.

Technical Solution

The present specification proposes a method for receiving a physical downlink shared channel (PDSCH) in a wireless communication system. The method performed by a user equipment (UE) comprises receiving, from a base station, a higher layer signal including first information about a configuration of an operation related to a PDSCH repetition, receiving, from the base station, second information related to a number of symbols of a control region, receiving, from the base station, downlink control information (DCI) including information related to a PDSCH repetition number based on the second information, and repeatedly receiving, from the base station, the PDSCH based on the DCI, wherein when the control region is configured with a specific number of symbols, a transmission time unit related to the control region is not included in transmission time units for a PDSCH repetition reception.

In the method of the present specification, the specific number of symbols may be 2 or 3 symbols.

In the method of the present specification, a transmission time unit may be a subslot.

In the method of the present specification, a subslot related to the control region may be a first subslot (subslot #0) in a subframe.

In the method of the present specification, the second information may be received via a physical control format indicator channel (PCFICH) or the higher layer signal.

In the method of the present specification, the operation related to the PDSCH repetition may be a HARQ-less/blind PDSCH repetition operation.

A user equipment (UE) receiving a physical downlink shared channel (PDSCH) in a wireless communication system according to the present specification comprises a transceiver configured to transmit and receive a radio signal, and a processor functionally coupled to the transceiver, wherein the processor is controlled to receive, from a base station, a higher layer signal including first information about a configuration of an operation related to a PDSCH repetition, receive, from the base station, second information related to a number of symbols of a control region, receive, from the base station, downlink control information (DCI) including information related to a PDSCH repetition number based on the second information, and repeatedly receive, from the base station, the PDSCH based on the DCI, wherein when the control region is configured with a specific number of symbols, a transmission time unit related to the control region is not included in transmission time units for a PDSCH repetition reception.

In the UE of the present specification, the specific number of symbols may be 2 or 3 symbols.

In the UE of the present specification, a transmission time unit may be a subslot.

In the UE of the present specification, a subslot related to the control region may be a first subslot (subslot #0) in a subframe.

In the UE of the present specification, the second information may be received via a physical control format indicator channel (PCFICH) or the higher layer signal.

A base station transmitting a physical downlink shared channel (PDSCH) in a wireless communication system according to the present specification comprises a transceiver configured to transmit and receive a radio signal, and a processor functionally coupled to the transceiver, wherein the processor is controlled to transmit, to a user equipment (UE), a higher layer signal including first information about a configuration of an operation related to a PDSCH repetition, transmit, to the UE, second information related to a number of symbols of a control region, transmit, to the UE, downlink control information (DCI) including information related to a PDSCH repetition number based on the second information, and repeatedly transmit, to the UE, the PDSCH, wherein when the control region is configured with a specific number of symbols, a transmission time unit related to the control region is not included in transmission time units for a PDSCH repetition reception of the UE.

In the base station of the present specification, the specific number of symbols may be 2 or 3 symbols.

In the base station of the present specification, a transmission time unit may be a subslot.

In the base station of the present specification, a subslot related to the control region may be a first subslot (subslot #0) in a subframe.

Advantageous Effects

The present specification has an effect capable of improving reception reliability of a PDSCH by excluding and/or skipping a TTI including control information depending on the number of symbols of a control region in a PDSCH repetition operation and decoding the PDSCH by the number of PDSCH repetitions.

Effects obtainable from the present invention are not limited by the effects mentioned above, and other effects which are not mentioned above can be clearly understood from the following description by those skilled in the art to which the present invention pertains.

DESCRIPTION OF DRAWINGS

The accompanying drawings, which are included to provide a further understanding of the present invention and constitute a part of the detailed description, illustrate embodiments of the present invention and together with the description serve to explain the principle of the present invention.

MODE FOR INVENTION

Figure 1A:
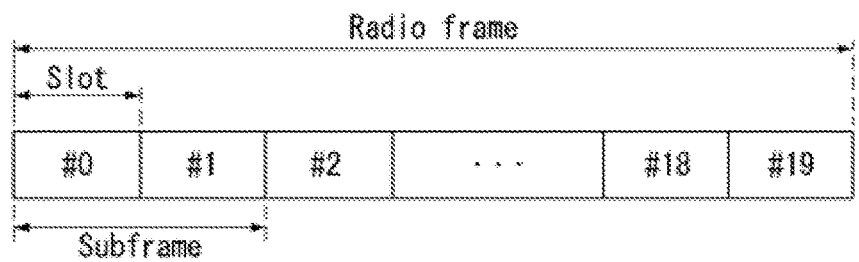
FIGS. 1A and 1B illustrate a structure of a radio frame in a wireless communication system to which the present invention is applicable.

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an dvanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

Overview of System

Figure 1B:
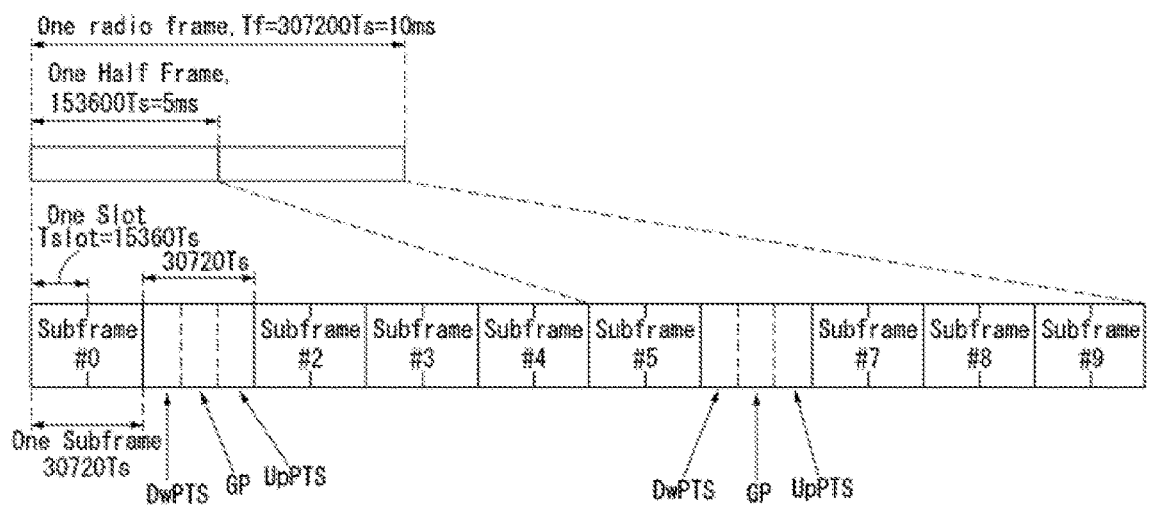

FIGS. 1A and 1B illustrate a structure of a radio frame in a wireless communication system to which the present invention is applicable.

3GPP LTE/LTE-A supports radio frame structure type 1 applicable to frequency division duplex (FDD) and radio frame structure Type 2 applicable to time division duplex (TDD).

In FIGS. 1A and 1B, the size of a radio frame in a time domain is represented as a multiple of a time unit of T_s=1/(15000*2048). Downlink and uplink transmissions are organized into radio frames with a duration of T_f=307200*T_s=10 ms.

FIG. 1A illustrates radio frame structure type 1. The radio frame structure type 1 is applicable to both full duplex FDD and half duplex FDD.

A radio frame consists of 10 subframes. One radio frame consists of 20 slots of T_slot=15360*T_s=0.5 ms length, and indexes of 0 to 19 are given to the respective slots. One subframe consists of two consecutive slots in the time domain, and subframe i consists of slot 2i and slot 2i+1. A time required to transmit one subframe is referred to as a transmission time interval (TTI). For example, the length of one subframe may be 1 ms, and the length of one slot may be 0.5 ms.

The uplink transmission and the downlink transmission in the FDD are distinguished in the frequency domain. Whereas there is no restriction in the full duplex FDD, a UE cannot transmit and receive simultaneously in the half duplex FDD operation.

One slot includes a plurality of orthogonal frequency division multiplexing (OFDM) symbols in the time domain and includes a plurality of resource blocks (RBs) in a frequency domain. Since 3GPP LTE uses OFDMA in downlink, OFDM symbols are used to represent one symbol period. The OFDM symbol may be called one SC-FDMA symbol or a symbol period. The resource block is a resource allocation unit and includes a plurality of consecutive subcarriers in one slot.

FIG. 1B illustrates frame structure type 2.

The radio frame type 2 consists of two half-frames of 153600*T_s=5 ms length each. Each half-frame consists of five subframes of 30720*T_s=1 ms length.

In the frame structure type 2 of a TDD system, uplink-downlink configuration is a rule indicating whether uplink and downlink are allocated (or reserved) to all subframes.

Table 1 represents uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for downlink transmission, 'U' represents a subframe for uplink transmission, and 'S' represents a special subframe consisting of three types of fields including a downlink pilot time slot (DwPTS), a guard period (GP), and an uplink pilot time slot (UpPTS). The DwPTS is used for an initial cell search, synchronization or channel estimation in a UE. The UpPTS is used for channel estimation in a base station and uplink transmission synchronization of the UE. The GP is a period for removing interference generated in uplink due to multi-path delay of a downlink signal between uplink and downlink.

Each subframe i consists of slot 2i and slot 2i+1 of T_slot=15360*T_s=0.5 ms length each.

The uplink-downlink configuration may be classified into 7 types, and a location and/or the number of a downlink subframe, a special subframe and an uplink subframe are different for each configuration.

A point of time at which switching from downlink to uplink or switching from uplink to downlink is performed is referred to as a switching point. A switch-point periodicity refers to a period in which switched patterns of an uplink subframe and a downlink subframe are equally repeated, and both 5 ms and 10 ms switch-point periodicity are supported. In case of 5 ms downlink-to-uplink switch-point periodicity, the special subframe S exists in every half-frame. In case of 5 ms downlink-to-uplink switch-point periodicity, the special subframe S exists in a first half-frame only.

In all the configurations, subframes 0 and 5 and a DwPTS are reserved for downlink transmission only. An UpPTS and a subframe immediately following the subframe are always reserved for uplink transmission.

Such uplink-downlink configurations may be known to both the base station and the UE as system information. The base station may inform the UE of change in an uplink-downlink allocation state of a radio frame by transmitting only indexes of uplink-downlink configuration information to the UE each time the uplink-downlink configuration information is changed. Furthermore, configuration information is a kind of downlink control information and may be transmitted via a physical downlink control channel (PDCCH) like other scheduling information, or is a kind of broadcast information and may be commonly transmitted to all UEs within a cell via a broadcast channel.

Table 2 represents configuration (length of DwPTS/GP/UpPTS) of a special subframe.

resource elements. The number of resource blocks included in the downlink slot, NDL is subordinated to a downlink transmission bandwidth.

A structure of the uplink slot may be the same as that of the downlink slot.

Figure 3:
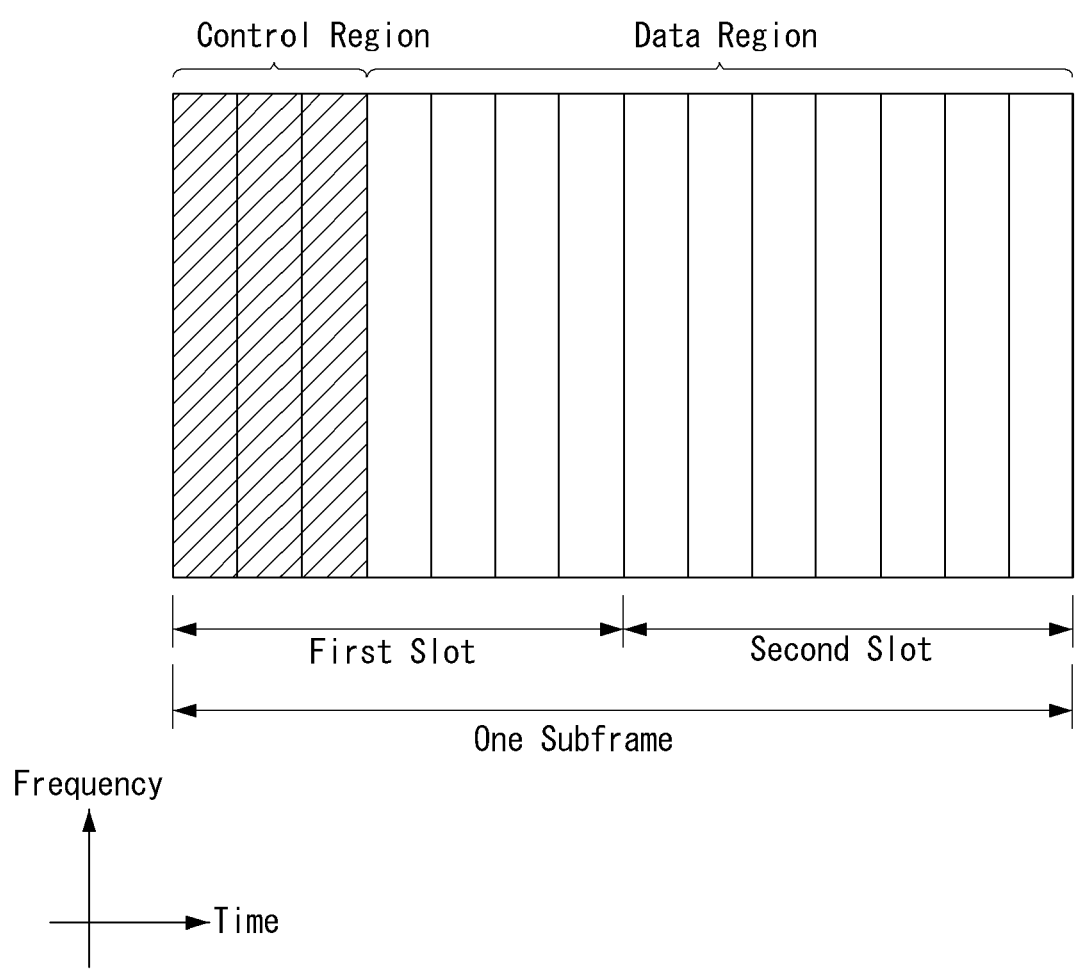
FIG. 3 illustrates a structure of a downlink subframe in a wireless communication system to which the present invention is applicable.

FIG. 3 illustrates a structure of a downlink subframe in the wireless communication system to which the present invention can be applied.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARD). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio frame according to an example of FIGS. 1A and 1B is merely an example, and the number of subcarriers included in a radio frame, the number of slots included in a subframe, and the number of OFDM symbols included in a slot may be variously changed.

Figure 2:
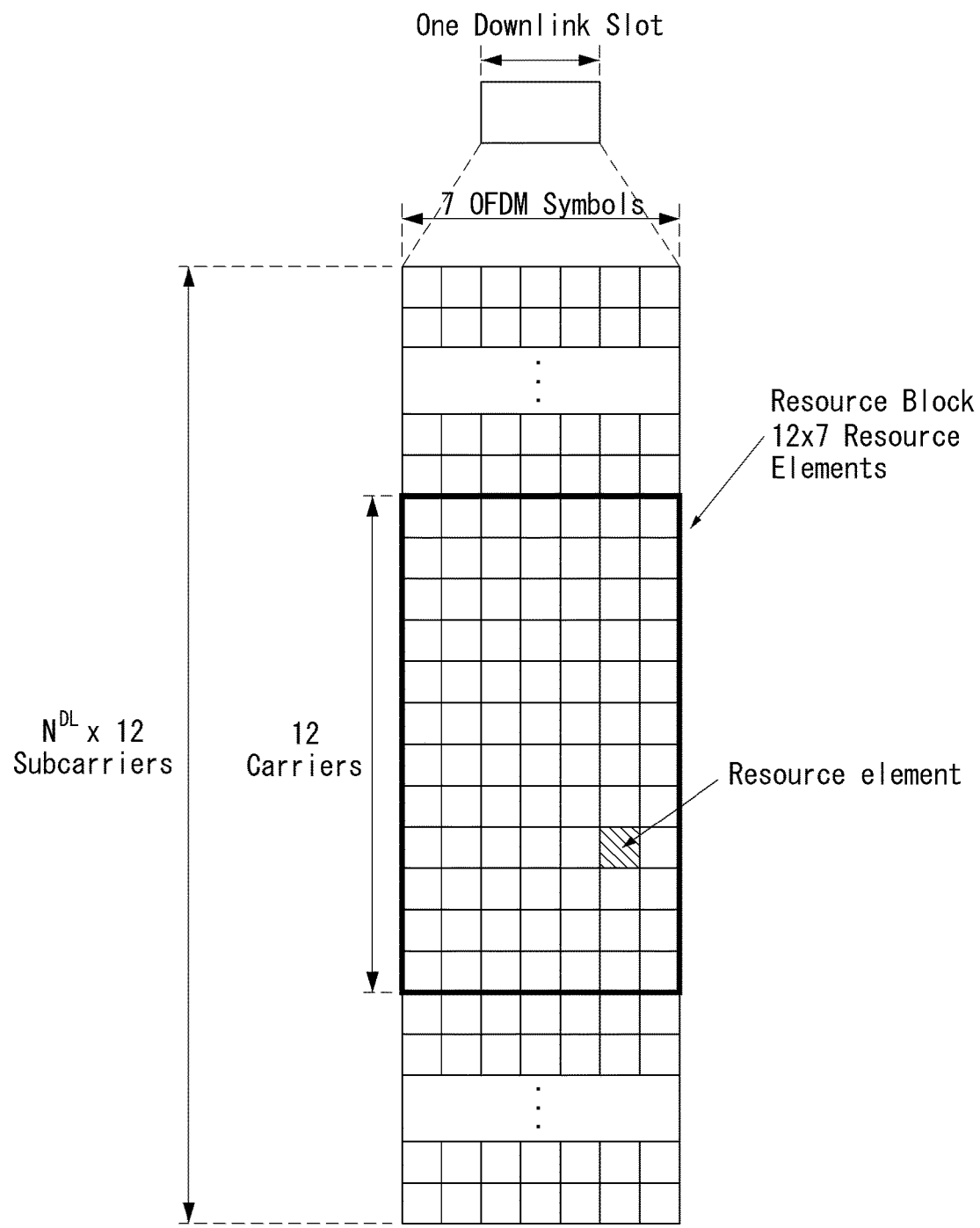
FIG. 2 illustrates a resource grid for one downlink slot in a wireless communication system to which the present invention is applicable.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

An enhanced PDCCH (EPDCCH) carries UE-specific signaling. The EPDCCH is located in a physical resource block (PRB) that is configured to be UE specific. In other words, as described above, the PDCCH may be transmitted in up to first three OFDM symbols in a first slot of a subframe, but the EPDCCH may be transmitted in a resource region other than the PDCCH. A time (i.e., symbol) at which the EPDCCH starts in the subframe may be configured to the UE via higher layer signaling (e.g., RRC signaling, etc.).

The EPDCCH may carry a transport format, resource allocation and HARQ information related to DL-SCH, a transport format, resource allocation and HARQ information related to UL-SCH, resource allocation information related to sidelink shared channel (SL-SCH) and physical sidelink control channel (PSCCH), etc. Multiple EPDCCHs may be supported, and the UE may monitor a set of EPCCHs.

The EPDCCH may be transmitted using one or more consecutive enhanced CCEs (ECCEs), and the number of ECCEs per EPDCCH may be determined for each EPDCCH format.

Each ECCE may consist of a plurality of enhanced resource element groups (EREGs). The EREG is used to define mapping of the ECCE to the RE. There are 16 EREGs per PRB pair. All REs except the RE carrying the DMRS in each PRB pair are numbered from 0 to 15 in increasing order of the frequency and then in increasing order of time.

The UE may monitor a plurality of EPDCCHs. For example, one or two EPDCCH sets may be configured in one PRB pair in which the UE monitors EPDCCH transmission.

Different coding rates may be implemented for the EPCCH by combining different numbers of ECCEs. The EPCCH may use localized transmission or distributed transmission, and hence, the mapping of ECCE to the RE in the PRB may vary.

Figure 4:
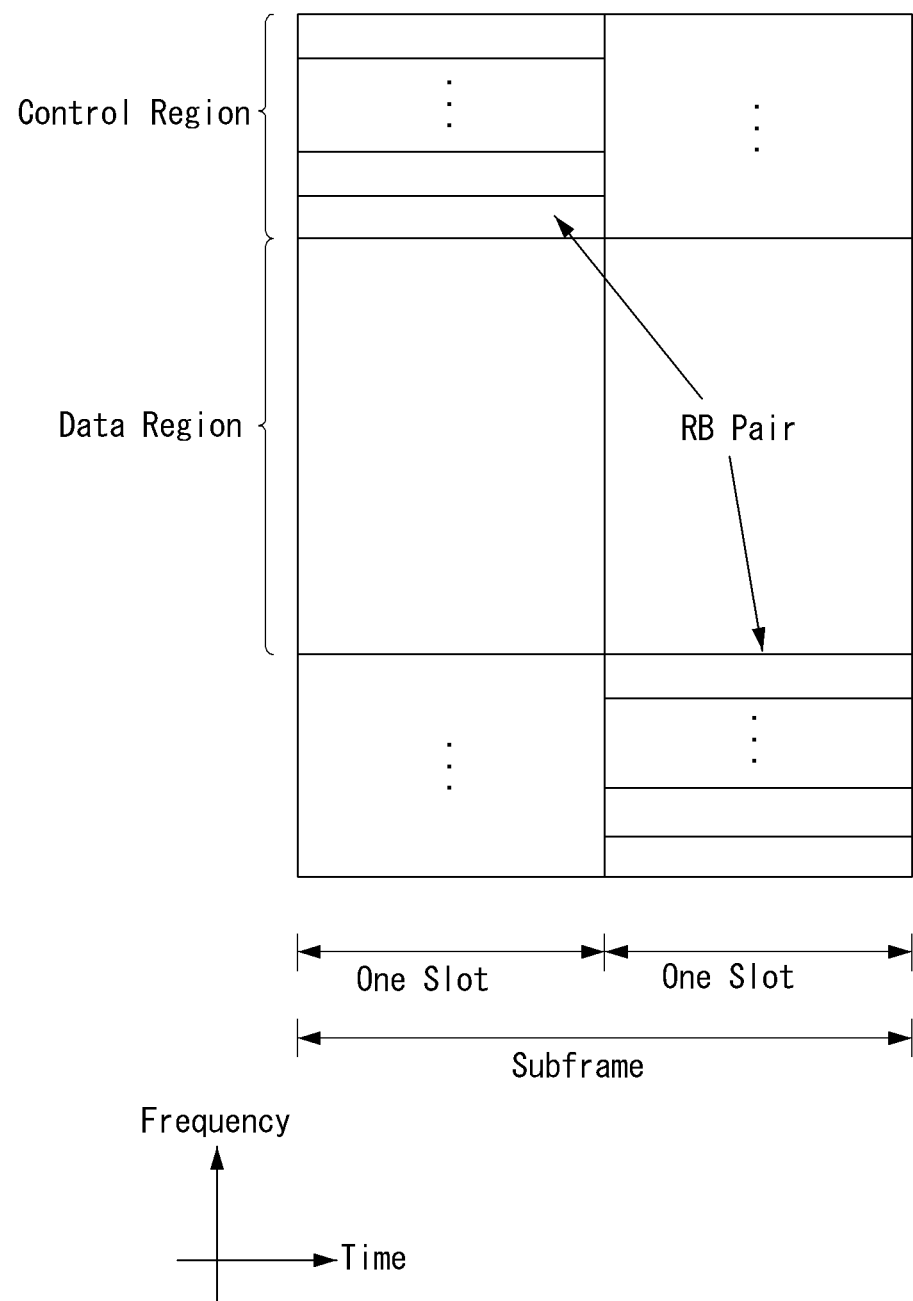
FIG. 4 illustrates a structure of an uplink subframe in a wireless communication system to which the present invention is applicable.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

The following invention proposed by the present specification can be applied to a 5G NR system (or device) as well as a LTE/LTE-A system (or device).

Communication of the 5G NR system is described below with reference to FIGS. 5 to 10.

The 5G NR system defines enhanced mobile broadband (eMBB), massive machine type communications (mMTC), ultra-reliable and low latency communications (URLLC), and vehicle-to-everything (V2X) based on usage scenario (e.g., service type).

A 5G NR standard is divided into standalone (SA) and non-standalone (NSA) depending on co-existence between a NR system and a LTE system.

The 5G NR system supports various subcarrier spacings and supports CP-OFDM in the downlink and CP-OFDM and DFT-s-OFDM (SC-OFDM) in the uplink.

Embodiments of the present invention can be supported by standard documents disclosed in at least one of IEEE 802, 3GPP, and 3GPP2 which are the wireless access systems. That is, steps or parts in embodiments of the present invention which are not described to clearly show the technical spirit of the present invention can be supported by the standard documents. Further, all terms disclosed in the present disclosure can be described by the standard document.

As smartphones and Internet of Things (IoT) terminals spread rapidly, an amount of information exchanged through a communication network is increasing. Hence, it is necessary to consider an environment (e.g., enhanced mobile broadband communication) that provides faster services to more users than the existing communication system (or existing radio access technology) in the next generation wireless access technology.

To this end, a design of a communication system considering machine type communication (MTC) that provides services by connecting multiple devices and objects is being discussed. In addition, a design of a communication system (e.g., ultra-reliable and low latency communication (URLLC)) considering a service and/or a terminal sensitive to reliability and/or latency of communication is also being discussed.

Hereinafter, in the present specification, for convenience of explanation, the next generation radio access technology is referred to as NR (new RAT, radio access technology), and a wireless communication system to which the NR is applied is referred to as an NR system.

Definition of NR System Related Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 reference points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Figure 5:
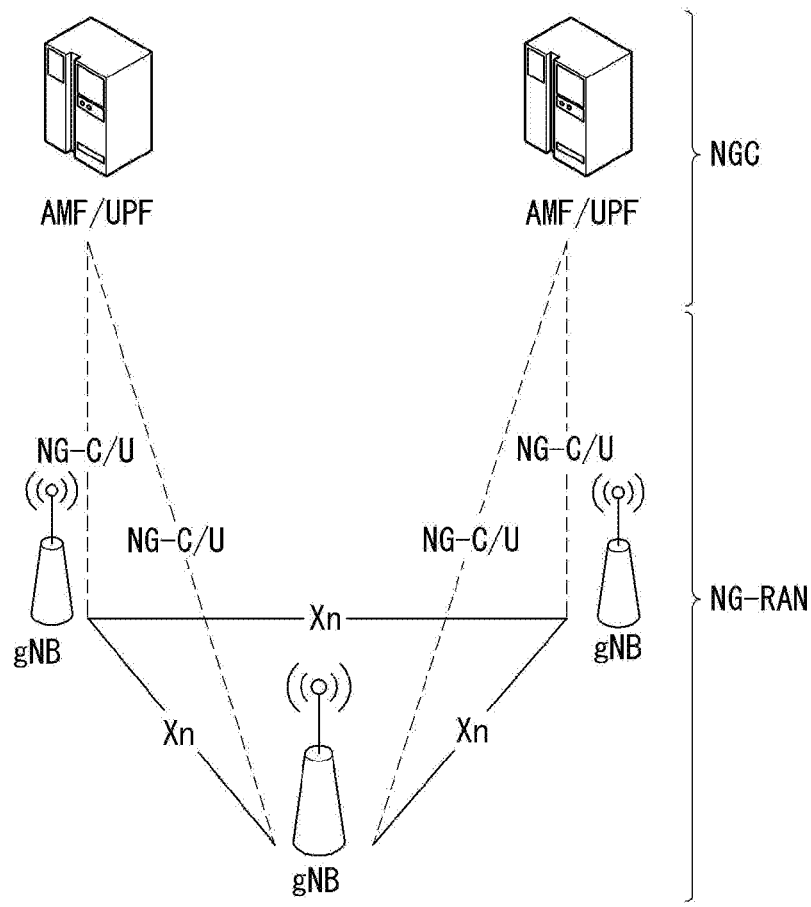
FIG. 5 illustrates an example of an overall structure of a NR system to which a method proposed by the present specification is applicable.

FIG. 5 illustrates an example of an overall structure of a NR system to which a method proposed by the present specification is applicable.

Referring to FIG. 5, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

NR (New Rat) Numerology and Frame Structure

In a NR system, multiple numerologies can be supported. A numerology may be defined by a subcarrier spacing and a cyclic prefix (CP) overhead. Multiple subcarrier spacings can be derived by scaling a basic subcarrier spacing by an integer N (or µ). Further, although it is assumed not to use a very low subcarrier spacing at a very high carrier frequency, the numerology used can be selected independently of a frequency band.

In the NR system, various frame structures according to the multiple numerologies can be supported.

Hereinafter, an orthogonal frequency division multiplexing (OFDM) numerology and a frame structure which may be considered in the NR system will be described.

Multiple OFDM numerologies supported in the NR system may be defined as in Table 3.

TABLE 3

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Figure 6:
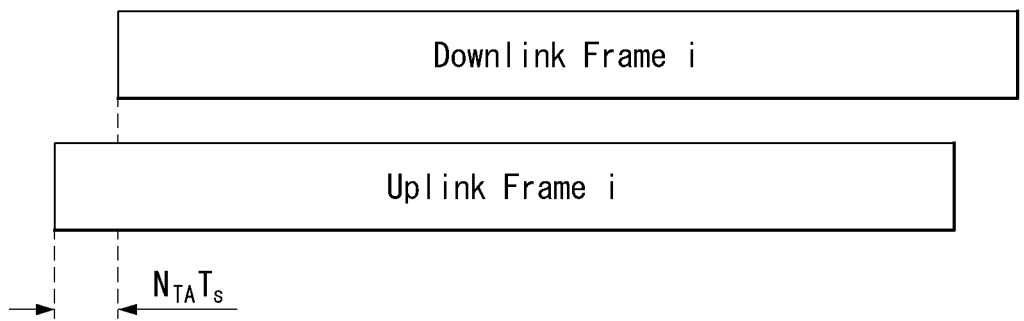
FIG. 6 illustrates a relation between an uplink frame and a downlink frame in a wireless communication system to which a method proposed by the present specification is applicable.

In regard to a frame structure in the NR system, a size of various fields in a time domain is expressed as a multiple of a time unit of $T_s = 1/(\Delta f_{max} \cdot N_f)$, where $\Delta f_{max} = 480 \cdot 10^3$ and $N_f = 4096$. Downlink and uplink transmissions are organized into radio frames with a duration of $T_f = (\Delta f_{max} N_f/100) \cdot T_s = 10$ ms. Here, the radio frame consists of ten subframes each having a duration of $T_{sf} = (\Delta f_{max} N_f/1000) \cdot T_s = 1$ ms. In this case, there may be a set of frames in the uplink and a set of frames in the downlink. FIG. 6 illustrates a relation between an uplink frame and a downlink frame in a wireless communication system to which a method proposed by the present specification is applicable.

As illustrated in FIG. 6, uplink frame number i for transmission from a user equipment (UE) shall start $T_{TA} = N_{TA} T_s$ before the start of a corresponding downlink frame at the corresponding UE.

Regarding the numerology µ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 4 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 5 represents the number of OFDM symbols per slot, the number of slots per radio frame, and the number of slots per subframe in an extended CP.

TABLE 4

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 5

| µ | $N_{symb}^{slot}$ | $N_{slot}^{frame,\mu}$ | $N_{slot}^{subframe,\mu}$ |
|---|---|---|---|
| 2 | 12 | 40 | 4 |

Figure 7:
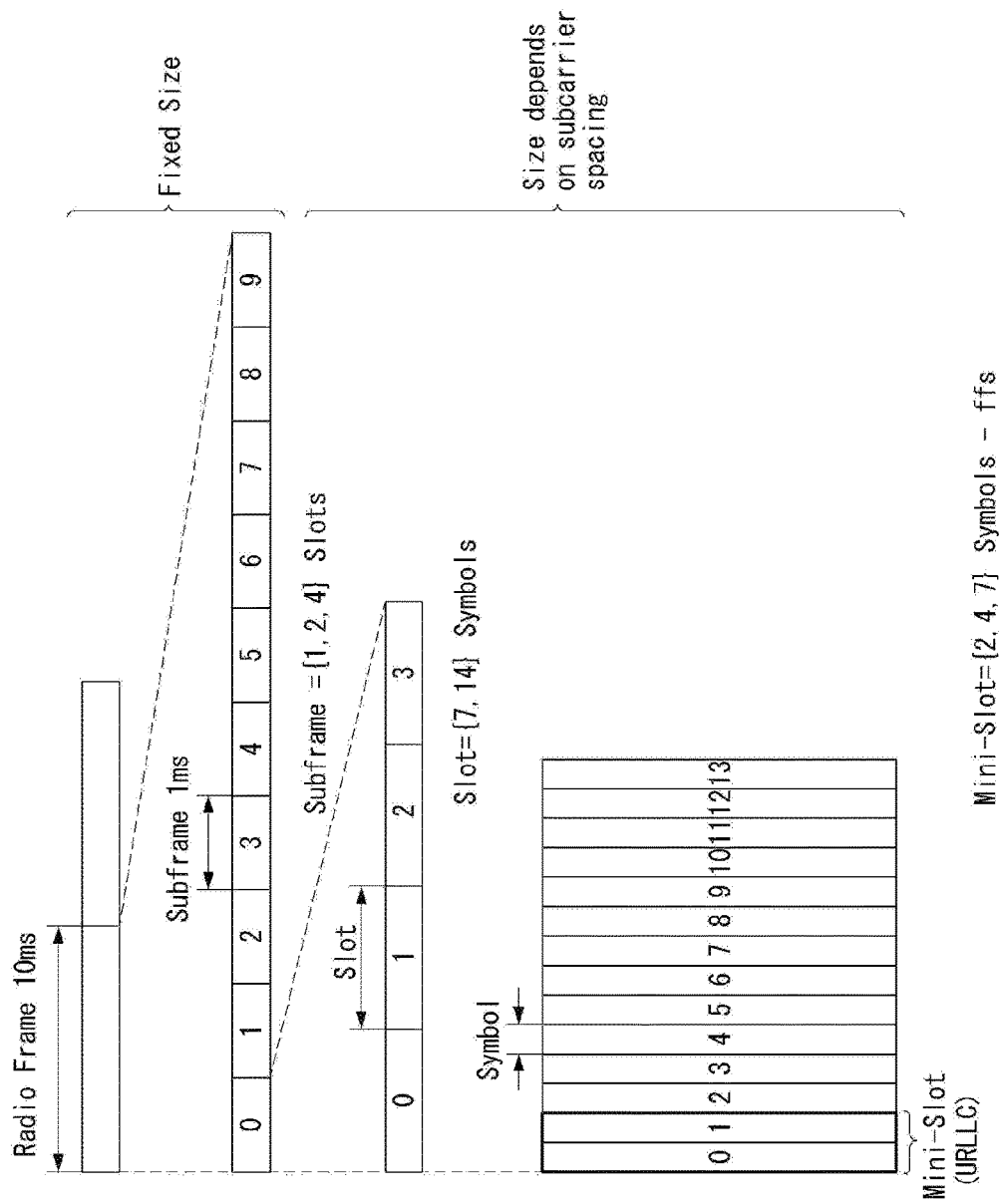
FIG. 7 illustrates an example of a frame structure in a NR system.

FIG. 7 illustrates an example of a frame structure in a NR system. FIG. 7 is merely for convenience of explanation and does not limit the scope of the present invention. In Table 5, in case of µ=2, i.e., as an example in which a subcarrier spacing (SCS) is 60 kHz, one subframe (or frame) may include four slots with reference to Table 4, and one subframe={1, 2, 4} slots shown in FIG. 3, for example, the number of slot(s) that may be included in one subframe may be defined as in Table 2.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

Figure 8:
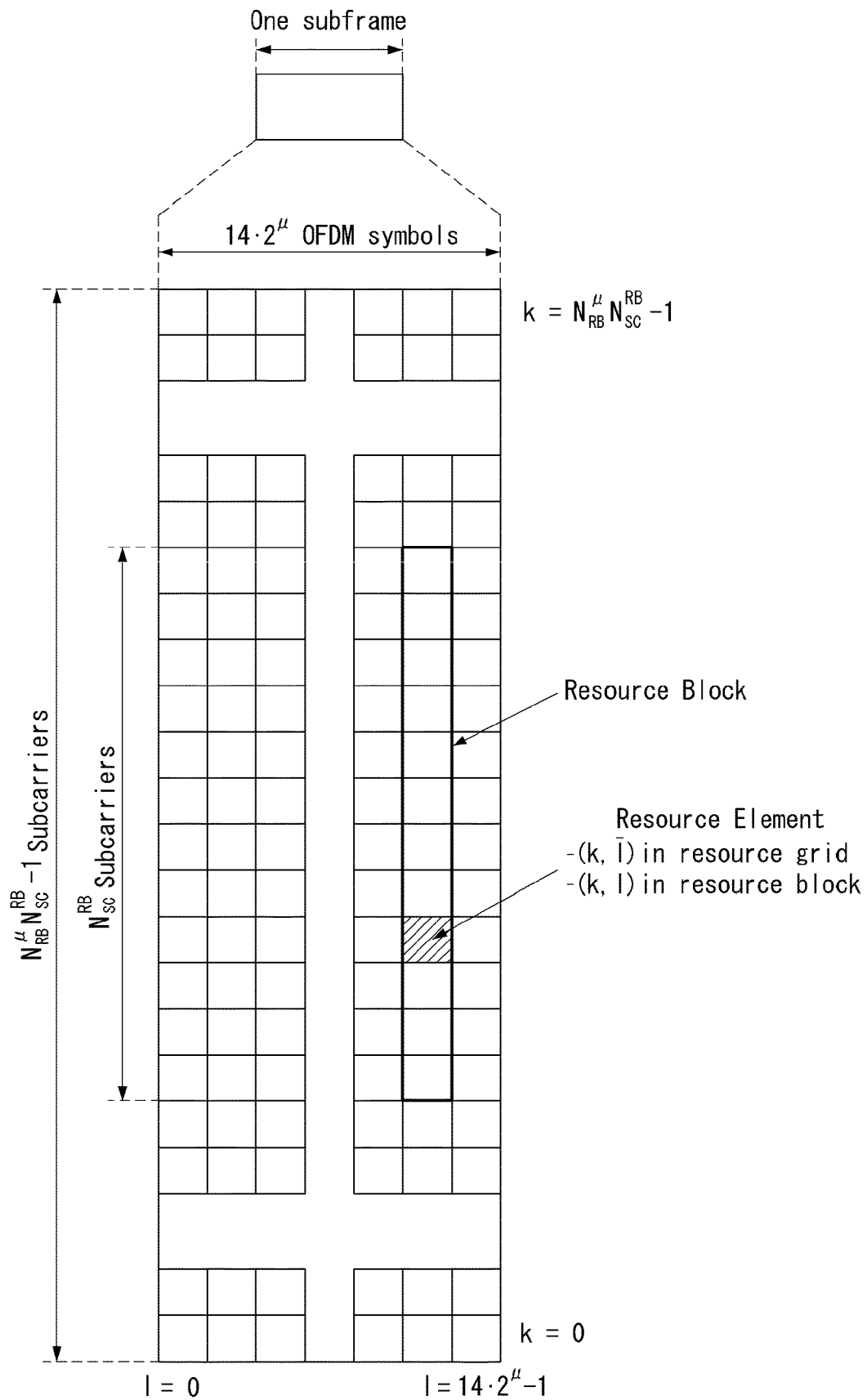
FIG. 8 illustrates an example of a resource grid supported in a wireless communication system to which a method proposed by the present specification is applicable.

FIG. 8 illustrates an example of a resource grid supported in a wireless communication system to which a method proposed by the present specification is applicable.

Referring to FIG. 8, a resource grid consists of $N_{RB}^\mu N_{sc}^{RB}$ subcarriers on a frequency domain, each subframe consisting of 14·2μ. OFDM symbols, but the present invention is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \le N_{RB}^{max,\mu}$. $N_{RB}^{max,\mu}$ denotes a maximum transmission bandwidth and may change not only between numerologies but also between uplink and downlink.

Figure 9:
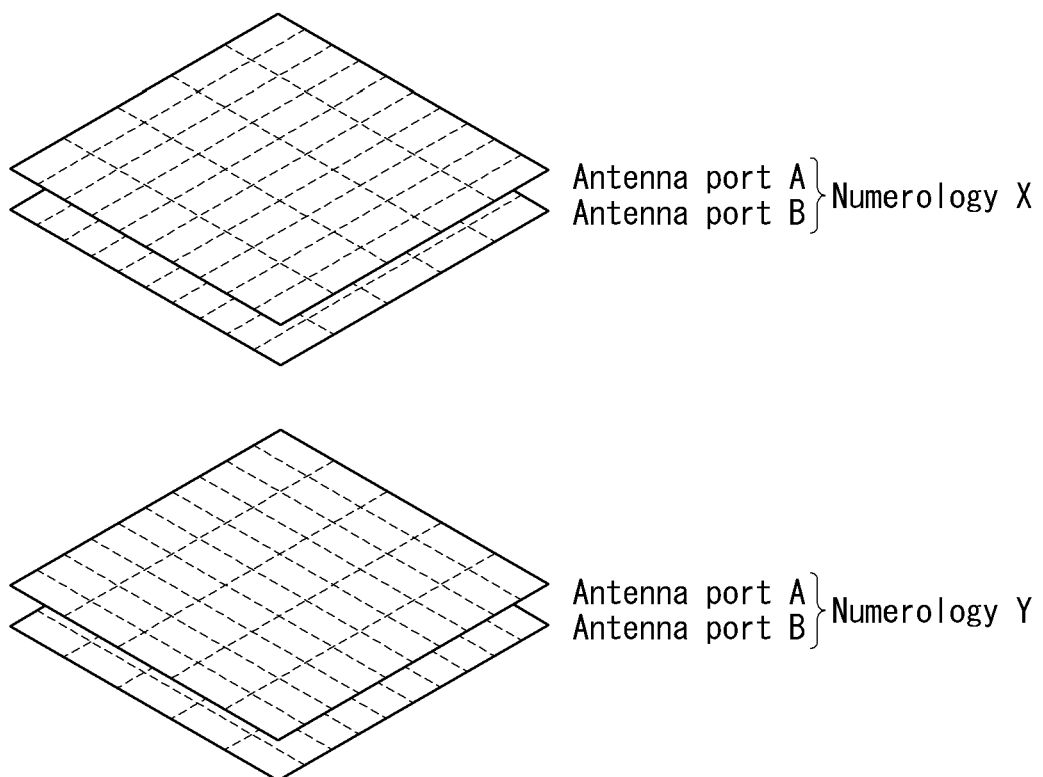
FIG. 9 illustrates examples of a resource grid per antenna port and numerology to which a method proposed by the present specification is applicable.

In this case, as illustrated in FIG. 9, one resource grid may be configured per numerology μ and antenna port p.

FIG. 9 illustrates examples of a resource grid per antenna port and numerology to which a method proposed by the present specification is applicable.

Each element of the resource grid for the numerology μ and the antenna port p is called a resource element and is uniquely identified by an index pair (k, Ī), where k=0 . . . , $N_{RB}^\mu N_{sc}^{RB}-1$, is an index on a frequency domain, and Ī=0, . . . , $2^\mu N_{symb}^{(\mu)}-1$ refers to a location of a symbol in a subframe. The index pair (k,Ī) is used to refer to a resource element in a slot, where l=0, . . . , $N_{symb}^\mu - 1$.

The resource element (k,Ī) for the numerology μ and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB}=12$ sc consecutive subcarriers in the frequency domain.

Point A serves as a common reference point of a resource block grid and may be obtained as follows:

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^\mu$ in the frequency domain and resource elements (k, l) for the subcarrier spacing configuration μ may be given by the following Equation 1.

$$n_{CRB}^\mu = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Self-Contained Structure

A time division duplexing (TDD) structure considered in the NR system is a structure in which both uplink (UL) and downlink (DL) are processed in one slot (or subframe). The structure is to minimize a latency of data transmission in a TDD system and may be referred to as a self-contained structure or a self-contained slot.

Figure 10:
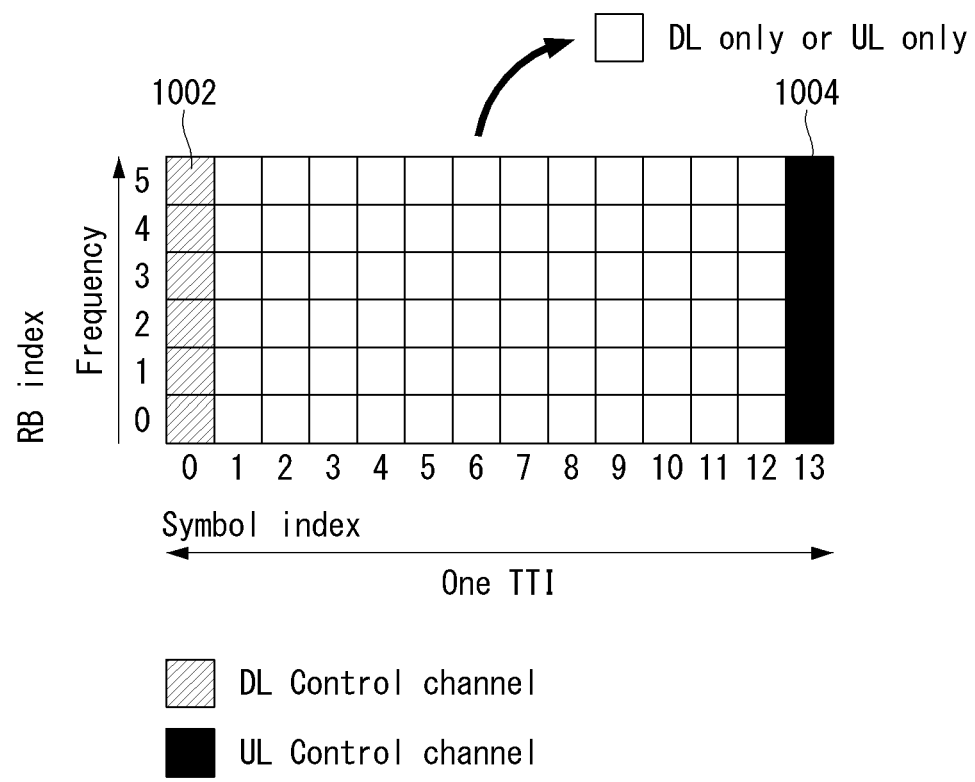
FIG. 10 illustrates an example of a self-contained structure to which a method proposed by the present specification is applicable.

FIG. 10 illustrates an example of a self-contained structure to which a method proposed by the present specification is applicable. FIG. 10 is merely for convenience of explanation and does not limit the scope of the present invention.

Referring to FIG. 10, as in legacy LTE, it is assumed that one transmission unit (e.g., slot, subframe) consists of 14 orthogonal frequency division multiplexing (OFDM) symbols.

In FIG. 10, a region 1002 means a downlink control region, and a region 1004 means an uplink control region. Further, regions (i.e., regions without separate indication) other than the region 1002 and the region 1004 may be used for transmission of downlink data or uplink data.

That is, uplink control information and downlink control information may be transmitted in one self-contained slot. On the other hand, in case of data, uplink data or downlink data is transmitted in one self-contained slot.

When the structure illustrated in FIG. 10 is used, in one self-contained slot, downlink transmission and uplink transmission may sequentially proceed, and downlink data transmission and uplink ACK/NACK reception may be performed.

As a result, if an error occurs in the data transmission, time required until retransmission of data can be reduced. Hence, the latency related to data transfer can be minimized.

In the self-contained slot structure illustrated in FIG. 10, a base station (e.g., eNodeB, eNB, gNB) and/or a user equipment (UE) (e.g., terminal) require a time gap for a process for converting a transmission mode into a reception mode or a process for converting a reception mode into a transmission mode. In regard to the time gap, if uplink transmission is performed after downlink transmission in the self-contained slot, some OFDM symbol(s) may be configured as a guard period (GP).

Physical Uplink Control Channel (PUCCH)

Uplink control information (UCI) transmitted on a PUCCH may include scheduling request (SR), HARQ ACK/NACK information, and downlink channel measurement information.

The HARQ ACK/NACK information may be produced depending on whether decoding of downlink data packet on a PDSCH is successful or not. In the existing wireless communication system, one ACK/NACK bit is transmitted in case of single codeword downlink transmission while two ACK/NACK bits are transmitted in case of two codeword downlink transmissions.

The channel measurement information refers to feedback information related to a multiple input multiple output (MIMO) scheme and may include a channel quality indicator (CQI), a precoding matrix index (PMI), and a rank indicator (RI). The channel measurement information may collectively be referred to as a CQI.

20 bits per subframe may be used for the CQI transmission.

The PUCCH may be modulated by using a binary phase shift keying (BPSK) scheme and a quadrature phase shift keying (QPSK) scheme. Control information for a plurality of UEs may be transmitted on the PDCCH. In case of performing code division multiplexing (CDM) to distinguish signals of the respective UEs, a length-12 constant amplitude zero autocorrelation (CAZAC) sequence is mostly used. Since the CAZAC sequence has characteristics of maintaining a predetermined amplitude in a time domain and a frequency domain, the CAZAC has properties suitable to increase coverage by reducing a peak-to-average power ratio (PAPR) or a cubic metric (CM) of the UE. In addition, the ACK/NACK information for downlink data transmission transmitted on the PDCCH is covered by using an orthogonal sequence or an orthogonal cover (OC).

Further, control information transmitted on the PUCCH may be distinguished using a cyclically shifted sequence each having a different cyclic shift (CS) value. The cyclically shifted sequence may be produced by cyclically shifting a base sequence by as much as a specific cyclic shift (CS) amount. The specific CS amount is indicated by a CS index. The number of available cyclic shifts may vary depending on the delay spread of a channel. Various kinds of sequences may be used as the base sequence, and the CAZAC sequence described above is an example.

An amount of control information that the UE can transmit in one subframe may be determined depending on the number of SC-FDMA symbols (i.e., SC-FDMA symbols except SC-FDMA symbols used for reference signal (RS) transmission for coherent detection of the PUCCH), that can be used in the transmission of the control information.

In the 3GPP LTE system, the PUCCH is defined as a total of seven different formats depending on transmitted control information, a modulation scheme, an amount of control information, etc., and attributes of uplink control information (UCI) transmitted according to each PUCCH format may be summarized as in the following Table 6.

TABLE 6

| PUCCH Format | Uplink Control Information(UCI) |
|---|---|
| Format 1 | Scheduling Request (SR) (unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

PUCCH format 1 is used for single transmission of SR. In case of single transmission of SR, an unmodulated waveform is applied, which will be described below in detail. PUCCH format 1a or 1b is used for transmission of HARQ ACK/NACK. In case of single transmission of HARQ ACK/NACK in a random subframe, PUCCH format 1a or 1b may be used. Alternatively, the HARQ ACK/NACK and the SR may be transmitted in the same subframe using the PUCCH format 1a or 1b.

PUCCH format 2 is used for transmission of a CQI, and PUCCH format 2a or 2b is used for transmission of the CQI and the HARQ ACK/NACK.

In case of an extended CP, the PUCCH format 2 may also be used for transmission of the CQI and the HARQ ACK/NACK.

Figure 11:
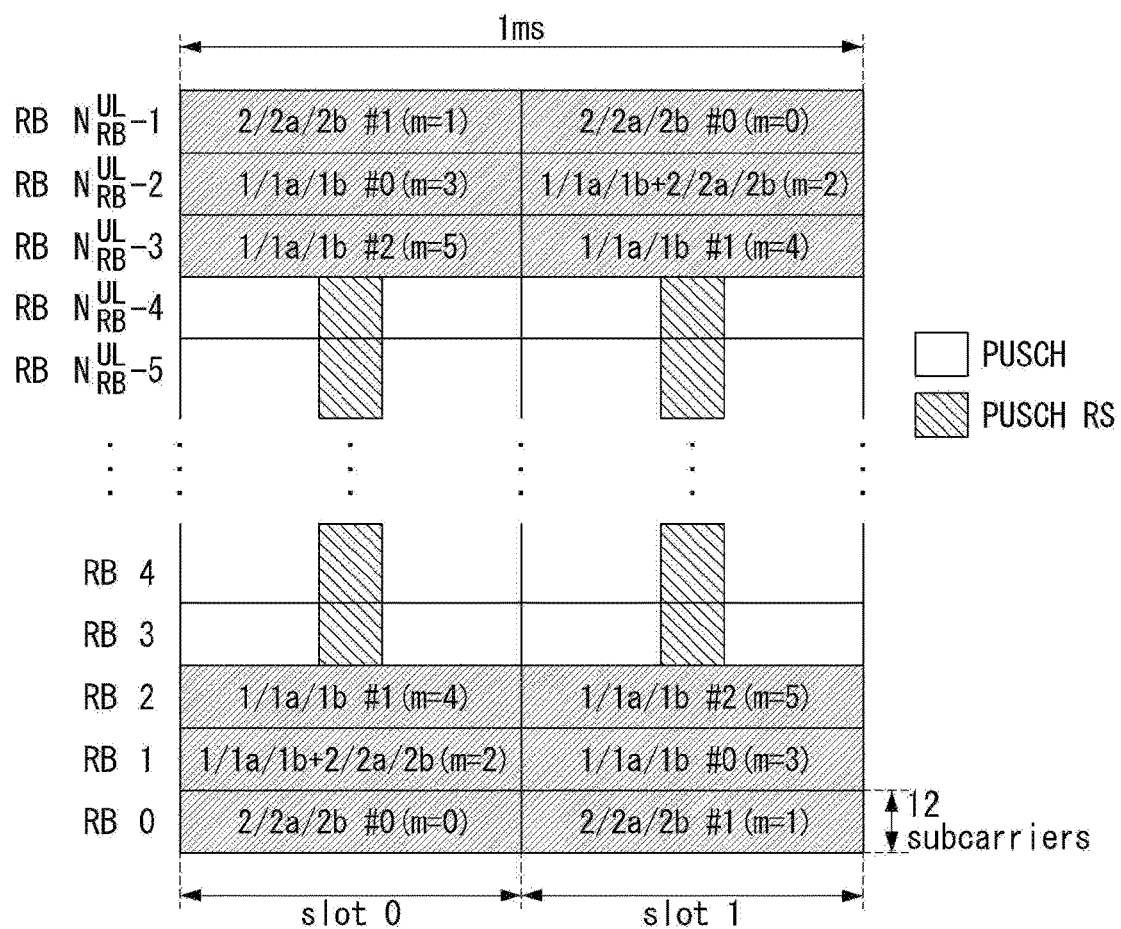
FIG. 11 illustrates an example in which physical uplink control channel (PUCCH) formats are mapped to PUCCH regions of uplink physical resource blocks in a wireless communication system to which the present invention is applicable.

FIG. 11 illustrates an example in which PUCCH formats are mapped to PUCCH regions of uplink physical resource blocks in a wireless communication system to which the present invention is applicable.

In FIG. 11, $N_{RB}^{UL}$ represents the number of resource blocks in the uplink, and $0, 1, \ldots, N_{RB}^{UL}-1$ refers to No. of s physical resource block. Basically, the PUCCH is mapped to both edges of an uplink frequency block. As illustrated in FIG. 11, the PUCCH format 2/2a/2b is mapped to a PUCCH region marked by m=0, 1, which may represent that the PUCCH format 2/2a/2b is mapped to resource blocks located at band edges. In addition, the PUCCH format 2/2a/2b and the PUCCH format 1/1a/1b are mixedly mapped to the PUCCH region marked by m=2. Next, the PUCCH format 1/1a/1b may be mapped to a PUCCH region marked by m=3, 4, 5. The number $N_{RB}^{(2)}$ of PUCCH RBs available for use by the PUCCH format 2/2a/2b may be indicated to the UEs in a cell by broadcasting signaling.

The PUCCH format 2/2a/2b is described. The PUCCH format 2/2a/2b is a control channel used to transmit channel measurement feedbacks CQI, PMI, and RI.

A periodicity and a frequency unit (or a frequency resolution) to be used to report the channel measurement feedback (hereinafter, collectively referred to as CQI information) may be controlled by the base station. Periodic CQI reporting and aperiodic CQI reporting in a time domain can be reported. The PUCCH format 2 may be used for the periodic CQI reporting only, and the PUSCH may be used for the aperiodic CQI reporting. In case of the aperiodic CQI reporting, the base station may instruct the UE to send an individual CQI report embedded into a resource which is scheduled for uplink data transmission.

Figure 12:
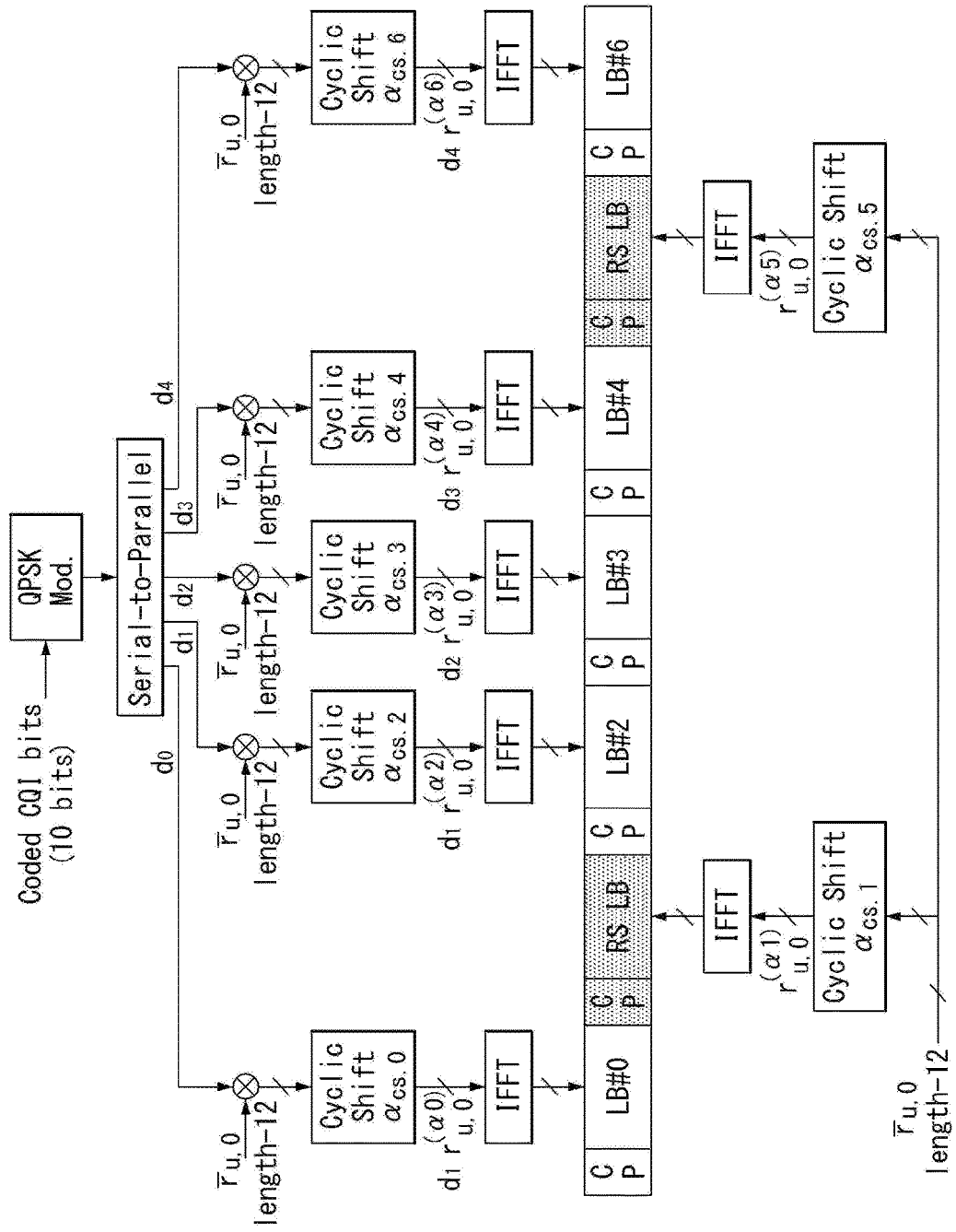
FIG. 12 illustrates a structure of channel quality indicator (CQI) channel in case of a normal cyclic prefix (CP) in a wireless communication system to which the present invention is applicable.

FIG. 12 illustrates a structure of CQI channel in case of a normal CP in a wireless communication system to which the present invention is applicable.

Among SC-FDMA symbols 0 to 6 of one slot, SC-FDMA symbols 1 and 5 (second and sixth symbols) may be used for transmission of demodulation reference signal (DMRS), and the CQI information may be transmitted in the remaining SC-FDMA symbols. In case of the extended CP, one SC-FDMA symbol (SC-FDMA symbol 3) is used for the DMRS transmission.

In the PUCCH format 2/2a/2b, the modulation by the CAZAC sequence is supported, and a QPSK modulated symbol is multiplied by the length-12 CAZAC sequence. A cyclic shift (CS) of the sequence is changed between symbols and slots. An orthogonal covering is used for the DMRS.

The reference signal (DMRS) is carried on two SC-FDMA symbols which are separated from each other at an interval of three SC-FDMA symbols among seven SC-FDMA symbols included in one slot, and the CQI information is carried on the remaining five SC-FDMA symbols. The use of two RSs in one slot is to support a high speed UE. Further, the respective UEs are distinguished using a cyclic shift (CS) sequence. CQI information symbols are modulated and transmitted to all the SC-FDMA symbols, and the SC-FDMA symbol is composed of one sequence. That is, the UE modulates the CQI and transmits the modulated CQI to each sequence.

The number of symbols which can be transmitted in one TTI is 10, and the modulation of the CQI information is also determined up to the QPSK. Since a 2-bit CQI value can be carried in case of using the QPSK mapping for the SC-FDMA symbol, a 10-bit CQI value can be carried on one slot. Thus, a CQI value of maximum 20 bits can be carried in one subframe. A frequency domain spreading code is used to spread the CQI information in a frequency domain.

As the frequency domain spreading code, length-12 CAZAC sequence (e.g., ZC sequence) may be used. Each control channel may be distinguished by applying the CAZAC sequence having a different cyclic shift value. An IFFT is performed on frequency domain spreading CQI information.

The 12 equally-spaced cyclic shifts may allow 12 different UEs to be orthogonally multiplexed on the same PUCCH RB. In case of a normal CP, a DMRS sequence on the SC-FDMA symbol 1 and 5 (on the SC-FDMA symbol 3 in case of an extended CP) is similar to a CQI signal sequence on the frequency domain, but the modulation like the CQI information is not applied.

The UE may be semi-statically configured by higher layer signaling to report periodically different CQI, PMI, and RI types on PUCCH resources indicated as PUCCH resource indexes ($n_{PUCCH}^{(1,\tilde{p})}$, $n_{PUCCH}^{(2,\tilde{p})}$, $n_{PUCCH}^{(3,\tilde{p})}$). Here, the PUCCH resource index ($n_{PUCCH}^{(2,\tilde{p})}$) is information indicating a PUCCH region used for the PUCCH format 2/2a/2b transmission and a cyclic shift (CS) value to be used.

PUCCH Channel Structure

PUCCH formats 1a and 1b are described.

In the PUCCH format 1a/1b, a symbol modulated using a BPSK or QPSK modulation scheme is multiplied by length-12 CAZAC sequence. For example, the result of multiplying length-N CAZAC sequence r(n) (where n=0, 1, 2, ..., N−1) by a modulation symbol d(0) is y(0), y(1), y(2), ..., y(N−1). The symbols y(0), y(1), y(2), ..., y(N−1) may be referred to as a block of symbols. After the CAZAC sequence is multiplied by the modulation symbol, the block-wise spreading using an orthogonal sequence is applied.

A length-4 Hadamard sequence is used for normal ACK/NACK information, and a length-3 discrete fourier transform (DFT) sequence is used for shortened ACK/NACK information and a reference signal.

A length-2 Hadamard sequence is used for the reference signal in case of an extended CP.

Figure 13:
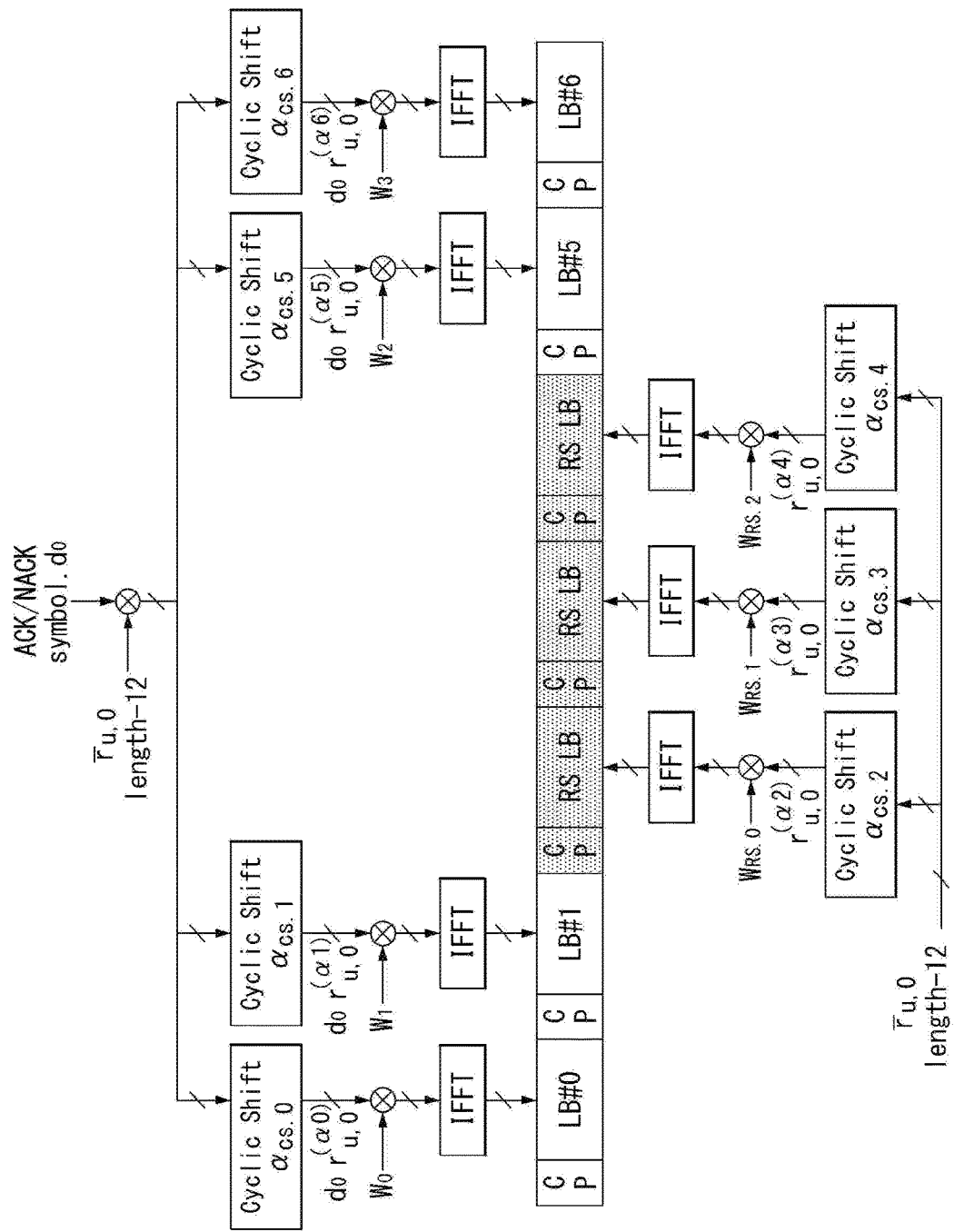
FIG. 13 illustrates a structure of ACK/NACK channel in case of a normal CP in a wireless communication system to which the present invention is applicable.

FIG. 13 illustrates a structure of ACK/NACK channel in case of a normal CP in a wireless communication system to which the present invention is applicable.

More specifically, FIG. 13 illustrates an example of a PUCCH channel structure for HARQ ACK/NACK transmission without CQI.

A reference signal (RS) is carried on three consecutive SC-FDMA symbols in the middle of seven SC-FDMA symbols included in one slot, and an ACK/NACK signal is carried on the remaining four SC-FDMA symbols.

In case of an extended CP, the RS may be carried on two consecutive symbols in the middle. The number and location of symbols used for the RS may vary depending on a control channel, and the number and location of symbols used for the ACK/NACK signal related may be changed accordingly.

Both 1-bit and 2-bit acknowledgement information (in a state of not being scrambled) may be expressed as a single HARQ ACK/NACK modulation symbol using the BPSK and QPSK modulation schemes, respectively. Positive acknowledgement (ACK) may be encoded as '1', and negative ACK (NACK) may be encoded as '0'.

When a control signal is transmitted in an allocated bandwidth, two-dimensional spreading is applied to increase a multiplexing capacity. That is, frequency domain spreading and time domain spreading are simultaneously applied to increase the number of UEs or the number of control channels that can be multiplexed.

In order to spread an ACK/NACK signal in the frequency domain, a frequency domain sequence is used as a base sequence. As the frequency domain sequence, a Zadoff-Chu (ZC) sequence which is a kind of CAZAC sequence may be used. For example, multiplexing of different UEs or different control channels can be applied by applying different cyclic shifts (CS) to the ZC sequence which is the base sequence. The number of CS resources supported in SC-FDMA symbols for PUCCH RBs for the HARQ ACK/NACK transmission is configured by a cell-specific higher layer signaling parameter $\Delta_{shift}^{PUCCH}$.

The frequency domain spreading ACK/NACK signal is spread in a time domain using an orthogonal spreading code. A Walsh-Hadamard sequence or a DFT sequence may be used as the orthogonal spreading code. For example, the ACK/NACK signal may be spread using length-4 orthogonal sequences (w0, w1, w2, w3) for four symbols. An RS is also spread through length-3 or length-2 orthogonal sequence. This is referred to as orthogonal covering (OC).

As described above, multiple UEs may be multiplexed in a code division multiplexing (CDM) method using CS resources in the frequency domain and OC resources in the time domain. That is, ACK/NACK information and a RS of a large number of UEs may be multiplexed on the same PUCCH RB.

As to the time domain spreading CDM, the number of spreading codes supported for the ACK/NACK information is limited by the number of RS symbols. That is, since the number of SC-FDMA symbols for RS transmission is less than the number of SC-FDMA symbols for ACK/NACK information transmission, a multiplexing capacity of the RS is less than a multiplexing capacity of the ACK/NACK information.

For example, in case of the normal CP, the ACK/NACK information may be transmitted on four symbols, and not four but three orthogonal spreading codes may be used for the ACK/NACK information. This is because the number of RS transmission symbols is limited to three, and three orthogonal spreading codes only may be used for the RS.

If three symbols in one slot are used for the RS transmission and four symbols are used for the ACK/NACK information transmission in a subframe of the normal CP, for example, if six cyclic shifts (CSs) in the frequency domain and three orthogonal covering (OC) resources in the time domain can be used, HARQ acknowledgement from a total of 18 different UEs may be multiplexed within one PUCCH RB. If two symbols in one slot are used for the RS transmission and four symbols are used for the ACK/NACK information transmission in a subframe of the extended CP, for example, if six cyclic shifts (CSs) in the frequency domain and two orthogonal covering (OC) resources in the time domain can be used, HARQ acknowledgement from a total of 12 different UEs may be multiplexed in one PUCCH RB.

Next, the PUCCH format 1 is described. A scheduling request (SR) is transmitted in such a manner that the UE is requested to be scheduled or is not request. A SR channel reuses an ACK/NACK channel structure in the PUCCH format 1a/1b, and is configured in an on-off keying (OOK) method based on an ACK/NACK channel design. In the SR channel, a reference signal is not transmitted. Thus, length-7 sequence is used in the normal CP, and length-6 sequence is used in the extended CP. Different cyclic shifts or orthogonal covers may be allocated for the SR and the ACK/NACK. That is, the UE transmits HARQ ACK/NACK on resources allocated for the SR for the purpose of positive SR transmission. The UE transmits HARQ ACK/NACK on resources allocated for the ACK/NACK for the purpose of negative SR transmission.

Next, an enhanced-PUCCH (e-PUCCH) format is described. The e-PUCCH format may correspond to PUCCH format 3 of the LTE-A system. A block spreading scheme may be applied to the ACK/NACK transmission using the PUCCH format 3.

PUCCH Piggybacking in Rel-8 LTE

Figure 14:
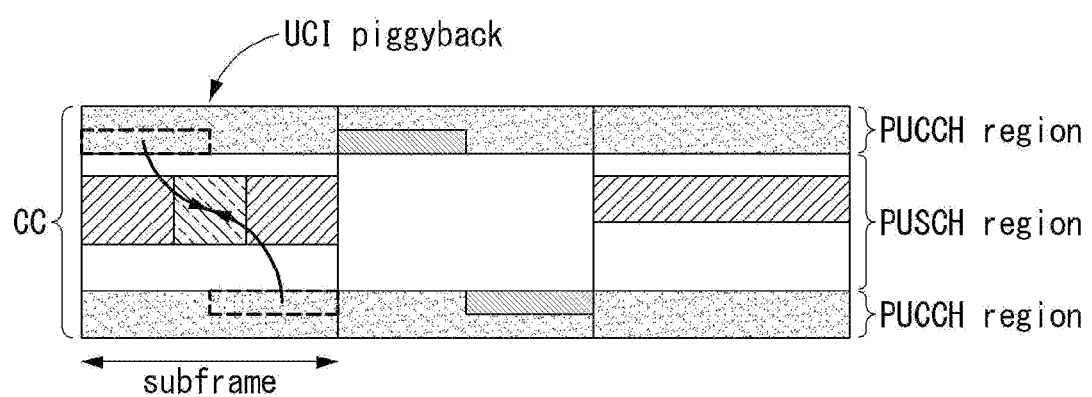
FIG. 14 illustrates an example of transport channel processing of an uplink shared channel (UL-SCH) in a wireless communication system to which the present invention is applicable.

FIG. 14 illustrates an example of transport channel processing of an UL-SCH in a wireless communication system to which the present invention is applicable.

In the 3GPP LTE system (=E-UTRA, Rel. 8), in case of the UL, for efficient utilization of a power amplifier of a terminal, peak-to-average power ratio (PAPR) characteristics or cubic metric (CM) characteristics that affect a performance of the power amplifier are configured so that good single carrier transmission is maintained. That is, in the existing LTE system, the good single carrier characteristics can be maintained by maintaining single carrier characteristics of data to be transmitted through DFT-precoding in case of the PUSCH transmission, and transmitting information carried on a sequence with the single carrier characteristic in case of the PUCCH transmission. However, when DFT-precoded data is non-consecutively allocated to a frequency axis or the PUSCH and the PUCCH are simultaneously transmitted, the single carrier characteristics are degraded. Thus, as illustrated in FIG. 8, when the PUSCH is transmitted in the same subframe as the PUCCH transmission, uplink control information (UCI) to be transmitted to the PUCCH for the purpose of maintaining the single carrier characteristics is transmitted (piggyback) together with the data via the PUSCH.

As described above, because the PUCCH and the PUSCH cannot be simultaneously transmitted in the existing LTE terminal, the existing LTE terminal uses a method that multiplexes uplink control information (UCI) (CQI/PMI, HARQ-ACK, RI, etc.) to the PUSCH region in a subframe in which the PUSCH is transmitted.

For example, when a channel quality indicator (CQI) and/or a precoding matrix indicator (PMI) needs to be transmitted in a subframe allocated to transmit the PUSCH, UL-SCH data and the CQI/PMI are multiplexed before DFT-spreading to transmit both control information and data. In this case, the UL-SCH data performs rate-matching considering CQI/PMI resources. Further, a scheme is used, in which control information such as HARQ ACK and RI punctures the UL-SCH data and is multiplexed to the PUSCH region.

Figure 15:
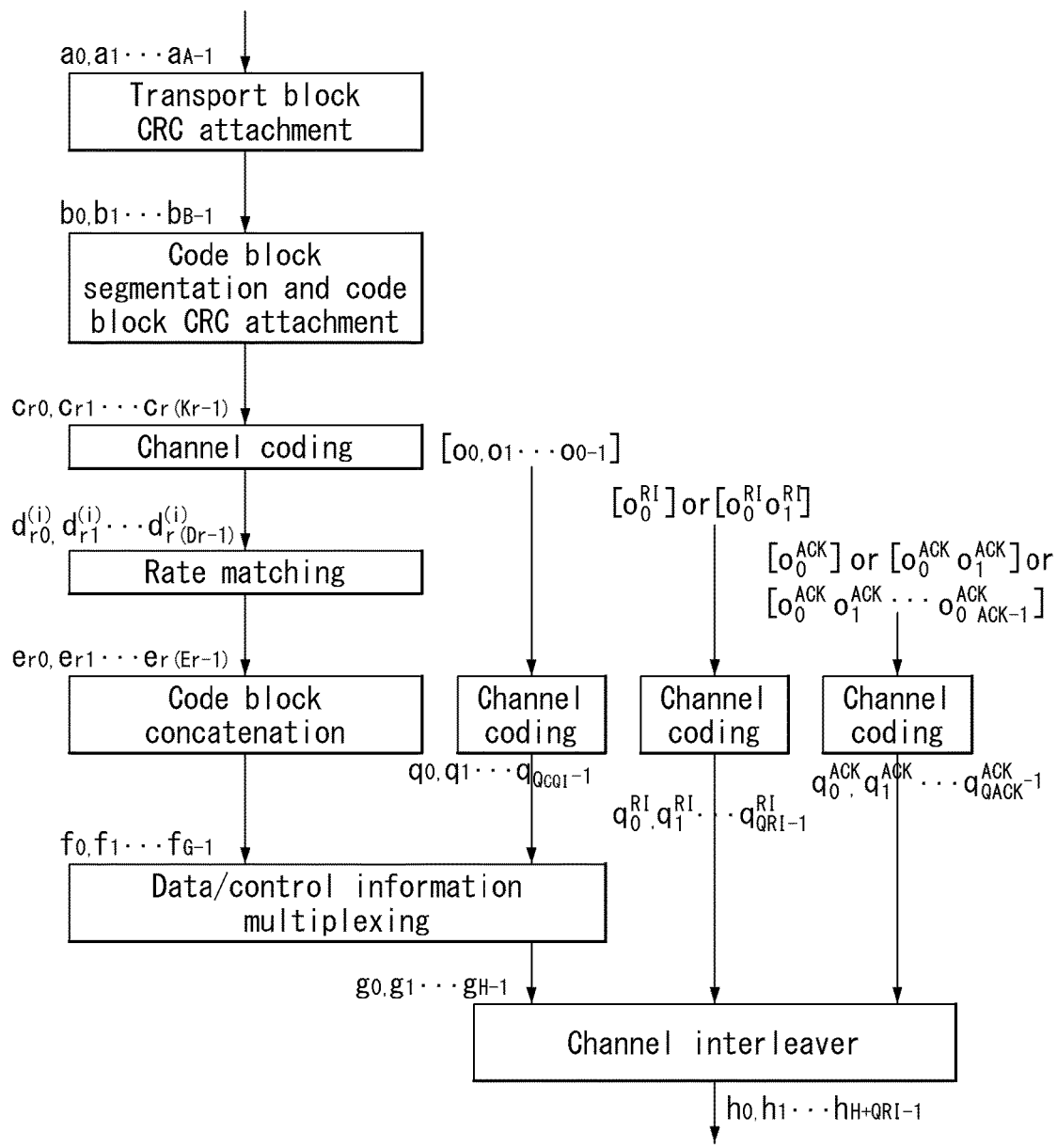
FIG. 15 illustrates an example of signal processing of an uplink shared channel that is a transport channel in a wireless communication system to which the present invention is applicable.

FIG. 15 illustrates an example of signal processing of an uplink shared channel that is a transport channel in a wireless communication system to which the present invention is applicable.

Hereinafter, signal processing of an uplink shared channel (hereinafter, referred to as "UL-SCH") may be applied to one or more transport channels or control information types.

Referring to FIG. 15, the UL-SCH transfers data to a coding unit in the form of a transport block (TB) once every a transmission time interval (TTI).

CRC parity bits $p_0, p_1, p_2, p_3, \ldots, p_{L-1}$ are attached to bits $a_0, a_1, a_2, a_3, \ldots, a_{A-1}$ of a transport block transferred from the upper layer. In this instance, A denotes a size of the transport block, and L denotes the number of parity bits. Input bits, to which the CRC is attached, are denoted by $b_0, b_1, b_2, b_3, \ldots, b_{B-1}$. In this instance, B denotes the number of bits of the transport block including the CRC.

$b_0, b_1, b_2, b_3, \ldots, b_{B-1}$ are segmented into multiple code blocks (CBs) according to the size of the TB, and the CRC is attached to the multiple segmented CBs. Bits after the code block segmentation and the CRC attachment are denoted by $c_{r0}, c_{r1}, c_{r2}, c_{r3}, \ldots, c_{r(K_r-1)}$. Here, r represents No. (r=0, ..., C−1) of the code block, and Kr represents the number of bits depending on the code block r. Further, C represents the total number of code blocks.

Subsequently, channel coding is performed. Output bits after the channel coding are denoted by $d_{r0}^{(i)}, d_{r1}^{(i)}, d_{r2}^{(i)}, d_{r3}^{(i)}, \ldots, d_{r(D_r-1)}^{(i)}$. In this instance, i represents a coded stream index and may have a value of 0, 1, or 2. Dr represents the number of bits of an i-th coded stream for a code block r. r represents a code block number (r=0, ..., C−1), and C represents the total number of code blocks. Each code block may be coded by turbo coding.

Subsequently, rate matching is performed. Bits after the rate matching are denoted by $e_{r0}, e_{r1}, e_{r2}, e_{r3}, \ldots, e_{r(E_r-1)}$. In this case, r represents the code block number (r=0, ..., C−1), and C represents the total number of code blocks. Er represents the number of rate-matched bits of a r-th code block.

Subsequently, concatenation between the code blocks is performed again. Bits after the concatenation of the code blocks is performed are denoted by $f_0, f_1, f_2, f_3, \ldots, f_{G-1}$. In this instance, G represents the total number of bits coded for transmission, and when the control information is multiplexed with the UL-SCH, the number of bits used for the transmission of the control information is not included.

When the control information is transmitted on the PUSCH, channel coding of CQI/PMI, RI, and ACK/NACK which are the control information is independently performed. Because different coded symbols are allocated for the transmission of each control information, each control information has a different coding rate.

In time division duplex (TDD), an ACK/NACK feedback mode supports two modes of ACK/NACK bundling and ACK/NACK multiplexing by higher layer configuration. ACK/NACK information bit for the ACK/NACK bundling consists of 1 bit or 2 bits, and ACK/NACK information bit for the ACK/NACK multiplexing consists of between 1 bit and 4 bits.

After the concatenation between the code blocks, coded bits $f_0, f_1, f_2, f_3, \ldots, f_{G-1}$ of the UL-SCH data and coded bits $q_0, q_1, q_2, q_3, \ldots, q_{N_L \cdot Q_{CQI}-1}$ of the CQI/PMI are multiplexed. The result of multiplexing the data and the CQI/PMI is denoted by $g_0, g_1, g_2, g_3, \ldots, g_{H'-1}$. In this instance, $g_i$ (i=0, ..., H'−1) represents a column vector with a length of $(Q_m \cdot N_L)$, $H=(G+N_L \cdot Q_{CQI})$, and $H'=H/(N_L \cdot Q_m)$. $N_L$ represents the number of layers mapped to a UL-SCH transport block, and H represents the total number of coded bits allocated, for the UL-SCH data and the CQI/PMI information, to $N_L$ transport layers to which the transport block is mapped.

Subsequently, multiplexed data and CQI/PMI, separately channel-coded RI, and ACK/NACK are channel-interleaved to generate an output signal.

PDCCH Assignment Procedure

A plurality of PDCCHs may be transmitted within one subframe. That is, a control region of one subframe consists of a plurality of CCEs having indexes 0 to $N_{CCE,k}-1$, where $N_{CCE,k}$ denotes the total number of CCEs in a control region of a k-th subframe. The UE monitors a plurality of PDCCHs in every subframe. Here, the monitoring means that the UE attempts the decoding of each PDCCH depending on a monitored PDCCH format. The base station does not provide the UE with information about where the corresponding PDCCH is in a control region allocated in a subframe. Since the UE cannot know which position its own PDCCH is transmitted at which CCE aggregation level or DCI format in order to receive a control channel transmitted by the base station, the UE monitors a set of PDCCH candidates in the subframe and searches its own PDCCH. This is called blind decoding/detection (BD). The blind decoding refers to a method, by the UE, for de-masking its own UE identifier (UE ID) from a CRC part and then checking whether a corresponding PDCCH is its own control channel by reviewing a CRC error.

In an active mode, the UE monitors a PDCCH of each subframe in order to receive data transmitted to the UE. In a DRX mode, the UE wakes up in a monitoring interval of each DRX period and monitors a PDCCH in a subframe corresponding to the monitoring interval. A subframe in which the monitoring of the PDCCH is performed is called a non-DRX subframe.

The UE shall perform the blind decoding on all of CCEs present in a control region of the non-DRX subframe in order to receive the PDCCH transmitted to the UE. Since the UE does not know which PDCCH format will be transmitted, the UE shall decode all of PDCCHs at a possible CCE aggregation level until the blind decoding of the PDCCHs is successful within each non-DRX subframe. Since the UE does not know how many CCEs are used for the PDCCH for the UE, the UE shall attempt detection at all the possible CCE aggregation levels until the blind decoding of the PDCCH is successful. That is, the UE performs the blind decoding per CCE aggregation level. That is, the UE first attempts decoding by setting a CCE aggregation level unit to 1. If all the decoding fails, the UE attempts decoding by setting the CCE aggregation level unit to 2. Thereafter, the UE attempts decoding by setting the CCE aggregation level unit to 4 and setting the CCE aggregation level unit to 8. Furthermore, the UE attempts the blind decoding on a total of four of C-RNTI, P-RNTI, SI-RNTI, and RA-RNTI. The UE attempts blind decoding on all the DCI formats that need to be monitored.

As described above, if the UE performs blind decoding on all the possible RNTIs and all the DCI formats, that need to monitored, per each of all the CCE aggregation levels, the number of detection attempts excessively increases. Therefore, in the LTE system, a search space (SS) concept is defined for the blind decoding of the UE. The search space means a set of PDCCH candidates for monitoring, and may have a different size depending on each PDCCH format.

The search space may include a common search space (CSS) and a UE-specific/dedicated search space (USS). In the case of the common search space, all the UEs may be aware of the size of the common search space, but the UE-specific search space may be individually configured to each UE. Thus, the UE must monitor both the UE-specific search space and the common search space in order to decode the PDCCH, and thus performs blind decoding (BD) up to 44 times in one subframe. This does not include blind decoding performed based on a different CRC value (e.g., C-RNTI, P-RNTI, SI-RNTI, RA-RNTI).

There may occur a case where the base station cannot secure CCE resources for transmitting a PDCCH to all the UEs which intend to transmit the PDCCH within a given subframe due to a small search space. This is because resources left over after a CCE location is allocated may not be included in a search space of a specific UE. In order to minimize such a barrier that may continue even in a next subframe, a UE-specific hopping sequence may be applied to the point at which the UE-specific search space starts.

Table 7 represents the size of the common search space and the UE-specific search space.

TABLE 7

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

In order to reduce a computational load of a UE according to the number of times that the UE attempts blind decoding, the UE does not perform search according to all of defined DCI formats at the same time. Specifically, the UE may always perform search for DCI formats 0 and 1A in the UE-specific search space. In this instance, the DCI formats 0 and 1A have the same size, but the UE may distinguish between the DCI formats using a flag for the DCI format 0/format 1A differentiation included in a PDCCH. Furthermore, DCI formats other than the DCI formats 0 and 1A may be required for the UE depending on a PDSCH transmission mode configured by the base station. For example, DCI formats 1, 1B and 2 may be used.

The UE in the common search space may search for the DCI formats 1A and 1C. Furthermore, the UE may be configured to search for the DCI format 3 or 3A. The DCI formats 3 and 3A have the same size as the DCI formats 0 and 1A, but the UE may distinguish between the DCI formats using CRS scrambled by another identifier not a UE-specific identifier.

A search space $S_k^{(L)}$ means a set of PDCCH candidates according to an aggregation level $L \in \{1,2,4,8\}$. A CCE according to a PDCCH candidate set m of the search space may be determined by the following Equation 3.

$$L \cdot \{(Y_k+m) \bmod \lfloor N_{CCE,k}/L \rfloor\}+i \qquad \text{[Equation 3]}$$

Here, $M^{(L)}$ represents the number of PDCCH candidates according to a CCE aggregation level L for monitoring in the search space, and $m=0, \ldots, M^{(L)}-1$. i is an index for designating an individual CCE in each PDCCH candidate, where $i=0, \ldots, L-1$.

As described above, the UE monitors both the UE-specific search space and the common search space in order to decode the PDCCH. Here, the common search space (CSS) supports PDCCHs with an aggregation level of {4, 8}, and the UE-specific search space (USS) supports PDCCHs with an aggregation level of {1, 2, 4, 8}.

Table 8 represents DCCH candidates monitored by a UE.

TABLE 8

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Equation 3, in case of the common search space, $Y_k$ is set to 0 with respect to two aggregation levels L=4 and L=8. On the other hand, in case of the UE-specific search space with respect to an aggregation level L, $Y_k$ is defined as in Equation 4

$$Y_k = (A \cdot Y_{k-1}) \bmod D \qquad \text{[Equation 4]}$$

Here, $Y_{-1}=n_{RNTI}\neq 0$, and an RNTI value used for $n_{RNTI}$ may be defined as one of identifications of the UE. Further, A=39827 D=65537, and $k=\lfloor n_s/2 \rfloor$, where $n_s$ denotes a slot number (or index) in a radio frame.

General ACK/NACK Multiplexing Method

In a situation in which a UE shall simultaneously transmit multiple ACKs/NACKs corresponding to multiple data units received from an eNB, an ACK/NACK multiplexing method based on PUCCH resource selection may be considered to maintain single-frequency characteristics of an ACK/NACK signal and reduce ACK/NACK transmission power.

Together with ACK/NACK multiplexing, contents of ACK/NACK responses for multiple data units are identified by combining a PUCCH resource and a resource of QPSK modulation symbols used for actual ACK/NACK transmission.

For example, if one PUCCH resource transmits 4 bits and up to four data units can be transmitted, an ACK/NACK result can be identified at the eNB as indicated in the following Table 9.

TABLE 9

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In the above Table 9, HARQ-ACK(i) represents an ACK/NACK result for an i-th data unit. In the above Table 9, discontinuous transmission (DTX) means that there is no data unit to be transmitted for the corresponding HARQ-ACK(i) or that the UE does not detect the data unit corresponding to the HARQ-ACK(i). According to the above Table 9, a maximum of four PUCCH resources ($n_{PUCCH,0}^{(1)}$, $n_{PUCCH,1}^{(1)}$, $n_{PUCCH,2}^{(1)}$, and $n_{PUCCH,3}^{(1)}$) are provided, and b(0) and b(1) are two bits transmitted by using a selected PUCCH.

For example, if the UE successfully receives all of four data units, the UE transmits 2-bit (1,1) using $n_{PUCCH,1}^{(1)}$.

If the UE fails in decoding in first and third data units and succeeds in decoding in second and fourth data units, the US transmits bits (1,0) using $n_{PUCCH,3}^{(1)}$.

In ACK/NACK channel selection, if there is at least one ACK, the NACK and the DTX are coupled with each other. This is because a combination of the reserved PUCCH resource and the QPSK symbol may not all ACK/NACK states. However, if there is no ACK, the DTX is decoupled from the NACK.

In this case, the PUCCH resource linked to the data unit corresponding to one definite NACK may also be reserved to transmit signals of multiple ACKs/NACKs.

General ACK/NACK Transmission

In the LTE-A system, it considers to transmit, via a specific UL component carrier (CC), a plurality of ACK/NACK information/signals for a plurality of PDSCHs transmitted via a plurality of DL CCs. To this end, unlike ACK/NACK transmission using PUCCH format 1a/1b in the existing Rel-8 LTE, it may consider to transmit a plurality of ACK/NACK information/signals by channel-coding (e.g., Reed-Muller code, Tail-biting convolutional code, etc.) a plurality of ACK/NACK information and then using PUCCH format 2 or a new PUCCH format (i.e., E-PUCCH format) of the following block spreading based modified type.

A block spreading scheme is a scheme for modulating control signal transmission using an SC-FDMA method, unlike the existing PUCCH format 1 series or 2 series. As illustrated in FIG. 8, a symbol sequence may be spread on a time domain using an orthogonal cover code (OCC) and may be transmitted. Control signals of a plurality of UEs may be multiplexed on the same RB using the OCC. In case of the PUCCH format 2 described above, one symbol sequence is transmitted over the time domain, and the control signals of the plurality of UEs are multiplexed using a cyclic shift (CS) of a CAZAC sequence. On the other hand, in case of the block spreading based PUCCH format (e.g., PUCCH format 3), one symbol sequence is transmitted over a frequency domain, and the control signals of the plurality of UEs are multiplexed using a time domain spreading using the OCC.

Figure 16:
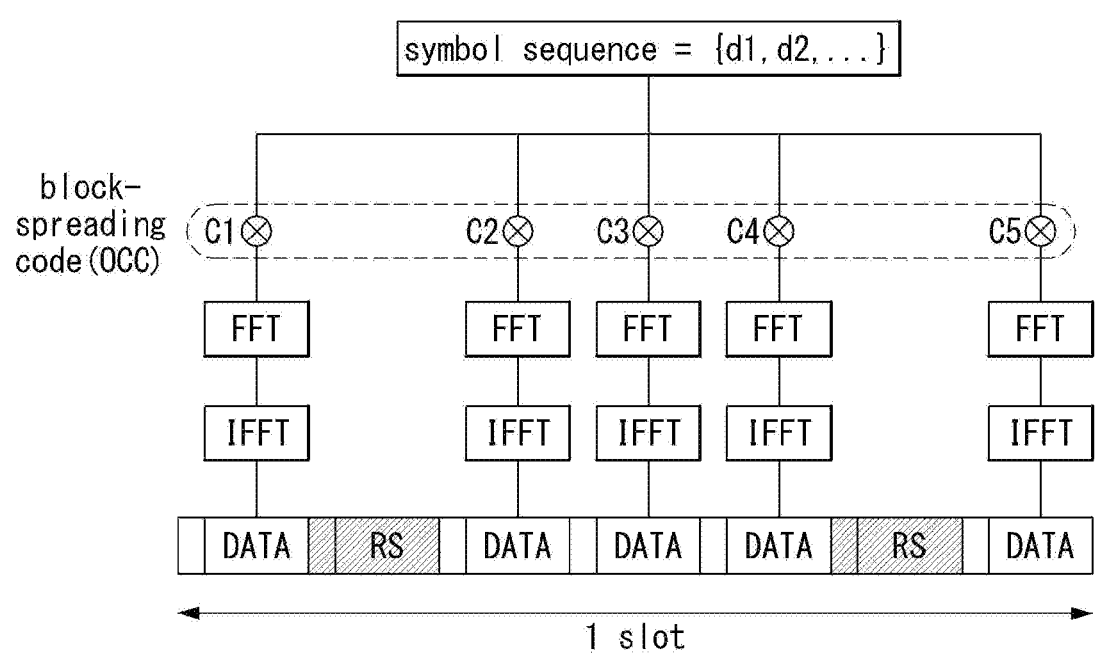
FIG. 16 illustrates an example of generating and transmitting 5 SC-FDMA symbols during one slot in a wireless communication system to which the present invention is applicable.

FIG. 16 illustrates an example of generating and transmitting 5 SC-FDMA symbols during one slot in a wireless communication system to which the present invention is applicable.

FIG. 16 illustrates an example of generating and transmitting five SC-FDMA symbols (i.e., data part) using an OCC of the length 5 (or SF=5) in one symbol sequence during one slot. In this case, two RS symbols may be used during one slot.

In the example of FIG. 16, the RS symbol may be generated from a CAZAC sequence, to which a specific cyclic shift value is applied, and may be transmitted in the form in which a predetermined OCC is applied (or multiplied) over a plurality of RS symbols. Further, in the example of FIG. 8, if it is assumed that 12 modulation symbols are used for each OFDM symbol (or SC-FDMA symbol) and each modulation symbol is generated by QPSK, the maximum number of bits which can be transmitted on one slot is 24 bits (=12×2). Thus, the number of bits which can be transmitted on two slots is a total of 48 bits. If a PUCCH channel structure of the block spreading scheme is used as described above, control information of an extended size can be transmitted as compared to the existing PUCCH format 1 series and 2 series.

For convenience of explanation, such a channel coding based method for transmitting a plurality of ACKs/NACKs using the PUCCH format 2 or the E-PUCCH format is referred to as a multi-bit ACK/NACK coding transmission method. The method refers to a method for transmitting an ACK/NACK coded block generated by channel-coding ACK/NACK information or discontinuous transmission (DTX) information (representing that a PDCCH has not been received/detected) for PDSCHs of a plurality of DL CCs. For example, if the UE operates in a SU-MIMO mode on any DL CC and receives two codewords (CWs), the UE may transmit a total of 4 feedback states of ACK/ACK, ACK/NACK, NACK/ACK, and NACK/NACK per CW on the DL CC, or may have up to 5 feedback states including until DTX. If the UE receives a single CW, the UE may have up to 3 states of ACK, NACK, and DTX (if NACK and DTX are identically processed, the UE may have a total of two states of ACK and NACK/DTX). Thus, if the UE aggregates up to 5 DL CCs and operates in an SU-MIMO mode on all the CCs, the UE may have up to 55 transmittable feedback states, and the size of an ACK/NACK payload for representing these states is a total of 12 bits (if DTX and NACK are identically processed, the number of feedback states is 45, and the size of the ACK/NACK payload for representing these states is a total of 10 bits).

In the above ACK/NACK multiplexing (i.e., ACK/NACK selection) method applied to the existing Rel-8 TDD system, the method may basically consider an implicit ACK/NACK selection method that uses implicit PUCCH resources (i.e., linked to a lowest CCE index) corresponding to PDCCH scheduling each PDSCH of the corresponding UE, in order to secure PUCCH resources of each UE. The LTE-A FDD system basically considers a plurality of ACK/NACK transmissions for a plurality of PDSCHs, which is transmitted via a plurality of DL CCs, via one specific UL CC that is UE-specifically configured. To this end, the LTE-A FDD system considers an ACK/NACK selection method using an implicit PUCCH resource linked to PDCCH (i.e., linked to a lowest CCE index n_CCE, or linked to n_CCE and n_CCE+1) that schedules a specific DL CC, or some of DL CCs, or all DL CCs, or a combination of the corresponding implicit PUCCH resource and an explicit PUCCH resource that is previously reserved to each UE via RRC signaling.

The LTE-A TDD system may also consider a situation in which a plurality of CCs is aggregated (i.e., CA). Hence, it may consider transmitting a plurality of ACK/NACK information/signals for a plurality of PDSCHs, which is transmitted via a plurality of DL subframes and a plurality of CCs, via a specific CC (i.e., AN/CC) in UL subframes corresponding to the corresponding plurality of DL subframes. In this instance, unlike the LTE-A FDD system mentioned above, the LTE-A TDD system may consider a method (i.e., full ACK/NACK) for transmitting a plurality of ACKs/NACKs corresponding to the maximum number of CWs, that can be transmitted via all the CCs assigned to the UE, in all of a plurality of DL subframes (i.e., SFs), or a method (i.e., bundles ACK/NACK) for transmitting ACKs/NACKs by applying ACK/NACK bundling to CW and/or CC and/or SF domain to reduce the total number of ACKs/NACKs to be transmitted (here, the CW bundling means that ACK/NACK bundling for CW is applied to each DL SF per each CC, the CC bundling means that ACK/NACK bundling for all or some of CCs is applied to each DL SF, and the SF bundling means that ACK/NACK bundling for all or some of DL SFs is applied to each CC. Characteristically, as a SF bundling method, it may consider an ACK-counter method which informs the total number of ACKs (or the number of some of the ACKs) per CC with respect to all PDSCHs or DL grant PDCCHs received for each CC). In this instance, a multi-bit ACK/NACK coding or an ACK/NACK selection based ACK/NACK transmission method may be configurably applied according to a size of an ACK/NACK payload per UE, i.e., a size of an ACK/NACK payload for full or bundled ACK/NACK transmission that is configured for each UE.

ACK/NACK Transmission for LTE-A

The LTE-A system supports transmitting, via a specific UL CC, a plurality of ACK/NACK information/signals for a plurality of PDSCHs which are transmitted via a plurality of DL CCs. To this end, unlike ACK/NACK transmission using PUCCH format 1a/1b in the existing Rel-8 LTE, a plurality of ACK/NACK information may be transmitted through a PUCCH format 3.

Figure 17:
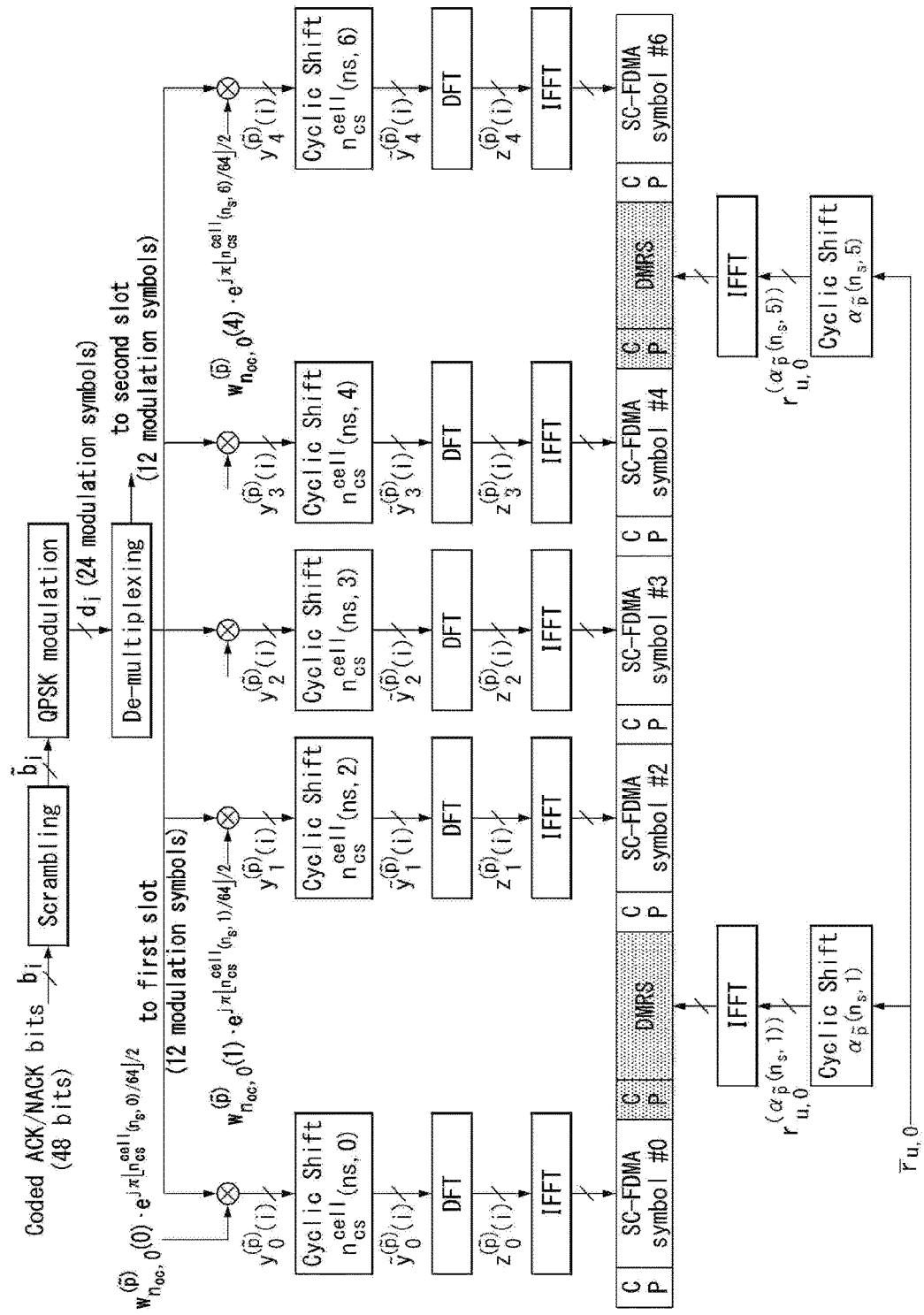
FIG. 17 illustrates an ACK/NACK channel structure for PUCCH format 3 with a normal CP.

FIG. 17 illustrates an ACK/NACK channel structure for PUCCH format 3 with a normal CP.

As illustrated in FIG. 17, a symbol sequence is transmitted by time-domain spreading by an orthogonal cover code (OCC) and may multiplex control signals of multiple UEs on the same RB using the OCC. In the PUCCH format 2 mentioned above, one symbol sequence is transmitted over a time domain and performs the UE multiplexing using a cyclic shift of a CAZAC sequence. On the other hand, in case of the PUCCH format 3, one symbol sequence is transmitted over a frequency domain and performs the UE multiplexing using the time-domain spreading based on the OCC. FIG. 17 illustrates a method for generating and transmitting five SC-FDMA symbols from one symbol sequence using OCC of length-5 (spreading factor=5). In an example of FIG. 17, a total of two RS symbols have been used during one slot, but various applications including a method of using three RS symbols and using the OCC of spreading factor=4, etc. may be considered. Here, the RS symbol may be generated from a CAZAC sequence with a specific cyclic shift and may be transmitted in the form in which a specific OCC is applied (or multiplied) to a plurality of RS symbols of the time domain. In the example of FIG. 17, if it is assumed that 12 modulation symbols are used for each SC-FDMA symbol and each modulation symbol uses QPSK, the maximum number of bits which can be transmitted on each slot is 24 bits (=12×2). Thus, the number of bits which can be transmitted on two slots is a total of 48 bits.

For convenience of explanation, such a channel coding based method for transmitting a plurality of ACKs/NACKs using the PUCCH format 2 or the E-PUCCH format is referred to as a "multi-bit ACK/NACK coding" transmission method. The method refers to a method for transmitting an ACK/NACK coded block generated by channel-coding ACK/NACK information or DTX information (representing that a PDCCH has not been received/detected) for PDSCHs of a plurality of DL CCs. For example, if the UE operates in a SU-MIMO mode on any DL CC and receives two codewords (CWs), the UE may transmit a total of 4 feedback states of ACK/ACK, ACK/NACK, NACK/ACK, and NACK/NACK per CW on the DL CC, or may have up to 5 feedback states including until DTX. If the UE receives a single CW, the UE may have up to 3 states of ACK, NACK, and DTX (if NACK and DTX are identically processed, the UE may have a total of two states of ACK and NACK/DTX). Thus, if the UE aggregates up to 5 DL CCs and operates in an SU-MIMO mode on all the CCs, the UE may have up to 55 transmittable feedback states, and the size of an ACK/NACK payload for representing these states is a total of 12 bits (if DTX and NACK are identically processed, the number of feedback states is 45, and the size of the ACK/NACK payload for representing these states is a total of 10 bits).

In the above ACK/NACK multiplexing (i.e., ACK/NACK selection) method applied to the existing Rel-8 TDD system, the method may basically consider an implicit ACK/NACK selection method that uses implicit PUCCH resources (i.e., linked to a lowest CCE index) corresponding to PDCCH scheduling each PDSCH of the corresponding UE, in order to secure PUCCH resources of each UE. The LTE-A FDD system basically considers a plurality of ACK/NACK transmissions for a plurality of PDSCHs, which is transmitted via a plurality of DL CCs, via one specific UL CC that is UE-specifically configured. To this end, the LTE-A FDD system considers an "ACK/NACK selection" method using an implicit PUCCH resource linked to PDCCH (i.e., linked to a lowest CCE index n_CCE, or linked to n_CCE and n_CCE+1) that schedules a specific DL CC, or some of DL CCs, or all DL CCs, or a combination of the corresponding implicit PUCCH resource and an explicit PUCCH resource that is previously reserved to each UE via RRC signaling.

The LTE-A TDD system may also consider a situation in which a plurality of CCs is aggregated (i.e., CA). Hence, it may consider transmitting a plurality of ACK/NACK information/signals for a plurality of PDSCHs, which is transmitted via a plurality of DL subframes and a plurality of CCs, via a specific CC (i.e., AN/CC) in UL subframes corresponding to the corresponding plurality of DL subframes. In this instance, unlike the LTE-A FDD system mentioned above, the LTE-A TDD system may consider a method (i.e., full ACK/NACK) for transmitting a plurality of ACKs/NACKs corresponding to the maximum number of CWs, that can be transmitted via all the CCs assigned to the UE, in all of a plurality of DL subframes (i.e., SFs), or a method (i.e., bundles ACK/NACK) for transmitting ACKs/NACKs by applying ACK/NACK bundling to CW and/or CC and/or SF domain to reduce the total number of ACKs/NACKs to be transmitted (here, the CW bundling means that ACK/NACK bundling for CW is applied to each DL SF per each CC, the CC bundling means that ACK/NACK bundling for all or some of CCs is applied to each DL SF, and the SF bundling means that ACK/NACK bundling for all or some of DL SFs is applied to each CC. Characteristically, as a SF bundling method, it may consider an "ACK-counter" method which informs of the total number of ACKs (or the number of some ACKs) per CC for all PDSCHs or DL grant PDCCHs received for each CC). In this instance, a "multi-bit ACK/NACK coding" or an "ACK/NACK selection" based ACK/NACK transmission method may be configurably applied according to a size of an ACK/NACK payload per UE, i.e., a size of an ACK/NACK payload for the full or bundled ACK/NACK transmission that is configured for each UE.

The next-generation wireless communication system has aimed to use a wide frequency band and support various services or requirements. For example, in New Radio (NR) requirements of 3GPP, in case of Ultra Reliable and Low Latency Communications (URLLC) that is one of representative scenarios, it may require low latency high reliability requirements in which a user plane delay time of 0.5 ms and X-bite data have to be transmitted within an error rate of 10^−5 within 1 ms.

A traffic of the URLLC has a file size within tens to hundreds of bytes and sporadically occurs, unlike enhanced Mobile Broadband (eMBB) with a large traffic capacity.

Thus, the eMBB requires a transmission capable of maximizing a transfer rate and minimizing an overhead of control information, whereas the URLLC requires a transmission method with a short scheduling time unit and the reliability.

An assumption to transmit and receive a physical channel and/or a reference time unit used may be variously configured according an applied field or a type of traffic. The reference time may be a base unit for scheduling a specific physical channel. The reference time unit may vary depending on the number of symbols constituting a corresponding scheduling unit and/or a subcarrier spacing, or the like.

The present specification is described based on a slot and a mini-slot as a reference time unit for convenience of explanation. For example, the slot may be a scheduling base unit used in a normal data traffic (e.g., eMBB).

The mini-slot may have a shorter time duration than a slot in the time domain. The mini-slot may be a scheduling base unit used in a traffic of more special purpose or a communication scheme (e.g., URLLC, unlicensed band or millimeter wave, etc.).

However, this is merely an example. Even if the eMBB transmits and receives the physical channel based on the mini-slot and/or even if the URLLC or other communication schemes transmit and receive the physical channel based on the slot, it is obvious that methods proposed by the present specification can be extended and applied.

Hereinafter, the present specification proposes a method (hereinafter, first embodiment) for reinterpreting an existing field so that information related to physical downlink shared channel (PDSCH) repetition is indicated, a method (hereinafter, second embodiment) for interpreting CFI according to whether an operation related to PDSCH repetition is enabled or not, a method (hereinafter, third embodiment) for determining PUCCH resources for transmitting HARQ-ACK, a method (hereinafter, fourth embodiment) for reporting whether PDSCH decoding for a specific TTI is enabled or not within a specific time duration, a method (hereinafter, fifth embodiment) for indicating and/or configuring whether to report HARQ-ACK for PDSCH, a method (hereinafter, sixth embodiment) for configuring and/or reporting whether an operation for supporting specific latency and/or reliability requirements is enabled or not, a method (hereinafter, seventh embodiment) for improving reliability of PDSCH repetition reception when there occurs a TTI that cannot transmit downlink data in a PDSCH repetition operation, a method (hereinafter, eighth embodiment) for determining and/or configuring whether to allow DL DMRS sharing for a TTI over a plurality of consecutive subframes, a method (hereinafter, ninth embodiment) for solving a reduction in PDSCH reception reliability according to a different subframe type in a PDSCH repetition operation, a method (hereinafter, tenth embodiment) for reducing time latency according to an invalid TTI in a PDSCH repetition transmission, and a method (hereinafter, eleventh embodiment) for solving a reduction in PDSCH reception reliability according to a decoding error of a PCFICH in a PDSCH repetition operation.

The following embodiments described in the present specification are merely distinguished for convenience of explanation, and thus it is obvious that a partial method and/or a partial configuration, etc. of any embodiment can be replaced by or combined with methods and/or configurations, etc. of other embodiments.

A slot, a subframe, a frame, etc. mentioned in the following embodiments described in the present specification may correspond to detailed examples of a time unit used in a wireless communication system. That is, when methods proposed by the present specification are applied, the time units can be replaced by other time units applied to other wireless communication systems.

First Embodiment

A method for reinterpreting an existing field so that information related to physical downlink shared channel (PDSCH) repetition is indicated is described.

To improve transmission reliability of the PDSCH, a method (i.e., blind/HARQ-less PDSCH repetition) may be considered to repeatedly transmit a PDSCH over a plurality of transmission time intervals (TTIs) for the same transport block (TB) without transmission of HARQ (Hybrid Automatic Repeat and request)-ACK (Acknowledgement). The repetition of the same TB may be scheduled by indicating the number of repetitions in downlink control information (DCI). Alternatively, the repetition of the same TB may be scheduled by configuring the number of repetitions via a higher layer signal. Alternatively, the repetition of the same TB may be scheduled by using the same HARQ process ID and/or a non-toggled new data indicator (NDI) for the TTI (within successive or specific time duration).

A transmission performance of the PDSCH may depend on how accurately the PDSCH can be decoded. This is because it is virtually impossible that the decoding of the PDCCH scheduling it also succeeds when the decoding of the PDCCH fails.

If a method of adding a DCI field for the repetition operation is considered, the method may not be desirable since it may increase a payload of the PDCCH, and as a result, reduce a decoding performance of the PDSCH. Thus, to avoid a reduction in the PDCCH decoding performance and/or avoid additional blind decoding (BD) attempt of the UE, it may be preferable to maintain the existing DCI format size.

Accordingly, for example, a rule may be defined, promised, and/or configured so that information about whether there is PDSCH repetition and/or the number of PDSCH repetitions is indicated using fields such as HARQ process ID, redundancy version (RV), NDI, transmit power control (TPC) command, downlink assignment index (DAI), and/or acknowledgement resource indicator (ARI). In other words, a rule may be defined, promised, and/or configured so that information about whether there is PDSCH repetition/the number of PDSCH repetitions is indicated without an additional field from the existing DCI format and/or without change in the size (and/or without configuration of additional BD as compared to the existing BD) by reinterpreting a part of the fields. Here, the reinterpretation may mean interpreting a specific field value as a value of the information about whether there is PDSCH repetition/the PDSCH repetition number.

Here, the fields such as HARQ process ID, RV, NDI, TPC command, DAI, and/or ARI are fields related to HARQ feedback. If low latency requirement is 1 ms, the fields can be reinterpreted and used for an indication of other information because (retransmission by) HARQ-ACK feedback does not need to be considered. Whether a UE has to perform an operation of reinterpreting the specific field(s) and indicating the information about whether there is PDSCH repetition and/or the number of PDSCH repetitions may be configured via the higher layer signal. Alternatively, only if the blind/HARQ-less PDSCH repetition operation is enabled via the higher layer signal, a rule may be defined, promised, and/or configured so that information about whether there is PDSCH repetition and/or the number of PDSCH repetitions is indicated by reinterpreting a part of the specific field.

And/or, a rule may be defined, promised, and/or configured so that inter-TTI hopping related information of the PDSCH being repeated is indicated without an additional field from the existing DCI format and/or without change in the size (and/or without configuration of additional BD as compared to the existing BD) by reinterpreting a part of the fields. A frequency diversity gain can be expected trough the inter-TTI hopping. Hence, the decoding performance of the PDSCH being repeated can be further improved.

When an operation of reinterpreting a part of the fields and indicating the inter-TTI hopping related information of the PDSCH being repeated without an additional field from the existing DCI format and/or without change in the size (and/or without configuration of additional BD as compared to the existing BD) is performed, whether the corresponding operation is performed may be configured to the UE via the higher layer signal. Alternatively, only if the blind/HARQ-less PDSCH repetition operation is enabled via the higher layer signal, a rule may be defined, promised, and/or configured so that the inter-TTI hopping related information of the PDSCH being repeated is indicated by reinterpreting a part of the fields. Here, an example of the inter-TTI hopping related information may include (pattern/offset) information about which frequency resource is used in each TTI when the same TB is repeatedly transmitted in a plurality of TTIs.

And/or, if an inter-TTI hopping operation of the PDSCH is configured and/or indicated, a field indicating DMRS sharing may be reinterpreted. If the inter-TTI hopping operation of the PDSCH being repeated is configured and/or indicated, a DMRS sharing operation may not be desirable. The plurality of TTIs, to which the DMRS sharing is to be applied, has to use at least the same precoding resource block group (PRG), but the hopping operation for obtaining the frequency diversity gain has to use as many different frequency resources as possible. Therefore, if the inter-TTI hopping operation of the PDSCH being repeated is configured and/or indicated, a rule may be defined, promised, and/or configured so that information about whether there is PDSCH repetition and/or the number of PDSCH repetitions and/or inter-TTI hopping related information of the PDSCH being repeated are indicated by reinterpreting a field indicating the DMRS sharing.

Second Embodiment

A method for interpreting CFI according to whether or not an operation related to PDSCH repetition is enabled is described.

Reliability of URLLC transmission and reception may be affected by reliability of a control channel and, particularly, may be greatly affected by a physical control format indicator channel (PCFICH) decoding performance. If a UE erroneously decodes a PCFICH and erroneously recognizes a control channel region (e.g., the number of symbols occupied by a control channel), it may adversely affect the reliability of the control channel, and (in case of a sub slot operation) the UE may understand a downlink (DL) TTI boundary differently from a base station and perform the decoding. To prevent it, a method for configuring information about the control channel region to the UE via a higher layer signal is considered.

Accordingly, the UE may determine whether to follow a control format indicator (CFI) value based on the PCFICH or a CFI value configured via the higher layer signal through the following methods.

The following methods described in the second embodiment are merely distinguished for convenience of explanation, and thus it is obvious that configuration of any method can be replaced by or combined with configurations of other methods.

(Method 1)

When whether blind/HARQ-less PDSCH (or HARQ-less and/or blind PDSCH) repetition operation is enabled is defined by the higher layer signal, and/or whether an operation indicating information about whether there is PDSCH repetition and/or the number of PDSCH repetitions through the reinterpretation of a specific field of the existing DCI format as described in the first embodiment is enabled is defined, promised, and/or configured by the higher layer signal, and/or whether an operation indicating inter-TTI hopping related information of PDSCH being repeated through the reinterpretation of a specific field is enabled is defined, promised, and/or configured by the higher layer signal, the UE may differently determine whether to follow a CFI value based on the PCFICH or a CFI value configured via the higher layer signal. That is, a rule may be defined so that the UE follows the CFI value configured via the higher layer signal if blind/HARQ-less PDSCH repetition operation is enabled by the higher layer signal, and the UE follows the CFI value based on the PCFICH if the blind/HARQ-less PDSCH repetition operation is not enabled.

(Method 2)

A rule may be defined so that the UE follows the CFI value configured via the higher layer signal if an operation indicating information about whether there is PDSCH repetition and/or the number of PDSCH repetitions through the reinterpretation of a specific field of the existing DCI format is enabled by the higher layer signal, and the UE follows the CFI value based on the PCFICH if the operation is not enabled.

(Method 3)

A CFI interpretation method of the UE may be differently determined in a case in which the number of PDSCH repetitions is equal to or less than a predetermined number and remaining cases. If the number of PDSCH repetitions is high, it may mean that the larger number of PDSCH repetitions is required, and may also be interpreted that channel condition is not good. In this case, the UE may prefer to use a value previously configured via the higher layer signal as the CFI value rather than depending on the PCFICH decoding. Thus, a rule may be defined so that the UE follows the CFI value based on the PCFICH if the number of PDSCH repetitions is equal to or less than the predetermined number, and the UE follows the CFI value configured via the higher layer signal if the number of PDSCH repetitions exceeds the predetermined number.

(Method 4)

A rule may be defined so that the UE follows the CFI value configured via the higher layer signal if an operation indicating inter-TTI hopping related information of PDSCH being repeated through the reinterpretation of a specific field of the existing DCI format by the higher layer signal is enabled, and the UE follows the CFI value based on the PCFICH if the operation is not enabled.

(Method 5)

If a payload of the DCI is to be reduced further than the existing one in order to improve PDCCH reliability (i.e., compact DCI introduction), a rule may be defined so that the UE follows the CFI value configured via the higher layer signal within a TTI, in which the monitoring for such a DCI format is configured, or within a subframe including the corresponding TTI, and the UE follows the CFI value based on the PCFICH within a TTI, in which the monitoring for the DCI format is not configured, or within a subframe including the corresponding TTI.

Third Embodiment

A method for determining PUCCH resources for transmitting HARQ-ACK is described.

If information about whether there is PDSCH repetition and/or the number of PDSCH repetitions, or inter-TTI hopping related information is indicated through reinterpretation of an ARI field of the existing DCI format, ambiguity may occur when the UE determines a HARQ-ACK resource.

A rule may be defined, promised, and/or configured as in the following methods in order to prevent the ambiguity.

The following methods described in the third embodiment are merely distinguished for convenience of explanation, and thus it is obvious that configuration of any method can be replaced by or combined with configurations of other methods.

(Method 1)

If information about whether there is PDSCH repetition and/or the number of PDSCH repetitions, or inter-TTI hopping related information is indicated through reinterpretation of an ARI field of the existing DCI format, a rule may be defined, promised, and/or configured so that the UE transmits HARQ-ACK using a PUCCH resource that is separately defined in advance.

(Method 2)

If information about whether there is PDSCH repetition and/or the number of PDSCH repetitions, or inter-TTI hopping related information is indicated through reinterpretation of an ARI field of the existing DCI format, a rule may be defined, promised, and/or configured so that the UE uses a resource that is previously promised (e.g., linked to a first state or linked to a first state among resources to which a specific PUCCH format is configured) among PUCCH resources linked to each state of an ARI.

(Method 3)

If information about whether there is PDSCH repetition and/or the number of PDSCH repetitions, or inter-TTI hopping related information is indicated through reinterpretation of an ARI field of the existing DCI format, a rule may be defined, promised, and/or configured so that the UE uses a PUCCH resource linked to a specific control channel element (CCE) index (e.g., lowest CCE index).

And/or, if information about whether there is PDSCH repetition and/or the number of PDSCH repetitions, or inter-TTI hopping related information is indicated through reinterpretation of a TPC field of the existing DCI format, a rule may be defined, promised, and/or configured so that a TPC command is regarded as 0 dB (i.e., no adjustment). And/or, if accumulation due to the TPC command is not enabled, a specific absolute power value, that is promised and/or configured in advance, is applied.

Fourth Embodiment

A method for reporting whether PDSCH decoding for a specific TTI is enabled or not within a specific time duration is described.

In a situation in which an operation of repeatedly transmitting a data channel over a plurality of TTIs for the same TB as described in the first embodiment is considered, when a UE can perform PDSCH decoding for a specific TTI within a specific time duration, the processing of the UE for the data channel repeatedly transmitted at a subsequent TTI may not be necessary (or unavailable) if the UE successfully performs the decoding. Thus, the UE can expect power saving by skipping the processing after the decoding success.

In other words, a rule may be defined, promised, and/or configured so that whether the UE can perform the PDSCH decoding for the specific TTI within the specific time duration may be defined by a capability of the UE, and it is reported to a base station (or network).

Here, the "specific time duration" may be a time from after a PDSCH reception time to a next TTI (or corresponding TTI after a previously defined/configured time) for the repeatedly transmitted PDSCH. Alternatively, the specific time duration may be a time from after a PDSCH reception time to a scheduling PDCCH reception time for the repeatedly transmitted PDSCH. The specific time duration may be previously defined or indicated together when the UE reports the capability. And/or, when a plurality of specific time durations is defined and/or indicated, the UE may independently report whether to perform the PDSCH decoding for the specific TTI per each of the plurality of specific time durations And/or, a HARQ-ACK transmission operation of the UE may be determined differently according to the capability about whether the UE can perform the PDSCH decoding for the specific TTI within the specific time duration and/or a configuration of the base station for the corresponding operation. When the UE can perform the PDSCH decoding for the specific TTI within the specific time duration or the corresponding operation is configured, if the UE succeeds in the PDSCH decoding, the UE may perform HARQ-ACK feedback at a timing after a previously promised and/or configured processing time from a successful PDSCH reception time, and may not be required to perform the decoding on the PDSCH subsequently repeatedly transmitted. Further, the UE may not be required to perform buffering and/or combining on the PDSCH subsequently repeatedly transmitted, and may not be required to perform HARQ-ACK transmission on the PDSCH subsequently repeatedly transmitted. On the other hand, in case of a UE without the capability or a UE to which the corresponding operation is not configured, a rule may be defined, promised, and/or configured so that the UE performs the combining on the PDSCH repeatedly transmitted at a plurality of TTIs and then performs the HARQ-ACK feedback corresponding to a last PDSCH reception TTI.

And/or, a HARQ-ACK transmission operation of the UE may be determined differently according to the capability of the UE about whether the UE can perform the combining processing on the repeatedly transmitted PDSCH and/or a configuration of the base station for the corresponding operation. A rule may be defined, promised, and/or configured so that in case of a UE supporting the combining or a UE to which the combining is configured, the UE performs the combining on the PDSCH repeatedly transmitted at a plurality of TTIs and then performs the HARQ-ACK feedback corresponding to a last PDSCH reception TTI, and if not, the UE individually performs the HARQ-ACK feedback corresponding to each PDSCH received at each TTI.

Fifth Embodiment

A method for indicating and/or configuring whether to report HARQ-ACK for PDSCH is described.

Whether an operation (e.g., blind/HARQ-less PDSCH repetition) for supporting specific latency and/or reliability requirements is enabled may be configured via a higher layer signal. And/or, whether to support latency and/or reliability requirements may be configured via the higher layer signal. A UE which is subjected to the configuration may not need retransmission and/or HARQ-ACK report according to latency requirements.

If it is assumed that information about whether there is PDSCH repetition and/or the number of PDSCH repetitions is dynamically indicated to the UE, it may not be preferable that whether there is HARQ-ACK report is determined via the higher layer signal. For example, even if blind/HARQ-less PDSCH repetition for supporting specific latency and/or reliability requirements has been configured via the higher layer signal, a base station does not need to support the corresponding latency and/or reliability requirements according to a type of traffic and may require a retransmission operation without repetition and/or via HARQ-ACK.

Accordingly, a rule may be defined, promised, and/or configured so that whether the UE reports HARQ-ACK for a specific PDSCH via a physical layer signal is indicated.

The above rule may be applied only when the operation (e.g., blind/HARQ-less PDSCH repetition) for supporting specific latency and/or reliability requirements is enabled via the higher layer signal. If the dynamic indication indicates the HARQ-ACK report, a rule may be defined, promised, and/or configured so that the UE reports HARQ-ACK for a repetition bundle of the PDSCH or reports HARQ-ACK for all (or a part) of each PDSCH corresponding to the repetition bundle. On the other hand, if the dynamic indication indicates that the HARQ-ACK is not reported, a rule may be defined, promised, and/or configured so that the UE decodes a repetition bundle of the PDSCH, but does not report the HARQ-ACK.

Whether there is HARQ-ACK report may be indicated and/or configured by an explicitly added bit field (e.g., dynamic indication field). Even in this case, the field may be added only when the operation (e.g., blind/HARQ-less PDSCH repetition) for supporting specific latency and/or reliability requirements is enabled via the higher layer signal.

And/or, whether there is HARQ-ACK report may be determined by the reinterpretation of the existing DCI field.

And/or, whether there is HARQ-ACK report may be determined by the number of PDSCH repetitions. For example, when the PDSCH repetition number is equal to or less than a predetermined number, a rule may be defined, promised, and/or configured so that the UE reports the HARQ-ACK for the repetition bundle or reports HARQ-ACK for all (or a part) of each PDSCH corresponding to the repetition bundle. On the other hand, when the PDSCH repetition number exceeds the predetermined number, a rule may be defined, promised, and/or configured so that the UE decodes a repetition bundle of the PDSCH, but does not report the HARQ-ACK.

Sixth Embodiment

A method for configuring and/or reporting whether an operation for supporting specific latency and/or reliability requirements is enabled is described in detail.

Whether an operation (e.g., blind/HARQ-less PDSCH (or HARQ-less and/or blind PDSCH) repetition and/or UL SPS (semi-persistent) scheduling with repetition) for supporting specific latency and/or reliability requirements is enabled may be configured via a higher layer signal. Further, whether the operation is enable may be independently configured per TTI length or DL & UL TTI length combination. Alternatively, whether the operation is enable may be independently (differently) defined per frame structure and may be configured to a UE.

And/or, information about whether able to support the operation (e.g., blind/HARQ-less PDSCH repetition and/or UL SPS with repetition) for supporting specific latency and/or reliability requirements (on how many carrier components (CCs) and/or cells) may be defined by UE capability and reported to a base station (or a network).

The information may be independently reported per TTI length (group) or DL & UL TTI length combination (group). For example, separate UE capability may be defined for each of {DL=subslot, UL=subslot}, {DL=subslot, UL=slot}, {DL=slot, UL=slot}, {DL=subframe, UL=subframe}, etc.

Alternatively, the UE capability may be independently (differently) defined per frame structure and reported to the base station (or the network). Alternatively, the UE capability may be separately independently defined per band and/or band combination.

And/or, if the UE reports the UE capability, the base station may decide how much operation is supported by the corresponding UE based on the UE capability and may be configured and/or operated so that the reported operation and/or a specific operation of the reported operation are enabled. For example, the specific operation may include differently interpreting a DCI field, adding a specific field to the existing DCI, DCI monitoring method/the number of BDs, a BD operation for a specific DCI format, repeatedly transmitted PDSCH reception and/or decoding, and a HARQ-ACK transmission operation for a last PDSCH, and the like.

In particular, a rule may be defined, promised, and/or configured so that the UE capability about whether able to support the operation (e.g., blind/HARQ-less PDSCH repetition and/or UL SPS with repetition) for supporting the specific latency and/or the reliability requirements (on how many carrier components (CCs) and/or cells) is defined and reported by only a UE supporting an operation of receiving DL control and data based on the fact that the number of symbols of a control region (in a specific cell) is configured via the higher layer signal.

That is, in case of a UE not supporting the operation of receiving DL control and data based on the fact that the number of symbols of the control region (in the specific cell) is configured via the higher layer signal, the UE cannot always support the operation (e.g., blind/HARQ-less PDSCH repetition and/or UL SPS with repetition) for supporting the specific latency and/or the reliability requirements.

On the other hand, in case of a UE supporting the operation of receiving DL control and data based on the fact that the number of symbols of the control region (in the specific cell) is configured via the higher layer signal, whether to support the operation (e.g., blind/HARQ-less PDSCH repetition and/or UL SPS with repetition) for supporting the specific latency and/or the reliability requirements may be reported via capability signaling.

Seventh Embodiment

First, a method for improving reliability of PDSCH repetition reception when there occurs a TTI that cannot transmit downlink data in a PDSCH repetition operation is described.

When whether blind/HARQ-less PDSCH (or HARQ-less and/or blind PDSCH) repetition operation is enabled is defined, promised, and/or configured by a higher layer signal, information (i.e., repetition number) related to the number of physical downlink shared channel (PDSCH) repetitions may be indicated and/or transmitted from a base station to a UE via a physical layer signal. The UE may know for how many TTIs the PDSCH for the same transport block (TB) is repeated and transmitted based on information related to a PDSCH repetition number and may perform a reception operation. For example, the information related to the PDSCH repetition number may be the total transmission TTI number of PDSCH scheduled by the corresponding PDCCH, including a transmission time interval (TTI) of a PDCCH reception time.

If it is impossible that a first short TTI (e.g., subslot #0) in a subframe transmits DL data by a control format indicator (CFI) value configured via a physical control format indicator channel (PCFICH) or the higher layer signal (i.e., if the PDSCH cannot be transmitted to the subslot #0), the UE and the base station may have different interpretations for TTIs actually performing the PDSCH repetition transmission depending on whether the corresponding TTI (e.g., subslot) is included in the total transmission TTI number of PDSCH repetition indicated by the information related to the PDSCH repetition number. Here, "# number" may denote an index. For example, the subslot #0 may denote a subslot with an index 0 in a subframe.

Figure 18A:
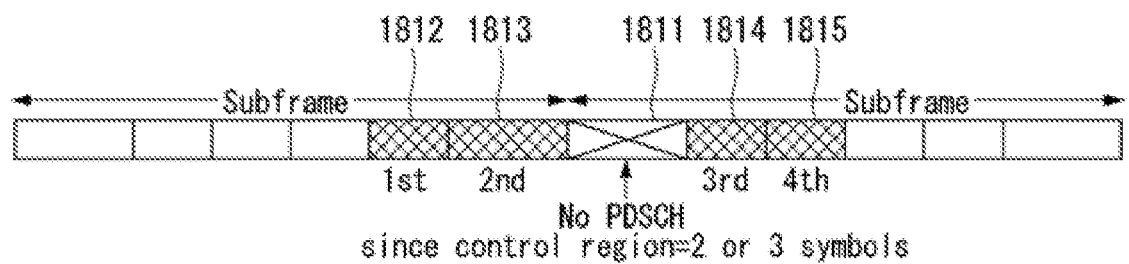
FIGS. 18A and 18B illustrate a problem of reliability reduction in a PDSCH repetition operation.
Figure 18B:
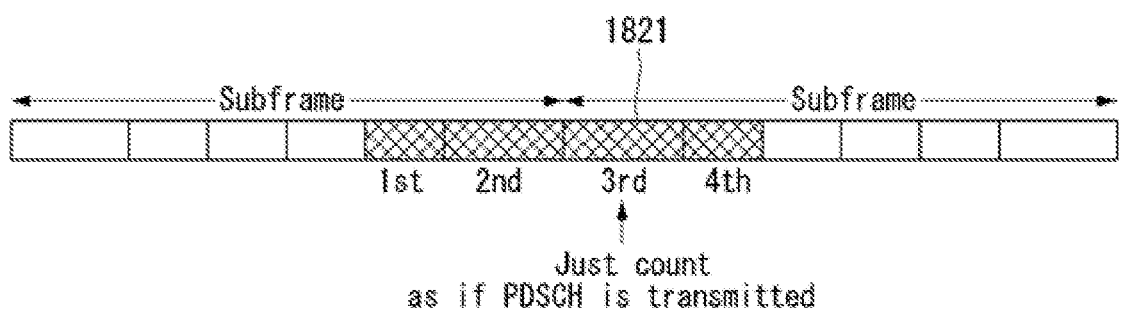

For example, as illustrated in FIG. 18A, the PDSCH may be transmitted by the total transmission TTI number of the PDSCH repetition, excluding and/or skipping a subslot #0 1811 in which the PDSCH cannot be transmitted. Alternatively, as illustrated in FIG. 18B, the PDSCH may be transmitted by the total transmission TTI number of the PDSCH repetition, including a subslot #0 1821, to which the PDSCH cannot be transmitted. These interpretations may reduce the reception reliability of PDSCH between the UE and the base station.

Accordingly, when whether a blind/HARQ-less PDSCH repetition operation is enabled is defined by the higher layer signal, a rule may be defined, promised, and/or configured so that the UE assumes the transmission TTI number of the PDSCH corresponding to the repetition transmission as in the following methods and performs PDSCH decoding.

The following methods described in the seventh embodiment are merely distinguished for convenience of explanation, and thus it is obvious that configuration of any method can be replaced by or combined with configurations of other methods.

(Method 1)

If a control region configured and/or indicated via a higher layer signal and/or a physical layer signal is 2 or 3 OFDM symbols, the UE may perform the PDSCH decoding on the assumption that the PDSCH excludes and/or skips the corresponding TTI (e.g., subslot #0) or a TTI (e.g., subslot #0 and subslot #1) affected by a length of the control region and is transmitted by the total transmission TTI number of the configured and/or indicated PDSCH repetition. For example, as illustrated in FIG. 18A, the UE may perform the PDSCH decoding, seeing that the PDSCH is repeatedly transmitted skipping the subslot #0 1811.

Referring to FIG. 18A, the PDSCH repetition number may be 4 times, and the total transmission TTI number related to the PDSCH repetition may be 5. The total transmission TTIs related to the PDSCH repetition include TTIs (1st TTI 1812, 2nd TTI 1813, 3rd TTI 1814, and 4th TTI 1815) in which the PDSCH is actually transmitted and a TTI 1811 in which the PDSCH is not transmitted.

That is, when the PDSCH repetition number is configured to 4 times, and the specific TTI cannot be used for the PDSCH reception due to the length of the control region, the UE, as illustrated in FIG. 18A, repeatedly receives the PDSCH in the 1st TTI 1812 and the 2nd TTI 1813, skips the PDSCH reception in the specific TTI 1811, and continues to repeatedly receives the PDSCH in the 3rd TTI 1814 and the 4th TTI 1815.

(Method 2)

If a control region configured and/or indicated via a higher layer signal and/or a physical layer signal is 1 OFDM symbol, the UE may perform the PDSCH decoding on the assumption that the PDSCH is transmitted by the total transmission TTI number of the configured and/or indicated PDSCH repetition, including the corresponding TTI (e.g., subslot #0) or a TTI (e.g., subslot #0 and subslot #1) affected by a length of the control region. For example, as illustrated in FIG. 18B, the UE may perform the PDSCH decoding, seeing that the PDSCH is repeatedly transmitted, including the subslot #0 1821.

(Method 3)

The UE may perform the PDSCH decoding on the assumption that the PDSCH always excludes and/or skips a corresponding TTI (e.g., subslot #0) regardless of the number of symbols of a control region and is actually transmitted by the total transmission TTI number of the configured and/or indicated PDSCH repetition.

(Method 4)

A rule may be defined, promised, and/or configured so that a PDSCH repetition operation is limited within a subframe boundary, and the UE performs the decoding of PDSCHs that are repeatedly transmitted in a plurality of TTIs for the same TB only within a subframe. In other words, the UE may not expect the decoding of PDSCHs that are repeatedly transmitted in a plurality of TTIs for the same TB over a plurality of consecutive subframes.

(Method 5)

A TTI in which a repeatedly transmitted PDSCH has to be received can be grasped in such a manner (e.g., a physical layer signal (PCFICH) or a higher layer signal) that the number of symbols of a DL control region for a specific carrier and/or a cell is indicated to the UE. If the number of symbols of the control region is indicated by the PCFICH, a performance of a control channel may depend on a PCFICH decoding performance of the UE. Further, a boundary between a subslot #0 and a subslot #1 is erroneously grasped upon determination of a subslot pattern, and thus a DL data channel decoding performance may be reduced.

Thus, if the number of symbols of a control region (in a specific cell) is indicated by the PCFICH, the UE may perform the decoding of the PDSCH on the assumption that the PDSCH always excludes and/or skips a TTI (e.g., subslot #0) in the control region or a TTI (e.g., subslot #0 and subslot #1) that is affected by a length of the control region and is actually transmitted by the total transmission TTI number of the configured and/or indicated PDSCH repetition. On the other hand, if the number of symbols of the control region (in the specific cell) is configured via the higher layer signal, the UE may perform the PDSCH decoding on the assumption that the PDSCH excludes and/or skips the TTI (e.g., subslot #0) in the control region and is actually transmitted by the total transmission TTI number of the configured and/or indicated PDSCH repetition when the control region is 2 or 3 OFDM symbols depending on the configured number of symbols of the control region, and the UE may perform the PDSCH decoding on the assumption that the PDSCH is actually transmitted by the total transmission TTI number of the configured and/or indicated PDSCH repetition including the TTI (e.g., subslot #0) in the control region when the control region is 1 OFDM symbol.

In the present specification, the control region may mean the number of OFDM symbols used for the PDCCH transmission within the subframe. Further, the control region may be determined by information that is indicated to the UE via the physical layer signal (e.g., PCFICH) and/or the higher layer signal (e.g., RRC message).

Eighth Embodiment

Before the description of an eighth embodiment, a structure of a radio frame is first described. In FIG. 1(a), a subframe using Δf=15 kHz may be subdivided into 6 subslots according to the following Table 10.

TABLE 10

| | Subslot number | | | | | |
|---|---|---|---|---|---|---|
| | 0 | 1 | 2 | 3 | 4 | 5 |
| | | | Slot number | | | |
| | | 2i | | | 2i + 1 | |
| Uplink subslot pattern | 0, 1, 2 | 3, 4 | 5, 6 | 0, 1 | 2, 3 | 4, 5, 6 |
| Downlink subslot pattern 1 | 0, 1, 2 | 3, 4 | 5, 6 | 0, 1 | 2, 3 | 4, 5, 6 |
| Downlink subslot pattern 2 | 0, 1 | 2, 3, 4 | 5, 6 | 0, 1 | 2, 3 | 4, 5, 6 |

In case of FDD, 10 subframes, 20 slots, or up to 60 subslots are available for downlink transmission at intervals of 10 ms, and 10 subframes, 20 slots, or up to 60 subslots are available for uplink transmission at intervals of 10 ms. The uplink and downlink transmissions may be separated in a frequency domain. In a half-duplex FDD operation, the UE cannot transmit and receive at the same time. On the other hand, in a full-duplex FDD operation, the UE can transmit and receive at the same time.

Next, a method for determining and/or configuring whether to allow DL DMRS sharing for a TTI over a plurality of consecutive subframes is described.

In case of subslot-PDSCH, demodulation reference signal (DMRS) sharing may be allowed for a reduction in an overhead due to a DMRS. To prevent a reduction in a performance of channel estimation, the DMRS sharing may be allowed only between two slots, and a rule is defined so that the corresponding DMRS is mapped to a first slot of the two slots upon DMRS sharing considering a processing time of the UE. According to a previously defined standard (e.g., 3GPP Specification), when the UE does not detect DL assignment short downlink control information (sDCI) in a subslot # n−1, and it is indicated that the DMRS is absent in the subslot # n in the DL assignment sDCI detected in the subslot # n, the UE does not expect the decoding of subslot-PDSCH in the subslot # n.

Whether to allow the DL DMRS sharing for TTIs over a plurality of consecutive subframes may be determined by the following methods.

The following methods described in the eighth embodiment are merely distinguished for convenience of explanation, and thus it is obvious that configuration of any method can be replaced by or combined with configurations of other methods.

(Method 1)

A rule may be defined, promised, and/or configured so that whether the DL DMRS sharing operation is allowed for TTIs over a plurality of consecutive subframes is differently determined by the number of symbols of a control region configured and/or indicated via a higher layer signal and/or a physical layer signal.

For example, if the control region configured and/or indicated via the higher layer signal and/or the physical layer signal is 1 OFDM symbol, the DL DMRS sharing operation may be allowed, applied, configured, and/or indicated for TTIs over a plurality of consecutive subframes. On the other hand, if the control region configured and/or indicated via the higher layer signal and/or the physical layer signal is 2 or 3 OFDM symbols, the DL DMRS sharing operation may not be allowed, applied, configured, and/or indicated for TTIs over a plurality of consecutive subframes. In this case, the UE may receive the DMRS for each TTI.

(Method 2)

A rule may be defined, promised, and/or configured so that whether the DL DMRS sharing operation is allowed, applied, configured, and/or indicated for TTIs over a plurality of consecutive subframes is differently determined depending on whether the number of symbols of a control region for a corresponding TTI length is configured via a higher layer signal or is indicated by a physical layer signal (e.g., PCFICH). For example, if the number of symbols of the control region is configured via the higher layer signal, whether to allow, apply, configure, and/or indicate the DL DMRS sharing operation may be determined by the number of symbols of the control region configured as in the Method 1. On the other hand, if the number of symbols of the control region is indicated by the physical layer signal (e.g., PCFICH), the UE may not expect that the DL DMRS sharing operation is allowed, applied, configured, and/or indicated.

Ninth Embodiment

A method for solving a reduction in PDSCH reception reliability according to a different subframe type in a PDSCH repetition operation is described.

Different reference signals (RSs) may be applied according to different subframe types and/or different transmission modes (TMs) configured to the different subframe types. If DCI formats scheduling the different TMs configured to the different subframe types are different, configuration and/or information of a field of the corresponding DCI format may be differently configured. For example, when data is transmitted in a data repetition transmission duration, i.e., over different types of subframes (e.g., multicast broadcast single frequency network (MBSFN) subframe and non-MBSFN subframe) to which different TMs are configured, if a DCI scheduling it is a DCI format monitored in a TM (e.g., TM 4) for non-MBSFN, there may be no specific information (e.g., scrambling ID, number of layers, and/or DMRS antenna port information, etc.) within DCI for receiving and/or decoding a PDSCH TTI applying a transmission scheme corresponding to a TM (e.g., TM 9) for MBSFN transmitted in a next subframe or a TTI in the next subframe. This may make the reception and/or decoding operation for the PDSCH repetition of the UE substantially impossible.

Accordingly, if a blind/HARQ-less PDSCH repetition operation is configured and/or indicated, it is assumed that the PDSCH is not transmitted in a MBSFN subframe or a (short) TTI within the MBSFN subframe. That is, a rule may be defined, promised, and/or configured so that the UE assumes and/or excepts that the PDSCH is repeatedly transmitted in a remaining TTI (e.g., in a non-MB SFN subframe or a (short) TTI within the non-MBSFN subframe) excluding the MBSFN subframe or the (short) TTI within the MBSFN subframe. In particular, the above operation may be applied when a CRS-based TM (TM defined to be demodulated with CRS, for example, TM1 to TM6) is configured for the non-MBSFN subframe or a (short) TTI operation within the non-MBSFN subframe.

In general, if the blind/HARQ-less PDSCH repetition operation is configured and/or indicated, a rule may be defined, promised, and/or configured so that when a different TM has been configured according to a subframe type (e.g., non-MBSFN or MBSFN), PDSCH repetition transmission skips a TTI of a different subframe type from a subframe type including a TTI (or TTI scheduling the repetition) in which the repetition is started (i.e., so that the PDSCH being repeatedly transmitted is not transmitted in the corresponding TTI). In other words, if the blind/HARQ-less PDSCH repetition operation is configured and/or indicated, a rule may be defined, promised, and/or configured so that when a different TM has been configured according to a subframe type (e.g., non-MBSFN or MBSFN), the UE assumes and/or expects the PDSCH is repeatedly transmitted only in a subframe (or TTI included in the subframe) corresponding to a subframe type including a TTI (or TTI scheduling the repetition) in which the repetition is started.

And/or, when the repetition transmission of the PDSCH is performed over TTIs corresponding to different subframe types, the repetition transmission of the PDSCH may be terminated in a different type of subframe (or TTI included in the subframe) from a subframe corresponding to a subframe type including a TTI (or TTI scheduling the repetition) in which the repetition is started.

Tenth Embodiment

A method for reducing time latency according to an invalid TTI in a PDSCH repetition transmission is described.

During the repetition transmission of the PDSCH, for a reason of availability, etc. of a TTI due to a different subframe type and/or the number of symbols of a control region, there may occur an invalid TTI in which the corresponding PDSCH is not received for a specific time duration. That is, the UE may assume that the PDSCH corresponding to the repetition transmission is not transmitted in the invalid TTI. If the specific time duration consisting of the invalid TTI(s) becomes very long, it may not be desirable because a latency excessively increases. Therefore, when a specific time duration or more consists of invalid TTI(s), the repetition transmission of the PDSCH may be terminated. Further, a rule may be defined, promised, and/or configured so that the UE derives a HARQ-ACK transmission TTI from a timing corresponding to PDSCH(s) receiving until a previous TTI and performs HARQ-ACK report. On the other hand, when the specific time duration or less consists of invalid TTI(s), a rule may be defined, promised, and/or configured so that the UE excludes the invalid TTI(s), expects that the PDSCH repetition lasts again, receives the PDSCH repetition transmission by the PDSCH repetition number, derives a HARQ-ACK transmission TTI from a timing corresponding to a last PDSCH reception TTI, and performs HARQ-ACK report. Here, the specific time and the repetition number may be promised in advance or may be signaled to the UE.

Eleventh Embodiment

A method for solving a reduction in PDSCH reception reliability according to a decoding error of a PCFICH in a PDSCH repetition operation is described.

Reliability of URLLC transmission and reception may be affected by reliability of a control channel. In particular, the reliability of URLLC transmission and reception may be greatly affected by a PCFICH decoding performance. If a UE erroneously decodes a PCFICH and erroneously recognizes a control region (e.g., the number of symbols occupied by the control channel), reliability of the control channel may be reduced. Thus, (in case of a subslot operation) the UE may understand a DL TTI boundary differently from a base station and perform the decoding. To prevent this, there may be considered a method in which information about a control channel region of a specific serving cell is configured to the UE via a higher layer signal.

A rule may be defined, promised, and/or configured so that blind and/or HARQ-less PDSCH repetition operation for the specific serving cell and a specific TTI length is configured and/or indicated only if information (e.g., the number of symbols for the control region or a CFI value) about a control region for the corresponding serving cell and the TTI length is configured via the higher layer signal. The rule may be to limit configuration and/or indication of the PDSCH repetition operation because it is difficult to secure the reception reliability of repeatedly transmitted PDSCH when a PCFICH error occurs.

In particular, when the PCFICH error occurs, the DL TTI boundary for the subslot operation may be differently understood between the UE and the base station. Therefore, a rule may be defined, promised, and/or configured so that only if information about the control channel region for the specific serving cell and the subslot operation (including PDCCH monitoring) is configured via the higher layer signal, the blind/HARQ-less PDSCH repetition operation for the corresponding serving cell and the subslot operation is configured and/or indicated.

Since examples of embodiments proposed by the present specification may be included in one of methods for implementing the present invention, it is obvious that the example can be regarded as a kind of embodiment.

As mentioned above, embodiments proposed by the present specification may be independently implemented, or some embodiments may be combined and implemented. A rule may be defined, promised, and/or configured so that the base station informs the UE of information about whether embodiments are applied (or information about rules of the embodiments) via previously defined signaling (e.g., physical layer signaling and/or higher layer signaling, etc.)

Figure 19:
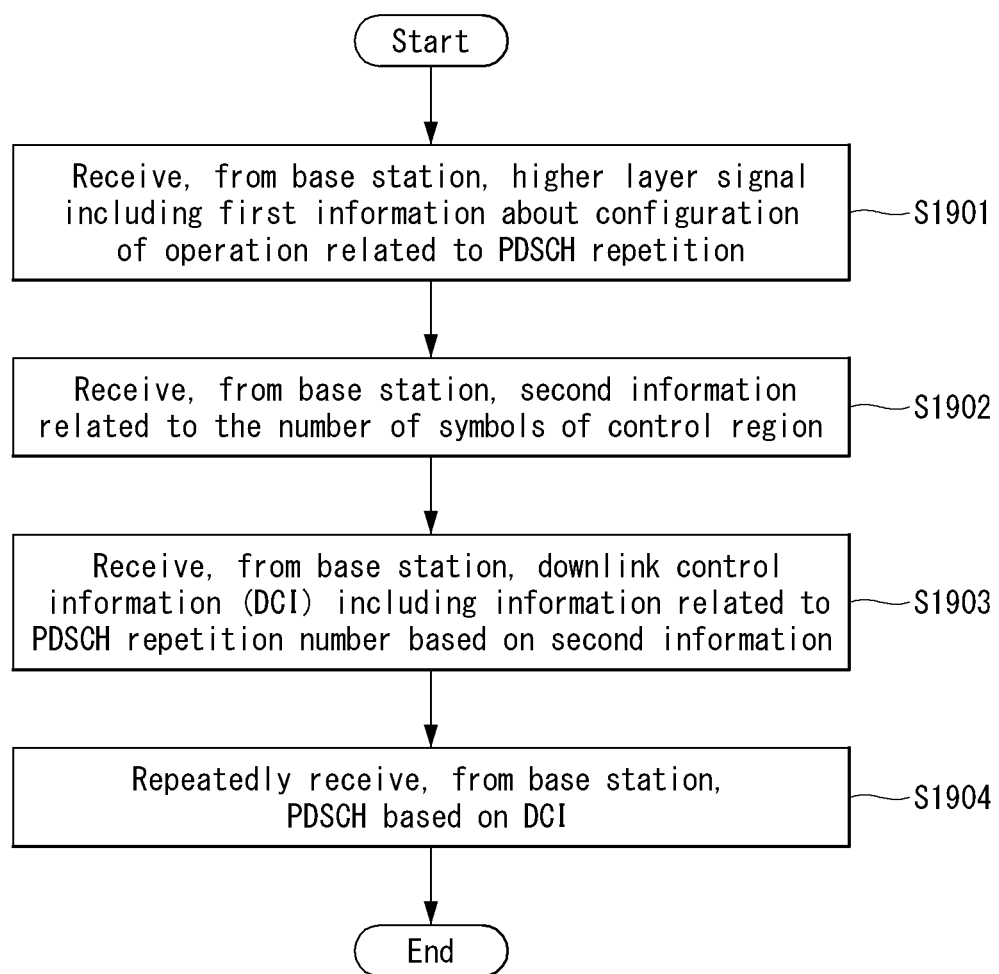
FIG. 19 is a flow chart illustrating an operation method of a user equipment proposed by the present specification.

FIG. 19 is a flow chart illustrating an operation method of a UE proposed by the present specification.

Referring to FIG. 19, a UE may receive, from a base station, a higher layer signal including first information about a configuration of an operation related to PDSCH repetition in S1901. For example, the operation related to PDSCH repetition may be a HARQ-less/blind PDSCH (or HARQ-less and/or blind PDSCH) repetition operation. The first information may include a higher layer parameter blindSlotSubslotPDSCH-Repetitions or blindSubframePDSCH-Repetitions.

The blindSlotSubslotPDSCH-Repetitions may be information configured so that the UE supports a PDSCH repetition operation for a slot or a subslot.

The blindSubframePDSCH-Repetitions may be information configured so that the UE supports a PDSCH repetition operation for a subframe.

Next, the UE may receive, from the base station, second information related to the number of symbols of a control region in S1902. For example, the second information may be received via a physical control format indicator channel (PCFICH) or a higher layer signal. That is, the second information may be a control format indicator (CFI).

The control region may be time and/or frequency resources in which control information is transmitted.

Next, the UE may receive, from the base station, downlink control information (DCI) including information related to the PDSCH repetition number based on the second information in S1903. For example, if the second information is 2 symbols, the DCI may be transmitted on the corresponding 2 symbols. Further, the information related to the PDSCH repetition number may be information existing when the higher layer parameter blindSubframePDSCH-Repetitions or blindSlotSubslotPDSCH-Repetitions is configured via the higher layer signal.

Next, the UE may repeatedly receive, from the base station, the PDSCH based on the DCI in S1904. The UE may check for how many TTIs the PDSCH for the same transport block (TB) is repeated and transmitted based on the information related to the PDSCH repetition number and may perform a reception operation. The information related to the PDSCH repetition number may be the total transmission TTI number of the PDSCH scheduled by the physical downlink control channel (PDSCH) or the DCI. The number of TTIs based on the information related to the PDSCH repetition number may count from a TTI in which the DCI is received.

In particular, when the control region is configured with a specific number of symbols, transmission time units for a PDSCH repetition reception may not include a transmission time unit related to the control region. Hereinafter, the transmission time unit may be referred to as a transmission time interval (TTI).

In other words, when the control region is configured with the specific number of symbols, the PDSCH may exclude or skip a TTI related to the control region and may be received and/or decoded by the number of TTIs based on the information related to the PDSCH repetition number.

Here, the TTI may be a subframe, a slot, or a subslot.

Further, the specific number of symbols is 2 or 3 symbols.

When the TTI is the subslot, a subslot related to the control region may be a first subslot (subslot #0) in a subframe. Alternatively, a subslot related to the control region may be a subslot including the 2 or 3 symbols used to transmit the DCI based on the second information.

For example, when the control region is configured with the 2 or 3 symbols (the specific number of symbols), the repeated PDSCH may be received and/or decoded on the assumption that the PDSCH excludes and/or skips a subslot (e.g., subslot #0) including the corresponding symbols and is transmitted by the number of TTIs based on the information related to the PDSCH repetition number.

In other words, as illustrated in FIG. 18A, when the second information represents the 2 or 3 symbols, the UE may perform the decoding on the assumption that the PDSCH is repeatedly received in the 1st TTI 1812 and the 2nd TTI 1813, excludes or skips the subslot #0 1811 related to the control region, and is repeatedly transmitted in the 3rd TTI 1814 and the 4th TTI 1815.

Alternatively, when the control region is configured with the specific number of symbols, the PDSCH may exclude a TTI (e.g., subslot #0 and subslot #1) that is affected by a length of the control region and may be decoded by the number of TTIs based on the information related to the PDSCH repetition number.

When the PDSCH repetition is transmitted over a plurality of subframes, the UE may perform the decoding on the assumption that the PDSCH excludes a first subslot (subslot #0) of each of the plurality of subframes from a subslot receiving the DCI and is repeatedly transmitted as much as the information related to the PDSCH repetition number.

And/or, when the second information represents a specific symbol (e.g., 1 symbol), the UE may perform the decoding on the assumption that the PDSCH is transmitted as much as the information related to the PDSCH repetition number, including a specific TTI (e.g., subslot #0) including the corresponding symbol. For example, as illustrated in FIG. 18B, when information about the number of symbols of the control region represents 1 symbol, the UE may perform the decoding on the assumption that the PDSCH is repeatedly transmitted including the subslot #0 1821.

Alternatively, when the second information represents 1 OFDM symbol (or a specific number of symbols), the UE may perform the decoding on the assumption that the PDSCH is transmitted as much as the information related to the PDSCH repetition number, including a specific TTI (e.g., subslot #0 and subslot #1) that is affected by the length of the control region.

And/or, the UE may perform the decoding on the assumption that the PDSCH is transmitted as much as the information related to the PDSCH repetition number, excluding and/or skipping a specific TTI (e.g., subslot #0) regardless of the second information. Alternatively, the UE may perform the decoding on the assumption that the PDSCH is transmitted as much as the information related to the PDSCH repetition number, excluding and/or skipping a specific TTI (e.g., subslot #0 and subslot #1) that is affected by the length of the control region regardless of the second information.

And/or, an operation related to PDSCH repetition may be defined, promised, and/or configured to the UE and/or the base station so that the operation related to PDSCH repetition is limited to within a subframe boundary. For example, a rule may be defined, promised, and/or configured so that the UE performs the decoding of PDSCHs that are repeatedly transmitted in a plurality of TTIs for the same TB only within a subframe. In other words, the UE may not expect the decoding of PDSCHs that are repeatedly transmitted in a plurality of TTIs for the same TB in a plurality of consecutive subframes.

The reception reliability of the PDSCH between the base station and the UE in the PDSCH repetition operation can be improved through the above-described methods.

Since the operation method of the UE illustrated in FIG. 19 is the same as the operation method of the UE described with reference to FIGS. 1 to 18, a detailed description thereof is omitted.

Figure 21:
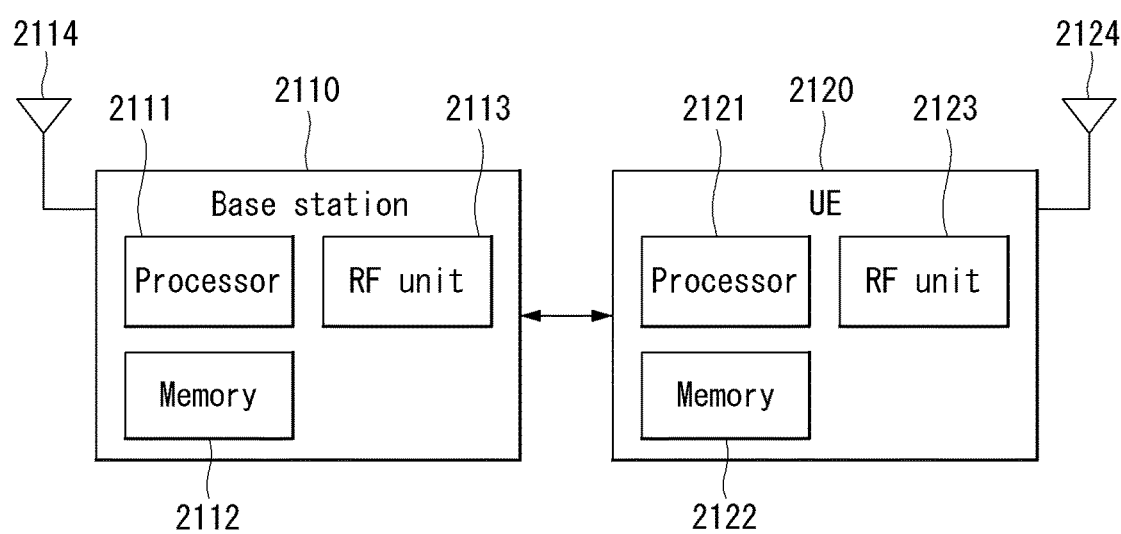
FIG. 21 illustrates a block configuration diagram of a wireless communication device to which methods proposed by the present specification are applicable.

In this regard, the above-described operation of the UE can be specifically implemented by a UE 2120 illustrated in FIG. 21 of the present specification. For example, the above-described operation of the UE can be performed by a processor 2121 and/or a RF unit 2123.

Referring to FIG. 21, the processor 2121 may receive, from a base station, a higher layer signal including first information about a configuration of an operation related to PDSCH repetition through the RF unit 2123 in S1901. For example, the operation related to PDSCH repetition may be a HARQ-less/blind PDSCH (or HARQ-less and/or blind PDSCH) repetition operation. The first information may include a higher layer parameter blindSlotSubslotPDSCH-Repetitions or blindSubframePDSCH-Repetitions.

The blindSlotSubslotPDSCH-Repetitions may be information configured so that a UE supports a PDSCH repetition operation for a slot or a subslot.

The blindSubframePDSCH-Repetitions may be information configured so that the UE supports a PDSCH repetition operation for a subframe.

Next, the processor 2121 may receive, from the base station, second information related to the number of symbols of a control region through the RF unit 2123 in S1902. For example, the second information may be received via a physical control format indicator channel (PCFICH) or a higher layer signal. That is, the second information may be a control format indicator (CFI).

The control region may be time and/or frequency resources in which control information is transmitted.

Next, the processor 2121 may receive, from the base station, downlink control information (DCI) including information related to a PDSCH repetition number based on the second information through the RF unit 2123 in S1903. For example, if the second information is 2 symbols, the DCI may be transmitted on the corresponding 2 symbols. Further, the information related to the PDSCH repetition number may be information existing when the higher layer parameter blindSubframePDSCH-Repetitions or blindSlotSubslotPDSCH-Repetitions is configured via the higher layer signal.

Next, the processor 2121 may repeatedly receive, from the base station, the PDSCH based on the DCI through the RF unit 2123 in S1904. The UE may check for how many TTIs the PDSCH for the same transport block (TB) is repeated and transmitted based on the information related to the PDSCH repetition number and may perform a reception operation. The information related to the PDSCH repetition number may be the total transmission TTI number of the PDSCH scheduled by the PDSCH or the DCI. The number of TTIs based on the information related to the PDSCH repetition number may count from a TTI in which the DCI is received.

In particular, when the control region is configured with a specific number of symbols, TTIs for a PDSCH repetition reception may not include a TTI related to the control region. In other words, when the control region is configured with the specific number of symbols, the PDSCH may exclude or skip a TTI related to the control region and may be received and/or decoded by the number of TTIs based on the information related to the PDSCH repetition number.

Here, the TTI may be a subframe, a slot, or a subslot.

Further, the specific number of symbols is 2 or 3 symbols.

When the TTI is the subslot, a subslot related to the control region may be a first subslot (subslot #0) in a subframe. Alternatively, a subslot related to the control region may be a subslot including the 2 or 3 symbols used to transmit the DCI based on the second information.

For example, when the control region is configured with the 2 or 3 symbols (the specific number of symbols), the repeated PDSCH may be received and/or decoded on the assumption that the PDSCH excludes and/or skips a subslot (e.g., subslot #0) including the corresponding symbols and is transmitted by the number of TTIs based on the information related to the PDSCH repetition number.

In other words, as illustrated in FIG. 18A, when the second information represents the 2 or 3 symbols, the UE may perform the decoding on the assumption that the PDSCH is repeatedly received in the 1st TTI 1812 and the 2nd TTI 1813, excludes or skips the subslot #0 1811 related to the control region, and is repeatedly transmitted in the 3rd TTI 1814 and the 4th TTI 1815.

Alternatively, when the control region is configured with the specific number of symbols, the PDSCH may exclude a TTI (e.g., subslot #0 and subslot #1) that is affected by a length of the control region and may be decoded by the number of TTIs based on the information related to the PDSCH repetition number.

When the PDSCH repetition is transmitted over a plurality of subframes, the UE may perform the decoding on the assumption that the PDSCH excludes a first subslot (subslot #0) of each of the plurality of subframes from a subslot receiving the DCI and is repeatedly transmitted as much as the information related to the PDSCH repetition number.

And/or, when the second information represents a specific symbol (e.g., 1 symbol), the UE may perform the decoding on the assumption that the PDSCH is transmitted as much as the information related to the PDSCH repetition number, including a specific TTI (e.g., subslot #0) including the corresponding symbol. For example, as illustrated in FIG. 18B, when information about the number of symbols of the control region represents 1 symbol, the UE may perform the decoding on the assumption that the PDSCH is repeatedly transmitted including the subslot #0 1821.

Alternatively, when the second information represents 1 OFDM symbol (or a specific number of symbols), the UE may perform the decoding on the assumption that the PDSCH is transmitted as much as the information related to the PDSCH repetition number, including a specific TTI (e.g., subslot #0 and subslot #1) that is affected by the length of the control region.

And/or, the UE may perform the decoding on the assumption that the PDSCH is transmitted as much as the information related to the PDSCH repetition number, excluding and/or skipping a specific TTI (e.g., subslot #0) regardless of the second information. Alternatively, the UE may perform the decoding on the assumption that the PDSCH is transmitted as much as the information related to the PDSCH repetition number, excluding and/or skipping a specific TTI (e.g., subslot #0 and subslot #1) that is affected by the length of the control region regardless of the second information.

And/or, an operation related to PDSCH repetition may be defined, promised, and/or configured to the UE and/or the base station so that the operation related to PDSCH repetition is limited to within a subframe boundary. For example, a rule may be defined, promised, and/or configured so that the UE performs the decoding of PDSCHs that are repeatedly transmitted in a plurality of TTIs for the same TB only within a subframe. In other words, the UE may not expect the decoding of PDSCHs that are repeatedly transmitted in a plurality of TTIs for the same TB in a plurality of consecutive subframes.

The reception reliability of the PDSCH between the base station and the UE in the PDSCH repetition operation can be improved through the above-described methods.

Since the operation of the UE described with reference to FIG. 21 is the same as the operation of the UE described with reference to FIGS. 1 to 19, a detailed description thereof is omitted.

Figure 20:
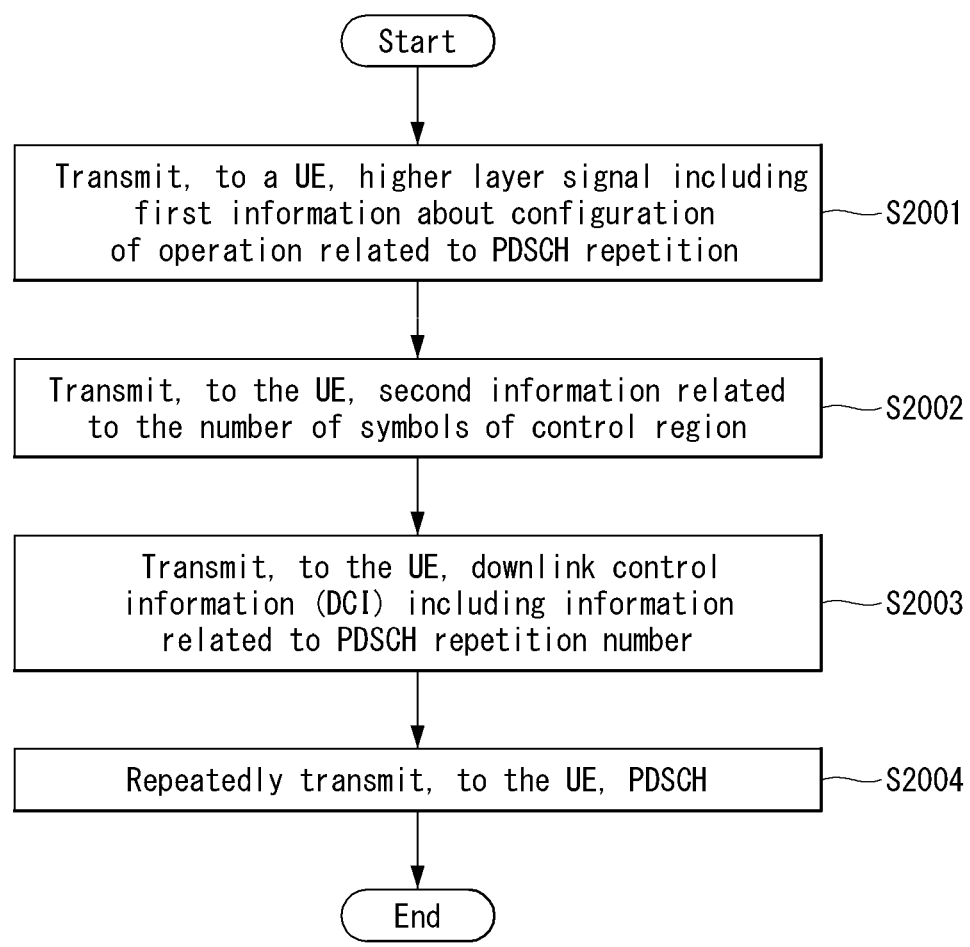
FIG. 20 is a flow chart illustrating an operation method of a base station proposed by the present specification.

FIG. 20 is a flow chart illustrating an operation method of a base station proposed by the present specification.

Referring to FIG. 20, a base station may transmit, to a UE, a higher layer signal including first information about a configuration of an operation related to PDSCH repetition in S2001. For example, the operation related to PDSCH repetition may be a HARQ-less/blind PDSCH (or HARQ-less and/or blind PDSCH) repetition operation. The first information may include a higher layer parameter blindSlotSubslotPDSCH-Repetitions or blindSubframePDSCH-Repetitions.

The blindSlotSubslotPDSCH-Repetitions may be information configured so that the UE supports a PDSCH repetition operation for a slot or a subslot.

The blindSubframePDSCH-Repetitions may be information configured so that the UE supports a PDSCH repetition operation for a subframe.

Next, the base station may transmit, to the UE, second information related to the number of symbols of a control region in S2002. For example, the second information may be received via a physical control format indicator channel (PCFICH) or a higher layer signal. That is, the second information may be a control format indicator (CFI). The control region may be time and/or frequency resources in which control information is transmitted.

Next, the base station may transmit, to the UE, downlink control information (DCI) including information related to a PDSCH repetition number in S2003. For example, if the second information is 2 symbols, the DCI may be transmitted on the corresponding 2 symbols. Further, the information related to the PDSCH repetition number may be information existing when the higher layer parameter blindSubframePDSCH-Repetitions or blindSlotSubslotPDSCH-Repetitions is configured via the higher layer signal.

Next, the base station may repeatedly transmit, to the UE, the PDSCH in S2004. The UE may check for how many TTIs the PDSCH for the same transport block (TB) is repeated and transmitted based on the information related to the PDSCH repetition number and may perform a reception operation. The information related to the PDSCH repetition number may be the total transmission TTI number of the PDSCH scheduled by the PDSCH or the DCI. The number of TTIs based on the information related to the PDSCH repetition number may count from a TTI in which the control information is received.

In particular, when the control region is configured with a specific number of symbols, TTIs for a PDSCH repetition reception of the UE may not include a TTI related to the control region. In other words, when the control region is configured with the specific number of symbols, the PDSCH may exclude or skip a TTI related to the control region and may be received and/or decoded by the number of TTIs based on the information related to the PDSCH repetition number. Alternatively, when the control region is configured with the specific number of symbols, the PDSCH may exclude a TTI (e.g., subslot #0 and subslot #1) that is affected by a length of the control region and may be decoded by the number of TTIs based on the information related to the PDSCH repetition number.

Here, the TTI may be a subframe, a slot, or a subslot.

Further, the specific number of symbols is 2 or 3 symbols.

When the TTI is the subslot, a subslot related to the control region may be a first subslot (subslot #0) in a subframe. Alternatively, a subslot related to the control region may be a subslot including the 2 or 3 symbols used to transmit the control region based on the second information. When the control region is configured with the 2 or 3 symbols, the repeated PDSCH may be received and/or decoded by the UE on the assumption that the PDSCH excludes and/or skips a subslot (e.g., subslot #0) including the corresponding symbols and is transmitted by the number of TTIs based on the information related to the PDSCH repetition number.

In other words, as illustrated in FIG. 18A, when the second information represents the 2 or 3 symbols, the UE may perform the decoding on the assumption that the PDSCH is repeatedly received in the 1st TTI 1812 and the 2nd TTI 1813, excludes or skips the subslot #0 1811 related to the control region, and is repeatedly transmitted in the 3rd TTI 1814 and the 4th TTI 1815.

When the PDSCH repetition is transmitted over a plurality of subframes, the UE may perform the decoding on the assumption that the PDSCH excludes a first subslot (subslot #0) of each of the plurality of subframes from a subslot receiving the DCI and is repeatedly transmitted as much as the information related to the PDSCH repetition number. For example, as illustrated in FIG. 18A, when the second information represents the 2 or 3 symbols, the UE may perform the decoding on the assumption that the PDSCH excludes the subslot #0 (1811) and is repeatedly transmitted.

And/or, when the second information represents a specific symbol (e.g., 1 symbol), the UE may perform the decoding on the assumption that the PDSCH is transmitted as much as the information related to the PDSCH repetition number, including a specific TTI (e.g., subslot #0) including the corresponding symbol. For example, as illustrated in FIG. 18B, when the second information represents 1 symbol, the UE may perform the decoding on the assumption that the PDSCH is repeatedly transmitted including the subslot #0 1821.

Alternatively, when the second information represents 1 OFDM symbol (or a specific number of symbols), the UE may perform the decoding on the assumption that the PDSCH is transmitted as much as the information related to the PDSCH repetition number, including a specific TTI (e.g., subslot #0 and subslot #1) that is affected by the length of the control region.

And/or, the UE may perform the decoding on the assumption that the PDSCH is transmitted as much as the information related to the PDSCH repetition number, excluding and/or skipping a specific TTI (e.g., subslot #0) regardless of the second information. Alternatively, the UE may perform the decoding on the assumption that the PDSCH is transmitted as much as the information related to the PDSCH repetition number, excluding and/or skipping a specific TTI (e.g., subslot #0 and subslot #1) that is affected by the length of the control region regardless of information about the number of symbols of the control region.

And/or, an operation related to PDSCH repetition may be defined, promised, and/or configured to the UE and/or the base station so that the operation related to PDSCH repetition is limited to within a subframe boundary. For example, a rule may be defined, promised, and/or configured so that the UE performs the decoding of PDSCHs that are repeatedly transmitted in a plurality of TTIs for the same TB only within a subframe. In other words, the UE may not expect the decoding of PDSCHs that are repeatedly transmitted in a plurality of TTIs for the same TB in a plurality of consecutive subframes.

The reception reliability of the PDSCH between the base station and the UE in the PDSCH repetition operation can be improved through the above-described methods.

Since the operation method of the base station illustrated in FIG. 20 is the same as the operation method of the base station described with reference to FIGS. 1 to 19, a detailed description thereof is omitted.

In this regard, the above-described operation of the base station can be specifically implemented by a base station 2110 illustrated in FIG. 21 of the present specification. For example, the above-described operation of the base station can be performed by a processor 2111 and/or a RF unit 2113.

Referring to FIG. 21, the processor 2111 may transmit, to a UE, a higher layer signal including first information about a configuration of an operation related to PDSCH repetition through the RF unit 2113 in S2001. For example, the operation related to PDSCH repetition may be a HARQ-less/blind PDSCH (or HARQ-less and/or blind PDSCH) repetition operation. The first information may include a higher layer parameter blindSlotSubslotPDSCH-Repetitions or blindSubframePDSCH-Repetitions.

The blindSlotSubslotPDSCH-Repetitions may be information configured so that the UE supports a PDSCH repetition operation for a slot or a subslot.

The blindSubframePDSCH-Repetitions may be information configured so that the UE supports a PDSCH repetition operation for a subframe.

Next, the processor 2111 may transmit, to the UE, second information related to the number of symbols of a control region through the RF unit 2113 in S2002. For example, the second information may be received via a physical control format indicator channel (PCFICH) or a higher layer signal. That is, the second information may be a control format indicator (CFI). The control region may be time and/or frequency resources in which control information is transmitted.

Next, the processor 2111 may transmit, to the UE, downlink control information (DCI) including information related to a PDSCH repetition number through the RF unit 2113 in S2003. For example, if the second information is 2 symbols, the DCI may be transmitted on the corresponding 2 symbols. Further, the information related to the PDSCH repetition number may be information existing when the higher layer parameter blindSubframePDSCH-Repetitions or blindSlotSubslotPDSCH-Repetitions is configured via the higher layer signal.

Next, the processor 2111 may repeatedly transmit, to the UE, the PDSCH through the RF unit 2113 in S2004. The UE may check for how many TTIs the PDSCH for the same transport block (TB) is repeated and transmitted based on the information related to the PDSCH repetition number and may perform a reception operation. The information related to the PDSCH repetition number may be the total transmission TTI number of the PDSCH scheduled by the PDSCH or the DCI. The number of TTIs based on the information related to the PDSCH repetition number may count from a TTI in which the control information is received.

In particular, when the control region is configured with a specific number of symbols, TTIs for a PDSCH repetition reception of the UE may not include a TTI related to the control region. In other words, when the control region is configured with the specific number of symbols, the PDSCH may exclude or skip a TTI related to the control region and may be received and/or decoded by the number of TTIs based on the information related to the PDSCH repetition number. Alternatively, when the control region is configured with the specific number of symbols, the PDSCH may exclude a TTI (e.g., subslot #0 and subslot #1) that is affected by a length of the control region and may be decoded by the number of TTIs based on the information related to the PDSCH repetition number.

Here, the TTI may be a subframe, a slot, or a subslot.

Further, the specific number of symbols is 2 or 3 symbols.

When the TTI is the subslot, a subslot related to the control region may be a first subslot (subslot #0) in a subframe. Alternatively, a subslot related to the control region may be a subslot including the 2 or 3 symbols used to transmit the control region based on the second information. When the control region is configured with the 2 or 3 symbols, the repeated PDSCH may be received and/or decoded by the UE on the assumption that the PDSCH excludes and/or skips a subslot (e.g., subslot #0) including the corresponding symbols and is transmitted by the number of TTIs based on the information related to the PDSCH repetition number.

In other words, as illustrated in FIG. 18A, when the second information represents the 2 or 3 symbols, the UE may perform the decoding on the assumption that the PDSCH is repeatedly received in the 1st TTI 1812 and the 2nd TTI 1813, excludes or skips the subslot #0 1811 related to the control region, and is repeatedly transmitted in the 3rd TTI 1814 and the 4th TTI 1815.

When the PDSCH repetition is transmitted over a plurality of subframes, the UE may perform the decoding on the assumption that the PDSCH excludes a first subslot (subslot #0) of each of the plurality of subframes from a subslot receiving the DCI and is repeatedly transmitted as much as the information related to the PDSCH repetition number. For example, as illustrated in FIG. 18A, when the second information represents the 2 or 3 symbols, the UE may perform the decoding on the assumption that the PDSCH excludes the subslot #0 (1811) and is repeatedly transmitted.

And/or, when the second information represents a specific symbol (e.g., 1 symbol), the UE may perform the decoding on the assumption that the PDSCH is transmitted as much as the information related to the PDSCH repetition number, including a specific TTI (e.g., subslot #0) including the corresponding symbol. For example, as illustrated in FIG. 18B, when the second information represents 1 symbol, the UE may perform the decoding on the assumption that the PDSCH is repeatedly transmitted including the subslot #0 1821.

Alternatively, when the second information represents 1 OFDM symbol (or a specific number of symbols), the UE may perform the decoding on the assumption that the PDSCH is transmitted as much as the information related to the PDSCH repetition number, including a specific TTI (e.g., subslot #0 and subslot #1) that is affected by the length of the control region.

And/or, the UE may perform the decoding on the assumption that the PDSCH is transmitted as much as the information related to the PDSCH repetition number, excluding and/or skipping a specific TTI (e.g., subslot #0) regardless of the second information. Alternatively, the UE may perform the decoding on the assumption that the PDSCH is transmitted as much as the information related to the PDSCH repetition number, excluding and/or skipping a specific TTI (e.g., subslot #0 and subslot #1) that is affected by the length of the control region regardless of information about the number of symbols of the control region.

And/or, an operation related to PDSCH repetition may be defined, promised, and/or configured to the UE and/or the base station so that the operation related to PDSCH repetition is limited to within a subframe boundary. For example, a rule may be defined, promised, and/or configured so that the UE performs the decoding of PDSCHs that are repeatedly transmitted in a plurality of TTIs for the same TB only within a subframe. In other words, the UE may not expect the decoding of PDSCHs that are repeatedly transmitted in a plurality of TTIs for the same TB in a plurality of consecutive subframes.

The reception reliability of the PDSCH between the base station and the UE in the PDSCH repetition operation can be improved through the above-described methods.

Since the operation of the base station illustrated with reference to FIG. 21 is the same as the operation of the base station described with reference to FIGS. 1 to 20, a detailed description thereof is omitted.

Overview of Device to which the Present Invention is Applicable

FIG. 21 illustrates an example of an internal block diagram of a wireless communication device to which the present invention is applicable.

Referring to FIG. 21, a wireless communication system includes a base station 2110 and a plurality of UEs 2120 located in an area of the base station 2110.

The base station 2110 includes a processor 2111, a memory 2112, and a radio frequency (RF) unit 2113. The processor 2111 implements functions, processes, and/or methods proposed in FIGS. 1 to 20. Layers of a radio interface protocol may be implemented by the processor 2111. The memory 2112 is connected to the processor 2111 and stores various types of information for driving the processor 2111. The RF unit 2113 is connected to the processor 2111 and transmits and/or receives a radio signal.

The UE 2120 includes a processor 2121, a memory 2122, and a RF unit 2123. The processor 2121 implements functions, processes, and/or methods proposed in FIGS. 1 to 20. Layers of a radio interface protocol may be implemented by the processor 2121. The memory 2122 is connected to the processor 2121 and stores various types of information for driving the processor 2121. The RF unit 2123 is connected to the processor 2121 and transmits and/or receives a radio signal.

The memories 2112 and 2122 may be inside or outside the processors 2111 and 2121 and may be connected to the processors 2111 and 2121 through various well-known means.

Further, the base station 2110 and/or the UE 2120 may have a single antenna or multiple antennas.

Figure 22:
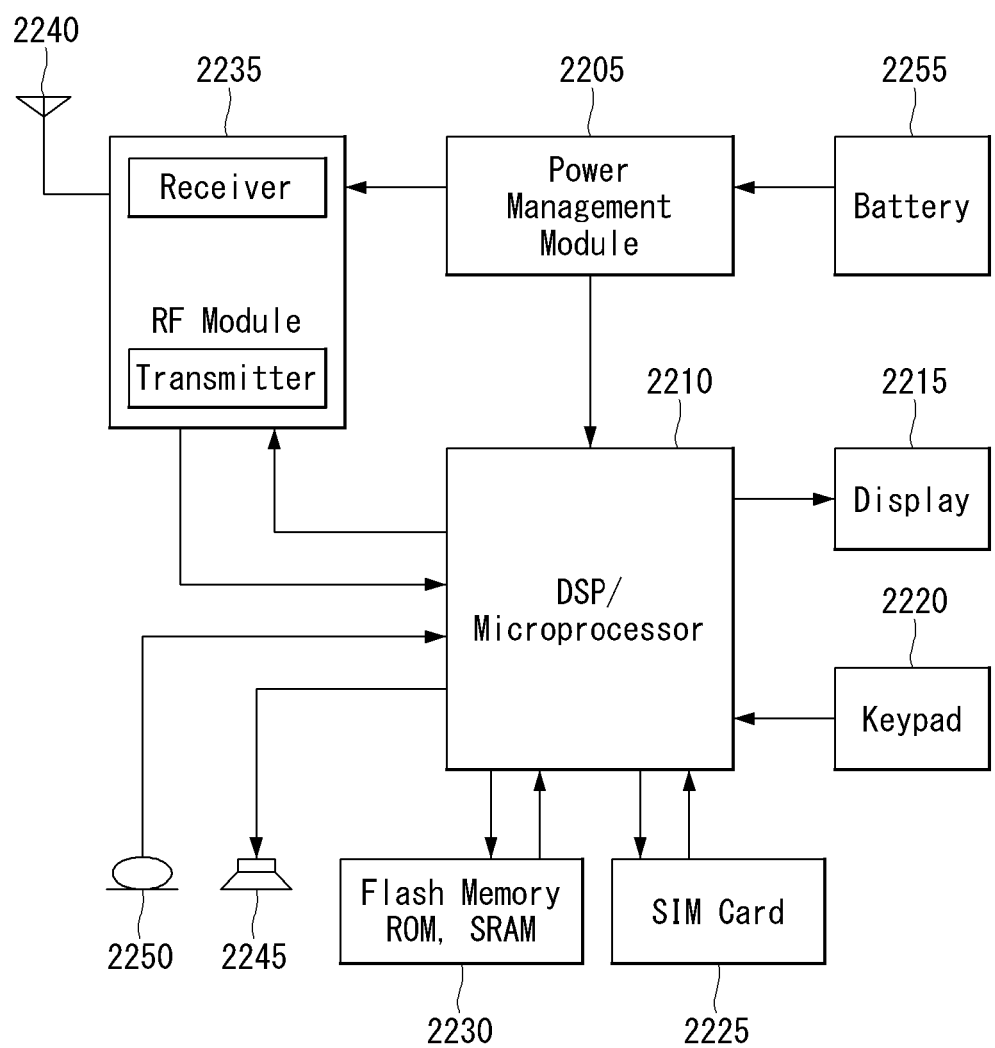
FIG. 22 illustrates a block configuration diagram of a communication device according to an embodiment of the present invention.

FIG. 22 illustrates a block configuration diagram of a communication device according to an embodiment of the present invention.

In particular, FIG. 22 illustrates in more detail the UE illustrated in FIG. 21.

Referring to FIG. 22, the UE may include a processor (or digital signal processor (DSP)) 2210, an RF module (or RF unit) 2235, a power management module 2205, an antenna 2240, a battery 2255, a display 2215, a keypad 2220, a memory 2230, a subscriber identification module (SIM) card 2225 (which is optional), a speaker 2245, and a microphone 2250. The UE may also include a single antenna or multiple antennas.

The processor 2210 implements functions, processes, and/or methods proposed in FIGS. 1 to 21. Layers of a radio interface protocol may be implemented by the processor 2210.

The memory 2230 is connected to the processor 2210 and stores information related to operations of the processor 2210. The memory 2230 may be inside or outside the processor 2210 and may be connected to the processors 2210 through various well-known means.

A user inputs instructional information, such as a telephone number, for example, by pushing (or touching) buttons of the keypad 2220 or by voice activation using the microphone 2250. The processor 2210 receives and processes the instructional information to perform an appropriate function, such as to dial the telephone number. Operational data may be extracted from the SIM card 2225 or the memory 2230. Further, the processor 2210 may display instructional information or operational information on the display 2215 for the user's reference and convenience.

The RF module 2235 is connected to the processor 2210 and transmits and/or receives an RF signal. The processor 2210 delivers instructional information to the RF module 2235 in order to initiate communication, for example, transmit a radio signal configuring voice communication data. The RF module 2235 consists of a receiver and a transmitter to receive and transmit the radio signal. The antenna 2240 functions to transmit and receive the radio signal. Upon reception of the radio signal, the RF module 2235 may transfer a signal to be processed by the processor 2210 and convert the signal into a baseband. The processed signal may be converted into audible or readable information output via the speaker 2245.

Figure 23:
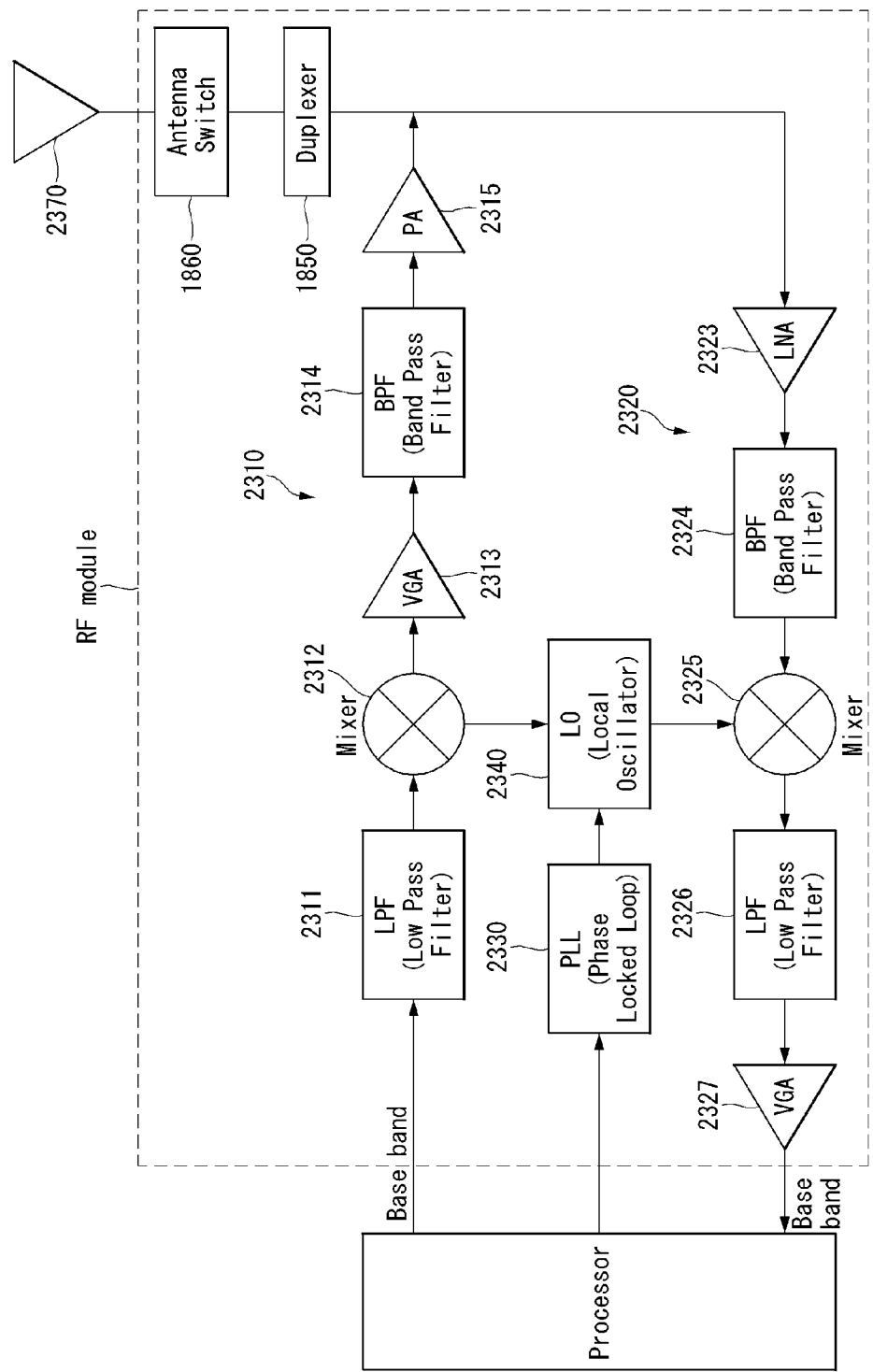
FIG. 23 illustrates an example of a RF module of a wireless communication device to which a method proposed by the present specification is applicable.

FIG. 23 illustrates an example of a RF module of a wireless communication device to which a method proposed by the present specification is applicable.

More specifically, FIG. 23 illustrates an example of an RF module that can be implemented in a frequency division duplex (FDD) system.

First, in a transmission path, the processor illustrated in FIGS. 21 and 22 processes data to be transmitted and provides an analog output signal to a transmitter 2310.

In the transmitter 2310, the analog output signal is filtered by a low pass filter (LPF) 2311 to remove images caused by a digital-to-analog conversion (ADC), is up-converted from a baseband to an RF by an up-converter (mixer) 2312, and is amplified by a variable gain amplifier (VGA) 2313, and the amplified signal is filtered by a filter 2314, is additionally amplified by a power amplifier (PA) 2315, is routed through duplexer(s) 2350/antenna switch(es) 2360, and is transmitted through an antenna 2370.

Further, in a reception path, the antenna 2370 receives signals from the outside and provides the received signals, and the signals are routed through the antenna switch(es) 2360/duplexers 2350 and are provided to a receiver 2320.

In the receiver 2320, the received signals are amplified by a low noise amplifier (LNA) 2323, are filtered by a bans pass filter 2324, and are down-converted from the RF to the baseband by a down-converter (mixer) 2325.

The down-converted signal is filtered by a low pass filter (LPF) 2326 and is amplified by a VGA 2327 to obtain an analog input signal, and the analog input signal is provided to the processor illustrated in FIGS. 21 and 22.

Further, a local oscillator (LO) generator 2340 generates transmitted and received LO signals and provides them to the up-converter 2312 and the down-converter 2325, respectively.

In addition, a phase locked loop (PLL) 2330 receives control information from the processor in order to generate the transmitted and received LO signals at appropriate frequencies and provides control signals to the LO generator 2340.

The circuits illustrated in FIG. 23 may be arranged differently from the configuration illustrated in FIG. 23.

Figure 24:
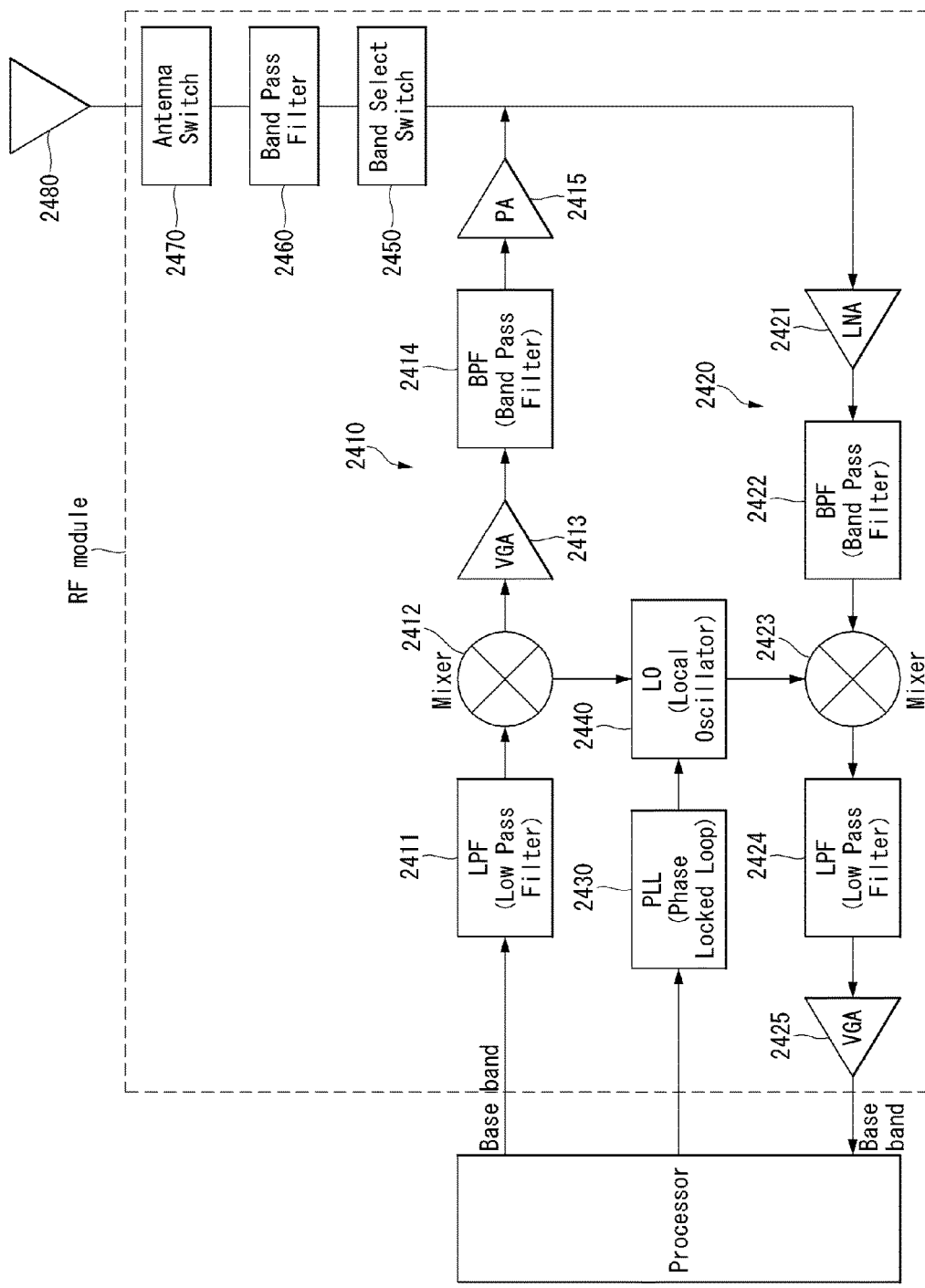
FIG. 24 illustrates another example of a RF module of a wireless communication device to which a method proposed by the present specification is applicable.

FIG. 24 illustrates another example of a RF module of a wireless communication device to which a method proposed by the present specification is applicable.

More specifically, FIG. 24 illustrates an example of an RF module that can be implemented in a time division duplex (TDD) system.

A transmitter 2410 and a receiver 2420 of the RF module in the TDD system have the same structure as the transmitter and the receiver of the RF module in the FDD system.

Hereinafter, only the structure of the RF module of the TDD system that differs from the RF module of the FDD system will be described, and the same structure will refers to the description of FIG. 23.

A signal amplified by a power amplifier (PA) 2415 of the transmitter 2410 is routed through a band select switch 2450, a band pass filter (BPF) 2460, and antenna switch(es) 2470 and is transmitted via an antenna 2480.

Further, in a reception path, the antenna 2480 receives signals from the outside and provides the received signals, and the signals are routed through the antenna switch(es) 2470, the band pass filter 2460, and the band select switch 2450 and are provided to the receiver 2420.

A radio device in the present specification may be a base station, a network node, a transmitter UE, a receiver UE, a radio device, a wireless communication device, a vehicle, a vehicle with an automatic driving function, a drone (unmanned aerial vehicle (UAV)), an artificial intelligence (AI) module, a robot, an augmented reality (AR) device, a virtual reality (VR) device, an MTC device, an IoT device, a medical device, a FinTech device (or financial device), a security device, a climate/environment device, or a device related to the fourth industrial revolution field or 5G service, or the like. For example, the drone may be an airborne vehicle that flies by a radio control signal without a person being on the flight vehicle. For example, the MTC device and the IoT device may be a device that does not require a person's direct intervention or manipulation, and may include a smart meter, a vending machine, a thermometer, a smart bulb, a door lock, a variety of sensors, or the like. For example, the medical device may be a device used for the purpose of diagnosing, treating, reducing, handling or preventing a disease and a device used for the purpose of testing, substituting or modifying a structure or function, and may include a device for medical treatment, a device for operation, a device for (external) diagnosis, a hearing aid, or a device for a surgical procedure, or the like. For example, the security device may be a device installed to prevent a possible danger and to maintain safety, and may include a camera, CCTV, a black box, or the like. For example, the FinTech device may be a device capable of providing financial services, such as mobile payment, and may include a payment device, point of sales (POS), or the like. For example, the climate/environment device may refer to a device for monitoring and predicting the climate/environment.

The UE in the present specification may include a cellular phone, a smart phone, a laptop computer, a digital broadcast terminal, a personal digital assistants (PDA), a portable multimedia player (PMP), a navigator, a slate PC, a tablet PC, an ultrabook, a wearable device (e.g., a smart watch, a smart glass, a head mounted display (HIVID)), a foldable device, or the like. For example, the HIVID may be a display device which is worn on the head, and may be used to implement the VR or AR device.

The embodiments described above are implemented by combinations of components and features of the present invention in predetermined forms. Each component or feature should be considered selectively unless specified separately. Each component or feature may be carried out without being combined with another component or feature. Moreover, some components and/or features are combined with each other and can implement embodiments of the present invention. The order of operations described in embodiments of the present invention may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present invention can be implemented by various means, for example, hardware, firmware, software, or combinations thereof. When embodiments are implemented by hardware, one embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present invention can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present invention can be embodied in other specific forms without departing from essential features of the present invention. Accordingly, the aforementioned detailed description should not be construed as limiting in all aspects and should be considered as illustrative. The scope of the present invention should be determined by rational construing of the appended claims, and all modifications within an equivalent scope of the present invention are included in the scope of the present invention.

INDUSTRIAL APPLICABILITY

Although a method for transmitting and receiving downlink data in a wireless communication system according to the present specification has been described focusing on examples applying to the 3GPP LTE/LTE-A system, it can be applied to various wireless communication systems such as the 5G system other than the 3GPP LTE/LTE-A system.

The invention claimed is:

1. A method of receiving, by a user equipment, a physical downlink shared channel (PDSCH) in a wireless communication system, the method comprising:
   receiving, from a base station (BS), a higher layer signal including first information about a configuration of an operation related to a PDSCH repetition;
   receiving, from the BS, second information related to a number of symbols of a control region;
   receiving, from the BS, downlink control information (DCI) including information related to a PDSCH repetition number based on the second information; and
   repeatedly receiving, from the BS, the PDSCH based on the DCI,
   wherein, based on the number of symbols of the control region being equal to 2 or 3, a initial subslot related to the control region is not counted as a subslot for a PDSCH repetition reception.

2. The method of claim 1, wherein the initial subslot is subslot #0 of a subframe, wherein the subframe comprises a plurality of subslots.

3. The method of claim 1, wherein the second information is received via a physical control format indicator channel (PCFICH) or the higher layer signal.

4. The method of claim 1, wherein the operation related to the PDSCH repetition is a HARQ-less/blind PDSCH repetition operation.

5. A user equipment (UE) configured to receive a physical downlink shared channel (PDSCH) in a wireless communication system, the UE comprising:
   a transceiver;
   at least one processor; and
   at least one computer memory operably coupled to the at least one processor and storing instructions that, based on being executed by the at least one processor, perform operations comprising:
   receiving, from a base station (BS) via the transceiver, a higher layer signal including first information about a configuration of an operation related to a PDSCH repetition;
   receiving, from the BS via the transceiver, second information related to a number of symbols of a control region;
   receiving, from the BS via the transceiver, downlink control information (DCI) including information related to a PDSCH repetition number based on the second information; and
   repeatedly receiving, from the BS via the transceiver, the PDSCH based on the DCI,
   wherein, based on the number of symbols of the control region being equal to 2 or 3, an initial subslot related to the control region is not counted as a subslot for a PDSCH repetition reception.

6. The UE of claim 5, wherein the initial subslot is subslot #0 of a subframe, wherein the subframe comprises a plurality of subslots.

7. The UE of claim 5, wherein the second information is received via a physical control format indicator channel (PCFICH) or the higher layer signal.

8. A base station (BS) configured to transmit a physical downlink shared channel (PDSCH) in a wireless communication system, the base station comprising:
   a transceiver;
   at least one processor; and
   at least one computer memory operably coupled to the at least one processor and storing instructions that, based on being executed by the at least one processor, perform operations comprising:
   transmitting, to a user equipment (UE) via the transceiver, a higher layer signal including first information about a configuration of an operation related to a PDSCH repetition;
   transmitting, to the UE via the transceiver, second information related to a number of symbols of a control region;
   transmitting, to the UE via the transceiver, downlink control information (DCI) including information related to a PDSCH repetition number based on the second information; and
   repeatedly transmitting, to the UE via the transceiver, the PDSCH,
   wherein, based on the number of symbols of the control region being equal to 2 or 3, an initial subslot related to the control region is not counted as a subslot for a PDSCH repetition reception.

9. The base station of claim 8, wherein the initial subslot is subslot #0 of a subframe, wherein the subframe comprises a plurality of subslots.

* * * * *